United States Patent [19]

Bauer et al.

[11] 4,423,480
[45] Dec. 27, 1983

[54] BUFFERED PERIPHERAL SYSTEM WITH PRIORITY QUEUE AND PREPARATION FOR SIGNAL TRANSFER IN OVERLAPPED OPERATIONS

[75] Inventors: Wayne J. Bauer, Longmont; William C. Dodt, Broomfield, both of Colo.; Charles R. Kirkpatrick, Tucson, Ariz.; Ted A. Rehage, Longmont, Colo.; Francis L. Robinson, Tucson, Ariz.; William K. Taylor, Boulder, Colo.

[73] Assignee: International Business Machines Corporation, Armonk, N.Y.

[21] Appl. No.: 241,323

[22] Filed: Mar. 6, 1981

[51] Int. Cl.³ .............................................. G06F 3/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,377,619 | 4/1968 | Marsh et al. | 364/200 |
| 3,654,617 | 4/1972 | Irwin | 364/200 |
| 3,905,025 | 9/1975 | Davis | 364/200 |
| 3,999,163 | 12/1976 | Levy et al. | 364/200 |
| 4,079,454 | 3/1978 | Sorenson | 364/200 |
| 4,200,928 | 4/1980 | Allan | 364/200 |

OTHER PUBLICATIONS

IBM Technical Disclosure Bulletin, vol. 15, No. 5, Oct. 1972, pp. 1523-1525.

*Primary Examiner*—Raulfe B. Zache
*Attorney, Agent, or Firm*—H. F. Somermeyer

[57] ABSTRACT

A peripheral system has one or more buffered control units connected to a plurality of peripheral devices. Operation times of the devices are marked by the buffer and controls which overlap device operations, queue device operations in a priority set of queues, and prioritize peripheral system operations. Plural specialized interconnections between each control unit and the devices include a preparatory connection for transfer of preparatory commands to devices, a tag or control connection for device selection, deselection and control and a data-command connection for signal transfers between a selecting control unit and a selected peripheral device.

14 Claims, 50 Drawing Figures

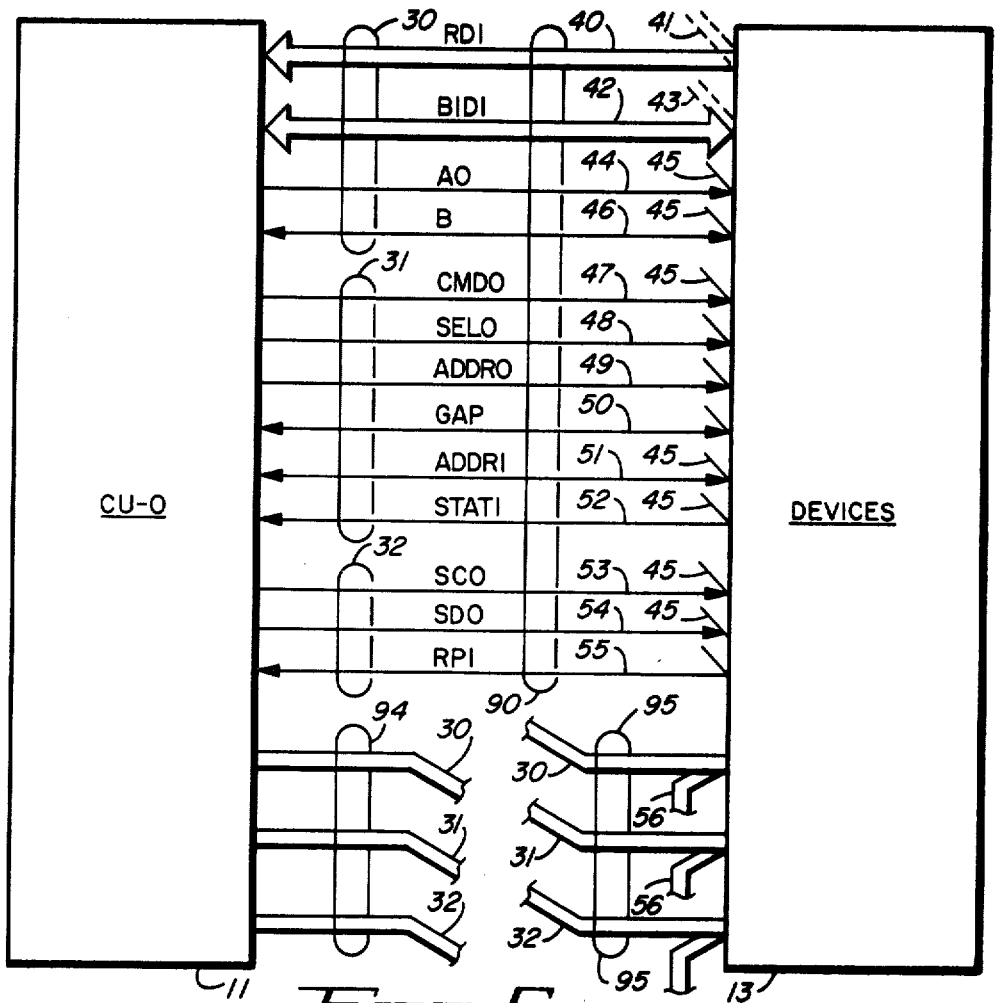
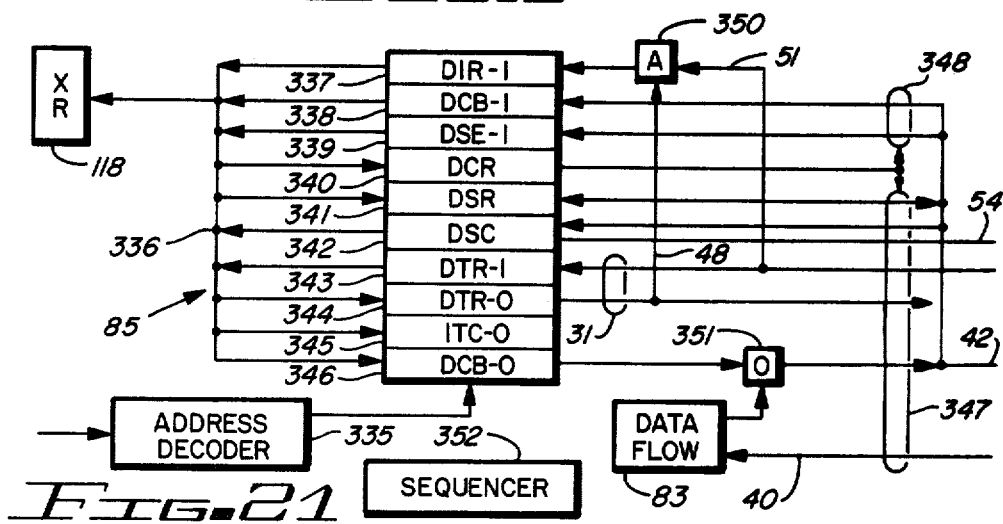

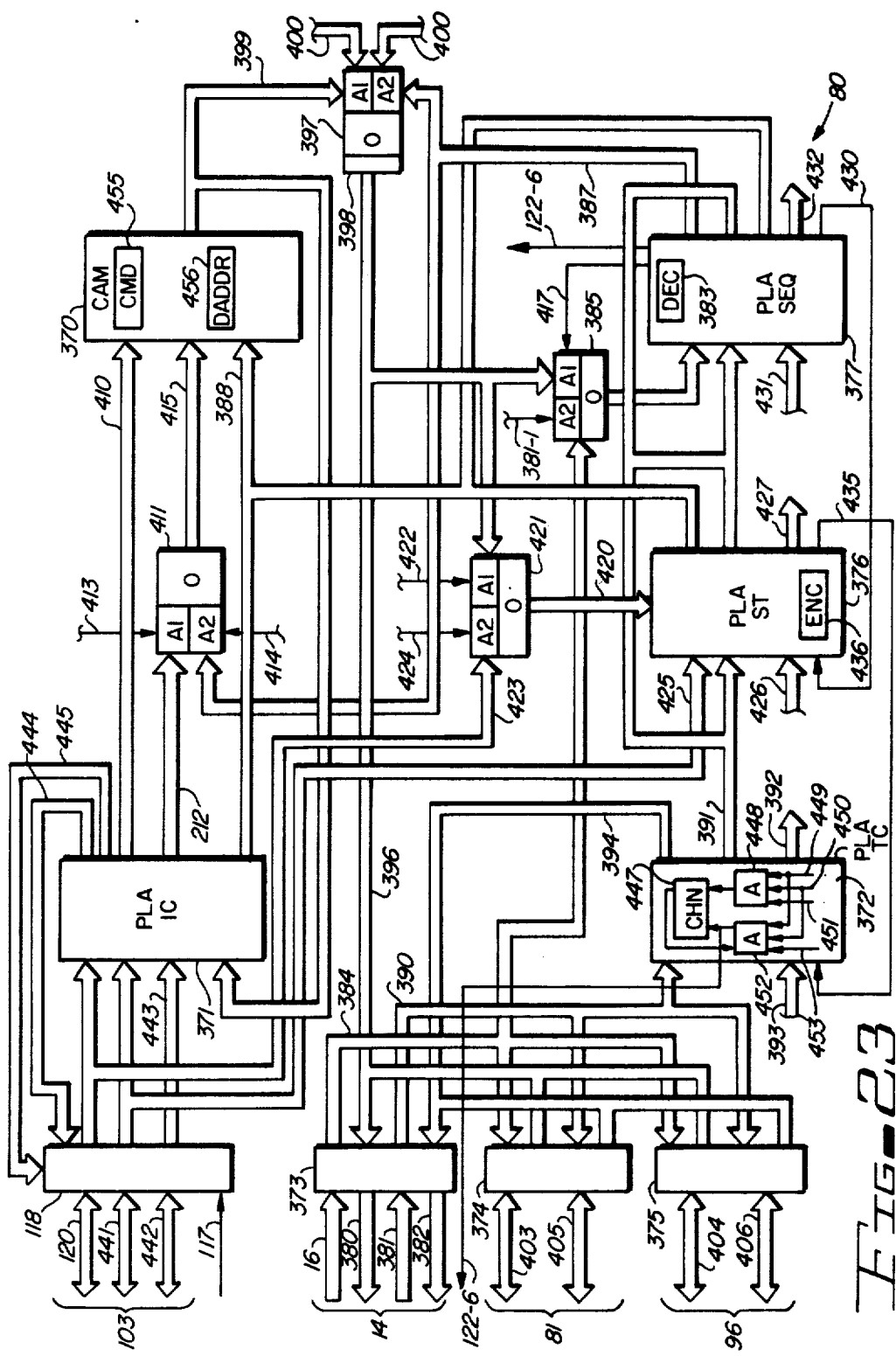

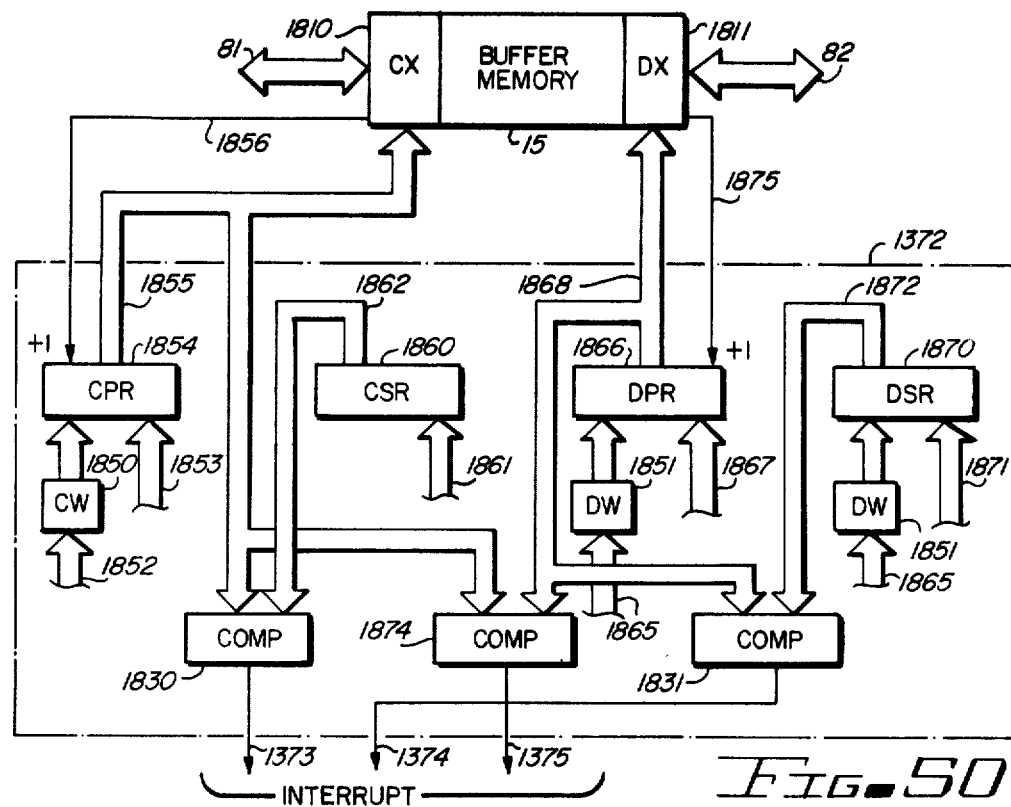
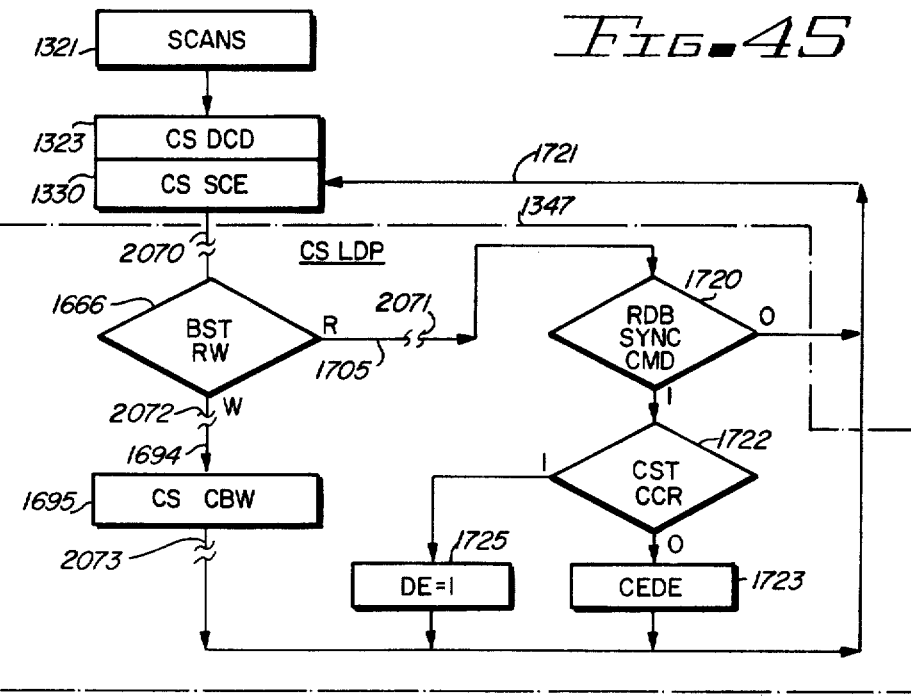
Fig. 50
Fig. 45

4,423,480

BUFFERED PERIPHERAL SYSTEM WITH PRIORITY QUEUE AND PREPARATION FOR SIGNAL TRANSFER IN OVERLAPPED OPERATIONS

FIELD OF THE INVENTION

The present invention relates to interconnections between a controlling unit and a plurality of controlled devices; more particularly, to a data processing system employing a plurality of controlled devices, the operation of which in highly overlapped and asynchronous modes may enhance system operations.

BACKGROUND OF THE INVENTION

Peripheral systems attachable to host central processing units (CPUs) have become an increasing portion of the total cost of a data processing facility. These increased costs had been particularly true in plural CPU systems employing data storage devices. A reason for the increased costs is the increasing demand for higher and higher performance of a data processing facility. Diverse peripheral system control techniques have been used to enhance performance of peripheral systems, while still trying to control increasing costs.

An approach to provide higher performance is to design the peripheral devices with higher performance. This, of course, adds to the cost of such peripheral devices. As an example, magnetic tape recording devices have employed vacuum columns as a mechanical buffer between a large reel of tape and a transducing station. Such vacuum columns, particularly in an extremely high-performance unit require complex controls, as well as expensive mechanical portions. Accordingly, it is desired to reduce the cost of peripheral systems by utilizing lower performance peripheral devices, yet maintain the overall high performance expected from a peripheral system. The present invention achieves this goal by providing a unique arrangement in a peripheral system that is a substantial change from prior art systems.

Most connections and control systems interposed between a peripheral device and a host CPU attempt to maximize data transfer performance. Of course, performance can be enhanced by maximizing the socalled burst rate, that is, how fast digital signals can be transferred through an electrical interface. Other control features, such as selection of a device for a particular computer program being executed within a host CPU error recovery and the like also impact performance. To this end, the system shown in E. R. Marsh, U.S. Pat. No. 3,377,609, and the interface shown in publication A22-6974-X, file No. S/360-S370-XX and entitled, "IBM System/360 and System/370 I/O Interface Channel to Control Unit Original Equipment Manufacturers Information" (OEMI) available from International Business Machines Corporation, Data Processing Division, 1133 West Avenue, White Plains, N.Y., 01604, show such an interface system. An important aspect of a peripheral storage system is integrity of the data being transferred and stored in the peripheral system. This interface arrangement, which is well known and widely used in a data processing art, can be applied to a control unit to device connection. In fact, several connections between control units and peripheral devices employ the principles of this host CPU to control unit connection. That is, a typical peripheral system attached to a channel of a host CPU includes a so-called control unit which in turn is connected to a plurality of peripheral devices. In some peripheral systems, a plurality of control units can be interconnected to an array of devices for multiplexing and multipathing purposes. These connections usually involve status signal data lines, commonly referred to as bus-out and bus-in for synchronously transferring data signals. The bus-out term applies to signals transferred from the host CPU to the control unit or from the control unit to the peripheral device. Bus-in lines are those lines that transfer signals from the peripheral device to the control unit or from control unit to the host CPU. Additionally, a set of tag or control lines for selecting, controlling and deselecting a control unit by a host CPU accompany the bus-in and bus-out lines. Such lines perform similar functions between a control unit and its peripheral devices. Generally, the connection between a control unit and peripheral device is somewhat simpler than that used in connecting a control unit to a host CPU. Two or more of the tag lines can be used to synchronize the operation of the data lines. Many connections are in a so-called "daisy-chain" arrangement, wherein a plurality of connections are made in a single circuit, such that one device or one control unit can operate with only one device at a time.

The tag lines operate in a somewhat asynchronous manner. That is, they are not data-synchronous. The tag lines are interlocked, such that one tag signal will not be removed until a responding tag signal has been sent. Such interlocking provides for the asynchronous operation while maintaining high integrity in the connection. Operation of the tag lines or the asynchronous path of control always precedes the actual data transfer. In other words, immediate device or control unit preparation and data transfer occur in one selection process. Of course, so-called "free-standing" operations can occur where the device or control unit disconnects from the controlling unit, respectively, the control unit or host CPU. Such free-standing operations for a device include rewinding of tape to beginning of tape (BOT), erasing to the end of the tape, and the like. Such freestanding operations permit limited overlap of device operation for improving peripheral system efficiency and performance. A modification of the above-described connection is shown in Levy et al., U.S. Pat. No. 3,999,163, which describes a secondary or peripheral storage facility. This patent shows synchronous and asynchronous paths wherein the asynchronous path is expanded over the asynchronous tag lines shown in the first-described connection. In Levy et al., status and controller information is coupled between the controller and a selected drive unit asynchronously over an asynchronous bus. Actual data transfers (user data transfers) occur between the controller and the drive (herein referred to as device) over a synchronous bus and between other units in the system and the controller using a direct memory access or equivalent data transfer technique.

The asynchronous drive control path includes data, address and control lines. The signals over the asynchronous path perform control functions and include control signals for effecting information transfers to or from addressed storage locations in the drive. The starting address in the drive and the sizes of the immediately ensuing data transfer over the synchronous bus are typical items of information which are sent to the drive over the asynchronous path. The synchronous data path which transfers the data itself, also contains data and some control lines. Control lines carry signals used for synchronizing the controller and drive, starting a data transfer and signaling any malfunctions which might occur during a data transfer.

The signals on the asynchronous and synchronous data paths constitute a standard set of signals which control diverse units, such as disk drives, magnetic tape drives, and so forth. Therefore, Levy et al. teach that a controller can be made independent of the drive it controls so that diverse units can be connected to one controller. This type of connection still may not provide for maximizing overlap of device operations nor for maximizing efficiency of a peripheral system such that higher and higher performance can be achieved at lower and lower costs. Costs may be reduced by sharing the controller to diverse types; however, it does not follow that a maximal performance can be achieved from the connected devices. Therefore, higher performance devices appear to still be required with the Levy et al. system for achieving high peripheral system performance.

Accordingly, it is desired to find an arrangement for a peripheral system which provides high performance with relatively low performance devices and at a reasonable cost.

SUMMARY OF THE INVENTION

In accordance with the present invention, a peripheral system has a plurality of peripheral devices connected to one or more control units for achieving enhanced operation by co-action of a plurality of elements. A data transfer or selected connection (including bus lines and tag lines) exists between the control unit and each of the devices, either through a so-called daisy-chain or radial connection, which provides for selection, deselection, data transfer and status reporting of each device to the control unit. Additionally, a non-selected connection is provided for a preparatory action, such that the first-mentioned selected connection can be utilized to a maximum for maximizing peripheral system performance. This preparatory connection is independent of the data connection for transferring control signals to or from the devices and can be operated independent of whether or not the device being addressed over the preparatory connection is inactive or performing a free-standing operation. In a preferred form of the preparatory connection, a data line and a clock line provide for communication from the control unit to an addressed one of the devices. A single response line, extending from the device to the control unit in a preferred mode provides but a single signal response indication termed repositioning-in.

The above-described connections, in combination with a device work queue means in the control unit, manage operations of the peripheral devices over either or both of the connections. The work queue means is preferably divided into a plurality of priority work classes. A high priority or first class is a control command sequence wherein a peripheral device is to be prepared for an upcoming or expected data processing operation irrespective of activity of that device or of other devices. A second priority is an information command work queue wherein certain status and other information is to be supplied to the control unit from the addressed peripheral device which does not require any mechanical action on the part of the device. The lowest priority is the actual data transfer which usually requires some mechanical activity of a peripheral device. These queues are operated independently of the connections.

Further, enhancement of peripheral system operation is provided by a managed data buffer. A segment of the buffer (a segment is a plurality of addressable registers less than all of the registers in the buffer) is assigned to a given peripheral device. The control unit effects data signal transfers between the assigned segment and the device is an asynchronous manner with respect to the data transfers between the host CPU and the buffer. Under certain circumstances where data integrity is a paramount aspect of a given data processing operation, such transfers can be synchronous. In other aspects, when large blocks of data are being transferred, the operation of the device and host CPU can be made synchronous through the segment of the buffer or bypassing the buffer segment. Provisions are made for limiting the duration of each data transfer such that all of the peripheral devices can participate in diverse data processing operations, thereby raising the peripheral system performance as a totality for increasing data processing facility efficiencies.

Further enhancement of operations is achieved by assigning priorities to peripheral system operations. These priorities co-act with the priorities of the device work queue, buffer control and the plural control unit to device connections for maximizing peripheral system performance. In a preferred form of the invention, the priority of operations, beginning with the highest priority, include error recovery, optional peripheral system functions, data format related operations, such as detecting a tape mark, detecting beginning of a block of signals, and the like. A subset of the priorities relating to format includes handling signals relating to an inter-block gap, i.e., a non-data portion interleaved between two adjacent blocks of data signals. The next lower priority includes those data transfers between a device and the buffer. Lower priority operations are data transfers between the channel and the buffer. A lower priority operation yet is the decoding and setup of executing peripheral system commands received from a host CPU. An idle scan level of operation is provided for handling device management functions and other functions not mentioned above.

The invention contemplates that various aspects of these complex interactions described above may be employed in varying degrees.

The foregoing and other objects, features, and advantages of the invention will be apparent from the following more particular description of preferred embodiments of the invention, as illustrated in the accompanying drawings.

DESCRIPTION OF THE DRAWING

FIG. 5 illustrates connections between a single control unit and a selected peripheral device showing partial connections to other devices and control units.

FIG. 21 is a block schematic diagram of a device adaptor usable in a control unit shown in FIGS. 1 and 2.

FIG. 23 is a block schematic diagram of a channel adaptor portion of a control unit of FIG. 2 used to connect the control unit to a host CPU.

| FIG. # | Logic Module |
|---|---|
| 39 | CS DCD |
| 40 | CS SCE |
| 41 | CE RDC |
| 42 | CE WRT |
| 43 | CS LDP |
| 44 | CS LDC |

FIG. 45 shows the operational relationship between CS LDP with CS DCD and CS SCE.

FIGS. 46-49 are logic flow block diagrams showing logic modules indicated in the tabulation below:

| FIG. # | Logic Module |
|---|---|
| 46 | CS CBW |
| 47 | CE SRD |
| 48 | CE SWR |
| 49 | CE SSO |

FIG. 50 is a logic diagram of a buffer control for automatic data transfer.

DETAILED DESCRIPTION

TABLE OF CONTENTS

The Peripheral System
   Logical description
   Hardware description
The control unit to device interfaces
   The interconnections
   Signal diagrams
A peripheral device
   Block diagram
   Serial adaptor circuits
Priority control
Device communication control
Device Adaptor
   Overlapped device operations
Channel Adaptor
Control Tables
   Selected device table SDT
   Device operation table DOT
   Control unit table CUT
   Logical device table LDT
Starting Device Operations
   Operation scheduling
   Control unit device preparation
   Preparatory connection operations
   Read ahead operations Queuing device operations
Device command/interface controls
Control unit to device communications
Execution of host-supplied commands
  Command decoding and execution
  preparation
  Command execution
  Buffer control
  Synchronous read and write
  Buffer control circuits

THE PERIPHERAL SYSTEM

Figure 1:
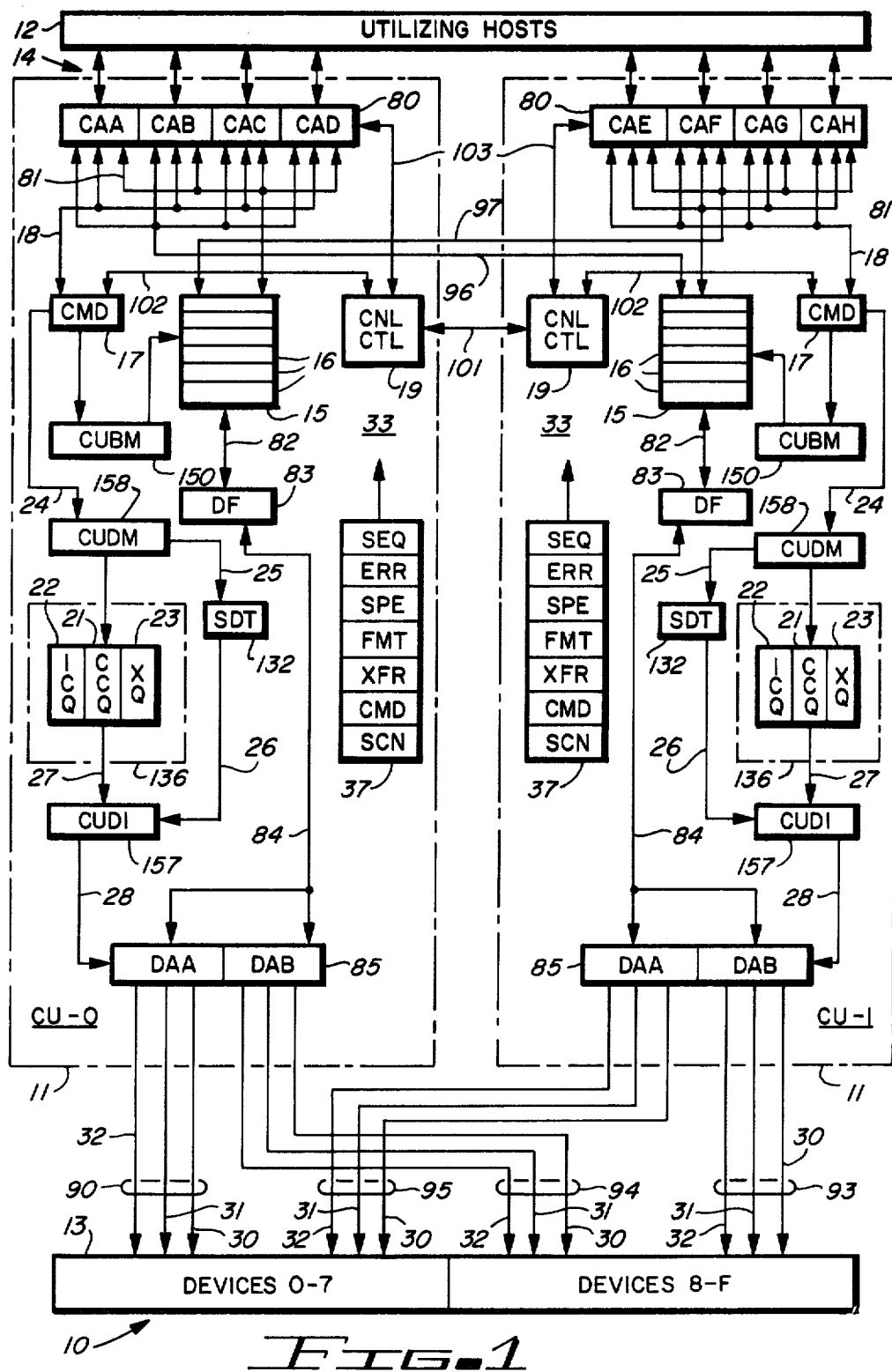
FIG. 1 is a block and logic flow diagram of a peripheral system attached to utilizing hosts which employ the various aspects of the present invention.

Referring now more particularly to the drawing, like numerals indicate like parts and structural features in the various diagrams. Referring first to FIG. 1, a peripheral system 10 has a pair of control units 11 (also denominated as CU-0, CU-1) for selectively connecting a plurality of utilizing hosts 12 to a plurality of peripheral devices 13. Connection from the two control units 11 to the hosts 12 is via a plurality of connections 14 such as described in the Background of the Invention. Interior to each control unit 11 is a data buffer 15 for asynchronously coupling the devices 13 to the hosts 12. Each buffer 15 is arbitrarily divided into a plurality of buffer segments 16 which are in a preferred mode of the invention, dynamically allocatable to any one or more of the devices 13. In another mode of the invention, buffer 15 can have one or two segments 16 for minimal asynchronous transfers between devices 13 and the buffer 15. The utilizing hosts 12, when desiring a peripheral subsystem action to occur, issue an input/output or peripheral command which is received by command decoder CMD 17 over line 18 from one of the channel adaptors 80. A channel adaptor 80 is described in detail with respect to FIG. 23, and provides control and data transfer connections between a control unit 11 and a channel processor (not shown) of the utilizing hosts 12. Operation of the channel adaptor 80, including the transfer of signals to CMD 17, is under control of CNL CTL 19 (channel control).

Data transfers between devices 13 and hosts 12 flow through the channel adaptors 80, buffer 15, then over bus 82, to data flow circuits DF 83. Data flow circuits 83 typically have write signal modulating circuits, the data detection circuits, error correction circuits, and other associated signal processing circuits used in the data processing and data signal recording arts. From data flow 83, the signals are transferred over bus 84 to one of the device adaptors 85. From device adaptors 85, the signals are transferred to devices 13, as later described.

A portion of the efficiency and performance of peripheral system 10 comes from a plurality of device work queues which, in the FIG. 1 illustrated embodiment, are maintained in a device operations table DOT 136. A firt device work queue CCQ 21 lists all of the control commands to be executed within peripheral system 10 (CU-0 or CU-1). These commands, as later described, require devices 13 to perform some preparatory or ending function. In a magnetic tape recorder, such preparatory action could be moving from beginning of tape to a designated portion of the tape. Other commands include rewind, and in a cassette recorder, a rewind tape and unload cassette or an unload cassette. A second priority queue is the information command queue ICQ 22. These commands require the addressed device 13 to transfer status and other signals to a requesting control unit 11, which signals are usually accumulated by the device 13 in a register (not shown). This means that the signal transfer is not dependent upon any device characteristics requiring any mechanical action. The third and lowest priority in the illustrated embodiment is the data transfer work queue XQ 23. The work queue relates to those commands for devices 13 where signals are transferred between a device 13 and buffer 15. The arrangement is such that the data transfer between the host 12 and buffer 15 is highly asynchronous with respect to any given device 13. That is, signals being transferred from buffer 15 to a host 12 for device number 4, for example, may be occurring while device number 8 is transferring signals to buffer 15.

Control of the queues is set up by a set of logic modules CUDM 158 under supervision of CMD 17, as indicated by control line 24. CUDM 158 also inserts requests for preparatory actions into selected device table SDT 132. Actuation of devices 13 via device adaptors 85 is implemented by a set of logic modules CUDI 157. CUDI 157 receives the preparatory requests over control line 26 and the work queue request over line 27, as will become apparent. CUDI 157 relays the request over control line 28 to device adaptors 85.

The connections between the control units 11 and devices 13 is quadraplexed. Devices 13 are divided into two groups of 8, addresses 0–7 and addresses 8-F. Additionally, each control unit has two device adaptors 85, DAA and DAB. Device adaptor DAA in each of the control unit connects the control unit to a set of devices termed the primary devices for that given control unit. Devices 13 with addresses 0–7 are primary to CU-0, while devices 13 having addresses 8-F are primary to CU-1. As a corollary, devices 0–7 are secondary to CU-1, while devices 13 having addresses 8-F are secondary to CU-0. Cable 90 connects CU-0 to its primary devices 13, while cable 93 connects CU-1 to its primary devices 13. In a similar manner, cable 94 connects CU-0 to its secondary devices 13, while cable 95 connects CU-1 to its primary devices 13. Each of the cable connections contains a complete interconnection between the control units 11 and each of the devices 13, as indicated. Such connection can be either radial or daisy-chained; daisy-chained is preferred because of lower cost. The three interconnections in each cable include a synchronous data connection 30, an asynchronous tag and control sequence connection 31, and a preparatory connection 32. In general, a device is prepared for a data transfer operation via preparatory connection 32. After the device 13 being prepared signals completion of such preparation by a device alert signal, microprocessor 110 issues tag and control signals over connection 31 for immediate selection and preparation of the device for the data transfer operation which occurs synchronously over connection 30. Deselection of the device 13 is also achieved over the tag and control connection 31. In the event the preparatory connection 32 is inoperative, all functions can be performed over connections 30 and 31. In general, the preparatory connection 32 is an extremely simple connection; just having sufficient logic power for enabling a minimal preparatory action on the part of an addressed device 13. Such interconnections are fully explained later with respect to FIG. 5.

Each control unit 11 includes a program control 33, which includes the logic modules described above which not only decode the command, operate the device work queues, provide control of the device adaptors 85 and channel adaptors 80, but also manage buffer 15. A collection of logic modules CUBM 150 manage the buffer 15, as indicated by a control line 35. Additionally, control 33 includes a priority of peripheral system operations, indicated in box 37 and more fully described later. Top priority operations are special sequences SEQ. Second priority operations error recovery sequences ERR, are followed by special sequences SPE. Then all operations relating to the format FMT of the data record member (not shown) are performed. Following format related operations, data transfer operations XFR are performed. Then command CMD decoding and other preparatory actions are performed. Finally, idle scan SCN occurs, which relates to device management and the like.

Accordingly, FIG. 1 shows a peripheral system 10 that includes a data buffer 15 for providing some asynchronous facility between utilizing hosts 12 and peripheral devices 13. Additionally, work queues 21-23 asynchronously control the devices 13 with respect to buffer 15, all of which is managed by a priority scheme 37 relating to the operations being performed on behalf of peripheral system 10. All of these co-act to provide a high performance peripheral system 10, with a relatively low performance peripheral device 13. For example, a magnetic tape recorder of the vacuum column type is no longer necessary for providing high performance peripheral storage system. A reel-to-reel low performance tape recorder, constituting a device 13, has been substituted in a peripheral system 10 for the high performance, high cost vacuum column tape recorder with equal or better performance, all by using the present invention.

In addition to all of the above, multipathing is provided in the peripheral system 10. Any of the channel adaptors 80 in CU-0 can communicate with a buffer 15 in CU-1 via bus 96. In a similar manner, channel adaptors 80 of CU-1 can also communicate with the buffer 15 in CU-0 via bus 97. The respective channel adaptors 80 are controlled by their channel control 19 via lines 103. Data transfers between channel adaptors 80 to the buffer 15 in the same control unit is via the respective bus 81. The channel adaptors 80 being controlled by their respective control units require communication between channel controls as indicated by line 101. Accordingly, a peripheral command received by channel adaptor CAH of CU-1 can be transferred by CNL CTL 19 of CU-1 over bus 104 to CNL CTL 19 of CU-0. The CU-0 CNL CTL 19 then transfers the received peripheral command over its bus 102 to CMD 17. CMD 17 then activates the previously described areas of control 33, such that buffer 15 can transfer data signals through a channel adaptor 80 of CU-1 over which the peripheral command was received. The reverse is also true--CU-0 can transfer a command to CU-1 for execution. Such selection is made when a buffer 15 in CU-0 for example contains data for a device 13 addressed over a channel adaptor 80 of CU-1. Increased efficiency is provided by not purging the data from the buffer 15 of CU-0, but rather using the multipathing aspects of the connections shown in FIG. 1. Once the channel-to-buffer connection is made, then all of the other operations of control 33 remain the same. That is, each control unit treats the channel adaptors 80 identically, so long as there is data in the buffer 15 relating to that channel adaptor 80.

Figure 2:
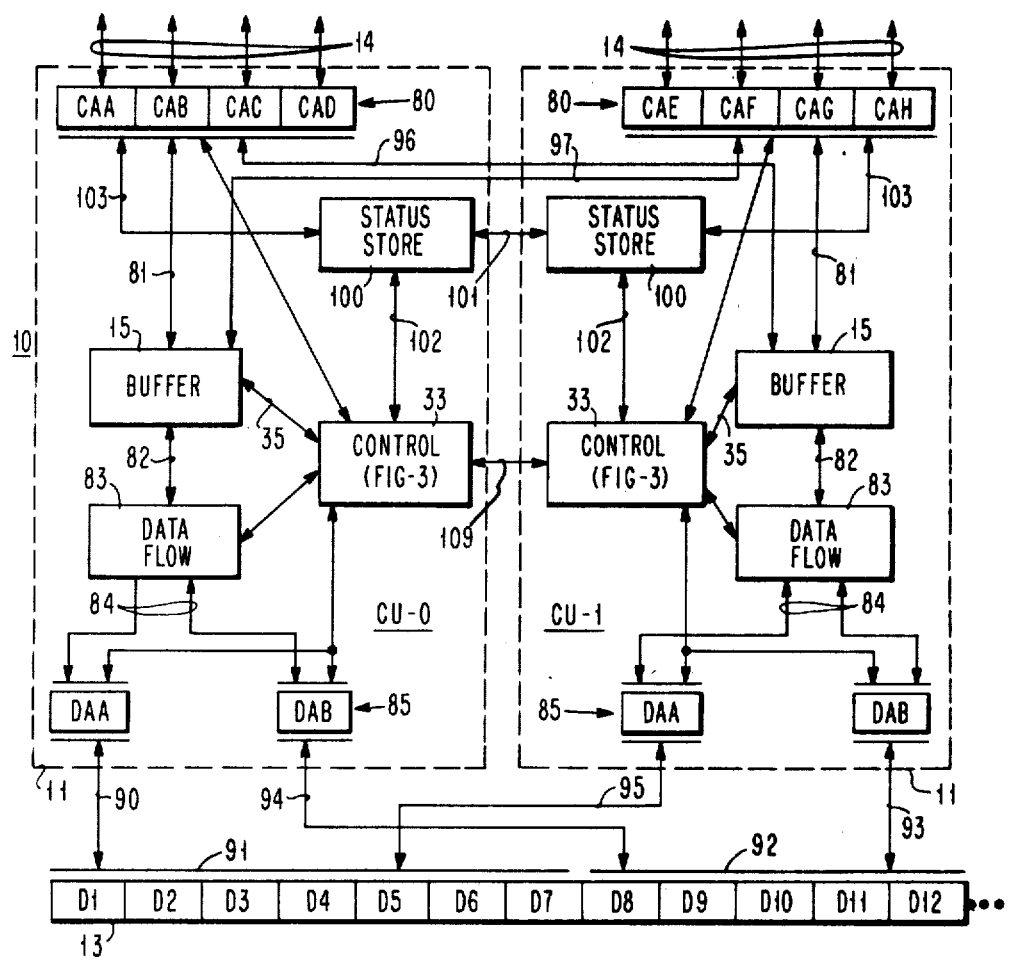
FIG. 2 is a simplified schematic block diagram illustrating the FIG. 1 peripheral system in one constructed version.
Figure 3:
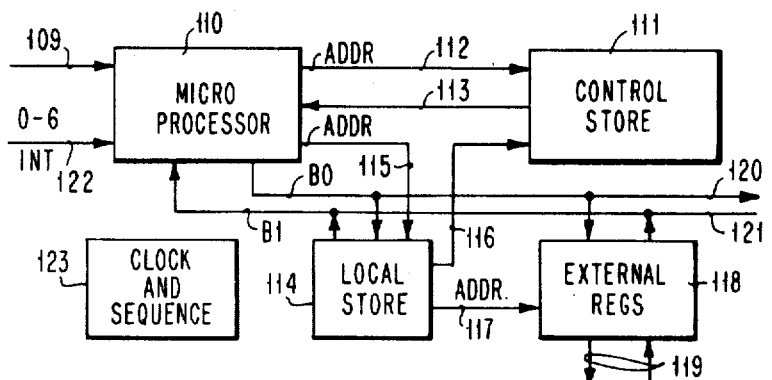
FIG. 3 is a schematic block diagram of the control portion of the FIG. 2 illustrated peripheral system.
Figure 4:
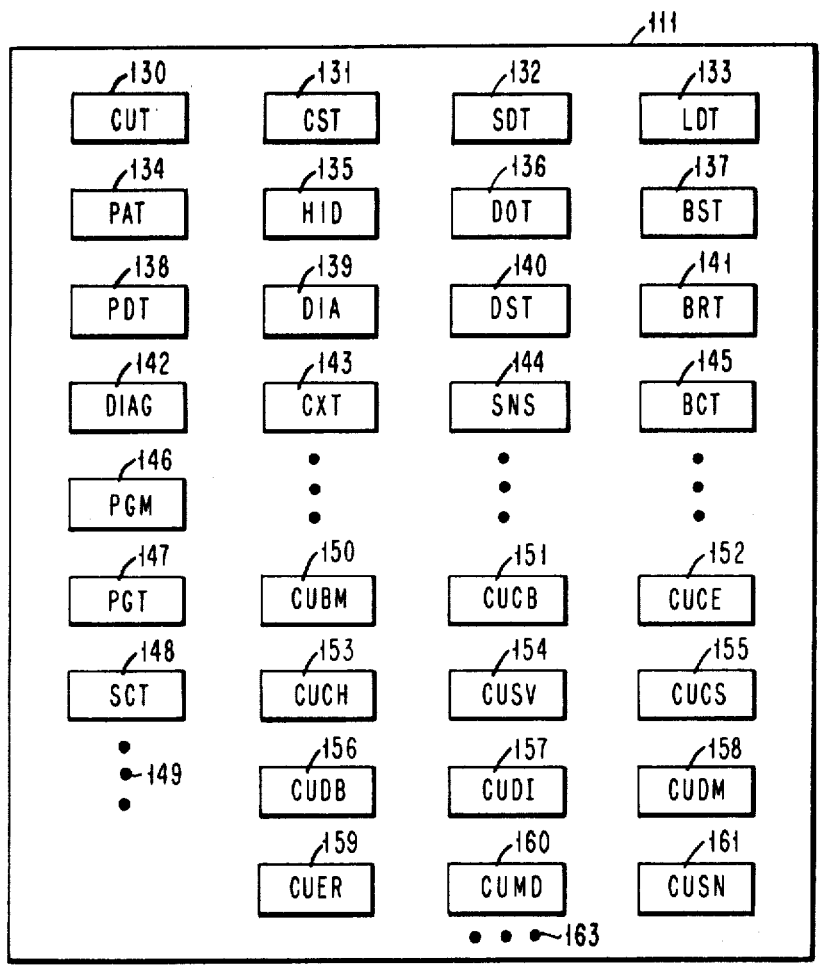
FIG. 4 is a memory map of the control store of FIG. 3, showing the various logic modules and control tables used in connection with the FIG. 2 illustrated system.

Before further describing the invention, the environment in which the invention preferably resides is described with particular reference to FIGS. 2 through 4, which illustrates a storage subsystem employing reel-to-reel tape drives denominated as devices 13, DO-DF. The preferred arrangement includes two control units 11 denominated as CU-0 and CU-1. The arrangement is such that any of the devices can be connected to the host 12 via input/output channel 14 through either of the control units, CU-0 or CU-1. The attachment to a host 12 by each of the control units 11 is via a plurality of channel adaptors circuits 80 which are individually denominated CAA-CAH. Each of the channel adaptors 80 can communicate directly with a buffer 15 in either control unit 11. Both CU-0 and CU-1 are identically constructed. Accordingly, like numerals are indicating like parts in the two control units with the interconnections between the control units being separately denominated. Channel adaptors CAA-CAD are in CU-0 while CAE-CAH are in CU-1. The respective channel adaptors communicate with a buffer 15 in its own control unit via cable 81. Communications from the buffers to the devices 13 is over cable 82 through a data flow circuit 83, thence to cable 84 through a plurality of device adaptor circuits 85. The device adaptor circuits are separately denominated by characters DAA and DAB in both control units 11. Data flow circuits 83 contain recording circuits. The programmed control 33 is electrically connected to all of the described portions of the respective control units 11 and operates generally in a known manner for storage subsystems as generally shown in Irwin U.S. Pat. No. 3,654,617, filed in U.S.A., Oct. 1, 1970, application Number 77,088.

The interconnections between the control units 11 and the devices 13 is on a primary/secondary basis. Devices D0-D7 are primary to CU-0 and secondary to CU-1. In a similar vein, devices D8-DF are primary to CU-1 and secondary to CU-0. The significance of primary and secondary connections relates to which of the control units CU-0 or CU-1 maintain status for the respective devices; i.e., the control unit CU-0 maintains status information for D0-D7 while CU-1 primarily maintains status information for D8-DF. As will become apparent, both control units CU-0 and CU-1 memorize status indications for all of the devices 13. In the primary connections, adaptor DAA of CU-0 is connected via a cable 90 to all of the devices D1-D8. In a similar manner, the connection to D8-Df to CU-1 is via cable 93 through adaptor DAA. The secondary connection from CU-0 to devices D8-DF is via cable 94 while CU-1 is connected to devices D0-D7 via cable 95. The operations between the device adaptors 85 and the various devices D0-DF includes tag control lines and bus data transfer lines which enables the control units 11 to closely control and operate devices 13.

In prior tape subsystems, the data flow paths were not fully multipathed in that the channel adaptors 80 communicated only with the data flow circuits 83 in its respective control unit 11. In the preferred configuration, any of the channel adaptors CAA-CAH can communicate with any of the devices 13 through either data flow circuit 83. The internal control unit 11 connection from the channel adaptor CAA through CAD and adaptor CAE-CAH of CU-1 are as previously described. Connections from channel adaptors CAA-CAD to the buffer 15 of CU-1 is via cable 96 whereas channel adaptor CAE-CAH connects to the buffer 15 of CU-0 via cable 97. Accordingly, either data flow circuit 83 or buffer 15 can communicate with any of the hosts via any of the channel adaptors. This arrangement, or course, requires close coordination between control units 11.

The total subsystem status is maintained in each of the control units 11 via a pair of status stores 100. Status stores 100 communicate with each other via a cable 101 independent of data processing operations; that is, as soon as CU-0 changes status, such as by selecting a device 13, the status store 100 in CU-0 immediately communicates to status store 100 in CU-1. Similarly, any cross-connection between the channel adaptors 80 and the buffers 15 is immediately indicated in both status stores 100. Each of the status stores 100 contain a plurality of registers for containing bits relating to device status, buffer status, channel status and the like. Such status information reflects the selection status of the device, its busy status, contingent connections and all other status necessary for operating the storage subsystem with the input/output channel 14.

One and only one control unit 11 can change the configuration of the storage system at a given time. In this regard, cables 102 extend from the respective status store 100 (a part of CNL CTL 19 of FIG. 1) to control 33. When control 33 of CU-0 wants to change logical configuration of the subsystem by selecting a device 13, for example, control 33 communicates with its status store 100 and requests permission to change subsystem status. Status store 100 is in an appropriate master state and permits control 33 to make a selection. Otherwise, status store 100 of CU-0 requests the status store 100 of CU-1 to give it the master state. Either CU 11 having the master state is the only one which can change logical configuration of the subsystem; the master state being shifted between the control units as configuration changes dictate. Status stores 100 also communicate with the respective channel adaptors in the control units 11 via cables 103. Such communication includes the supplying of device busy status to the channel adaptors from the status stores and the request for selection from the channel adaptors to the status stores; that is, if CAB 80 wants to select device D6 on behalf of a host request, CAB 80 communicates with its status store 100 of CU-0 requesting that the device D6 be selected. Status store 100 will supply the busy or not busy status of D6 to CAB. CAB then immediately responds to the host request with respect to device D6, thereby reducing selection and inquiry time between a host 12 and control units 11.

Control 33 can take different configurations. The configuration preferred for use in connection with the FIG. 2 illustrated storage subsystem is shown in FIG. 3. A programmed microprocessor 110 operates in accordance with microcode program stored in control store 111. Such microprograms enable microprocessor 110 to completely manage buffer 15, to provide supervised data flow circuit 83, to communicate with status store 100, and to supervise and enable selection of the channel adaptors 80 and device adaptors 85. Further, communication between controls 33 in the two CU's 11 on a processor-to-processor basis is via cable 109 using known interprocessor communications techniques. Using known techniques, microprocessor 110 selects the microprograms of control store 111 via address bus 112. Control data is supplied from the control store 111, including microprogram instruction words, via bus 113. Of course, the usual idle scan loop for operating microprocessor 110 is resident in control store 111. Additionally, control 33 includes local store 114 which acts as a working control store for microprocessor 110. The addressible registers of local store 114 are addressed via bus 115. Bus 116 transfers signals from local store 114 to control store 111 under control of microprocessor 110; that is, it is preferred that the data stored in control store 111 from microprocessor 110 be transferred via local store 114. Communications between control 33 and all of the items shown in the control units 11 is via sets of external registers 118 which are addressed by address signals supplied over bus 117 from local store 114, no limitation thereto intended. Communications from external registers 118 to the various elements of the control units 11 is via a pair of unidirectional buses 119 which are electrical connections made in the usual manner.

Microprocessor 110 includes the bus out BO 120 and a bus in BI 121 which are connected to local store 114, external registers 118 and other units as may be desired. Microprocessor 110 is interrupt driven through a plurality of interrupt levels. These interrupts are supplied by the various elements of the control unit 11 over bus 112 which carries interrupt signals having levels 0 through 6, the priority of which is preassigned in accordance with the functions to be performed in the storage subsystem. The electrical signal timing of control units 11 is by clock and sequencer 123. Not only does clock and sequencer 123 provide timing pulses, but sequences microprocessor 110 for initializing control 33 to properly operate the control unit 11. The connections 119 from external registers 118 are to all the other portions of control unit 11.

FIG. 4 is a map of control store 111 showing control tables and microprogram groups. The tables, of course, contain those signals representing control information necessary for the successful operation of the storage subsystem. First the tables are described.

CUT 130 is a so-called control unit operation table which contains information-bearing signals pertaining to the entire control unit 11. This table relates to the operational status of the individual control unit CU-0 and CU-1 and which is not device 13 nor channel 14 related. CST 131 is a command status table which contains information-bearing signals describing the current command status which is being executed for an addressed device 13; that is, host 12 supplies channel commands over I/O channel 14 to the respective control units 11. CST 131 reflects the present status of the execution of those commands received by any of the channel adaptors 80. SDT 132 contains information-bearing signals signifying the status of a selected device 13. This table enables the control units 11 to closely control and operate any of the devices 13. LDT 133 is a so-called logical device table which contains information-bearing signals signifying the status of each of the devices 13 as those devices are logically extended into the buffer 15 and the broad operational status of the respective devices which status information is more general in character than that appearing in SDT 132. PAT 134 is pending allocation table having information-bearing signals which queue devices 13 by their respective addresses which require buffer space when buffer space has not yet been allocated. The table is preferably a FIFO (first in, first out) table of the circular type. HID 135 is a table containing host identification signals for the hosts 12 communicating with the control units 11 via channel adaptors 80. DOT 136 (device operation table) relates to device operations and contains information-bearing signals signifying schedule, active and completed device 13 operations. Such operations include tape transport, reading and writing and the like. BST 137 contains information-bearing signals relating to the status of the buffer 15. Such information-bearing signals relate to data transfers into and out of the buffer, allocation of buffer space and other buffer related functions. PDT 138 contains information-bearing signals signifying the buffer space of the buffer 15 which can be deallocated from devices 13 as soon as the activity with respect to such buffer space ceases. Deallocation does not occur until such activity stops. DIA 139 contains information signals signifying device information, control data relating to devices 13 and concerned with input/output channel 14 as well as intercontrol unit communication over cable 109 is stored here. Such information may originate because of device 13 operations as well as channel 14 operations. DST 140 stores information bearing signals relating to device status; that is, the last device status presented by the device 13 to control units 11 is stored in this area. BRT 141 relates to the operation of buffer 15. This table identifies the status of records in the buffer 15. Each record in the buffer will be entered into BRT 141 and may contain characterizing signals showing the status of the record with respect to its storage in buffer 15. DIAG 142 is a table used to control diagnostic functions executed in the control unit 11. CXT 143 (channel transfer table) contains information-bearing signals relating to transfer of signals between buffer 15 and any of the I/O channels 14 via the channel adaptors 80. Such information includes the direction of transfer and the address of the device 13 related to such transfer. SNS 144 (sense table) holds information-bearing signals representing sense data to be reported to a host 12 as well as a so-called buffered log arranged by device 13 addresses. BCT 145 (buffer to channel table) stores information-bearing signals relating to the dynamic logical address configuration of buffer 15. Such configuration will vary in accordance with the number of devices 13 connected to the control unit 11 or two. PGM 146 is a so-called path group map which indicates which devices 13 may be logically connected to channel adaptors 80 for logically partitioning the subsystem into one or more logical storage units. Path group table PGT 147 complements PGM 146 in that it includes identification signals identifying the logical partition and which of the channel adaptors 80 is resident within each of the logical partitions. SCT 148 is a table containing signals relating to the idle scan for determining if any activity is to occur with respect to a given device 13. A diversity of actions can be instituted via SCT 148 (scan control table).

Numeral 149 indicates other tables not specifically referred to herein but that could be found in a constructed embodiment of the FIG. 2 illustrated storage subsystem. Such entry may include indications identifying the free space of buffer 15, priority queues for space of buffer 15, a segmentation indication for buffer 15, tracing status, timer tables for controlling time-outs and other miscellaneous areas necessary or desirable for constructing a multiple device storage subsystem. Various program groups include CUBM 150 which are the microcode programs or logic modules relating to the management of a buffer 15. CUCB 151 identifies those microcode logic modules relating to the transfer of signals between an I/O channel 14 and buffer 15 via channel adaptors 80. CUCE 152 relates to setting up the tables described above in preparation for executing a command received from a host 12 overinput/output channel 14. CUCH 153 relates to the channel control aspects, such as device selection and the like. CUSV 154 relates to an interrupt supervisor as it uses scan vectors in determining priority of the interrupts. CUCS 155 is a command support set of microcode logic modules which executes the commands set up by CUCE 152. CUDB 156 relates to the control and supervision of signal transfers between devices 13 and buffer 15. CUDI 157 relates to the control of the device adaptors 85. CUDM 158 relates to the management of devices 13 such as scheduling their operations, etc. CUER 159 relates to error detection and recovery microcode. CUMD 160 relates to diagnostic procedures executed by a control unit 11. CUSN 161 relates to handling sense data such as stores in SNS 144. Numeral 163 indicates that the above program groupings may be modified and extended as the need arises for a storage subsystem.

THE CONTROL UNIT TO DEVICE INTERFACES

FIG. 5 illustrates the interconnections between CU-O and a device 13. The cable 90 is expanded to show all of the interconnecting lines, while cable 94 which goes to a secondary set of devices 13 is shown truncated from CU-0. In a similar manner, cable 95 which is a secondary connection of device 13 to CU-1 is shown in truncated form. Tails 56 of cable 95 indicate a daisy-chain connection to another device 11.

In cable 90, there is a first connection 30 (RDI—read data in) which includes read data in bus 40, which transfers signals read from a tape record member (not shown) in device 13 to CU-0 for detection. In data flow circuits 83, RDI 40 can be 9 bits, 18 bits, or 36 bits wide, depending upon the performance desired for transferring signals from device 13 to CU-O. A second bus BIDI 42 (BIDI—bidirectional) consists of 9 signal-pairing bearing lines, 8 of which are for data, and 1 is for parity. BIDI 42 generally has odd parity, except when alert data is sent, as later described. When an ADDRESS IN signal on line 51 of connection 31 is active during a later described initial sequence or during write operations, parity can be dispensed with. BIDI 42 is a bidirectional bus for transmission of addresses, commands, control orders, data to be recorded, status signals, alert and sense data. The character of the information being transmitted over BIDI 42 is indicated by the signals in the tag connection 31, as will become apparent. Tails 41 and 43 of buses 40-42 respectively indicate a daisy-chain connection for those buses. That is, RDI 40 and BIDI 42 go to all of the devices 13 in a primary set of devices.

When a device 13 decodes a control-type command, which requires transmission of command-modifier data; it requests such modifier data by supplying a request signal over B line 46 to the control unit 11. The control unit responds by supplying a byte of such modifier data signals over BIDI 42 and validates such signals by supplying a signal over line AO 44. Device 13 responds by capturing the BIDI 42 signals and removing the B line 46 signal. This interlocked communication continues until all modifier data is transferred.

For a decoded information-type command, device 13 supplies a byte of sense-type data to BIDI 42 and activates B line 46 indicating data signals are in BIDI 42. Control unit 11 responds by taking the data from BIDI 42 and supplying a signal over line AO 44. The interlocked communication continues until all requested data has been transmitted to control unit 11. For regular data transfers, i.e., data signals to be recorded on tape, the lines 44, 46 are timed by an oscillater (not shown) in device 13, i.e., B line 46 is timed. Control unit 11 actuation of line 44 signals are supplied in response to the B line 46 signals, hence timed by device 13.RDI 40 carries so-called analog information, i.e., the signals as recovered from a transducer are directed to CU-O wherein data flow circuits 83 do all of signal processing for extracting digital data from the readback signals.

In connection 31, CMDO (Command Out) line 47 signifies that the signals placed on BIDI 42 by CU-O are device command signals, as later described. When CMDO 47 receives an active signal during a data transfer, it means stop the data transfer presently in progress. When used to indicate a stop, CU-O supplies no signals to BIDI 42. During a sense or control transfer, a CMDO signal is sent in a response to a clock B signal on B line 46 to also indicate stop the present data transfer. Line SELO 48 carries a select-out signal to a device 13. When SELO 48 is inactive, all inbound lines, i.e., lines carrying signals from device 13 to CU-O except the BIDI 42 lines must become inactive. As soon as SELO 48 becomes inactive, any operation currently in process transferring signals over the cable 90 must be reset; operations in the device 13 continue to a normal or satisfactory stopping point. The onset of an active signal on SELO 48 indicates an initial selection sequence, as described later with respect to FIG. 6. SELO 48 carries an active signal during the entire period of time that a device 13 is selected by CU-O. SELO 48 must become inactive between successive selections, i.e., generally, successive blocks of signals being transferred between buffer 15 and a device 13. ADDRO line 49 carries an address-out tag signal from the control unit to the attached devices 13. The address of a device 13 to be selected is supplied to BIDI 42 by CU-O. All of the devices 13 respond to the ADDRO (Address Out) 49 signal to decode the address signals on BIDI 42. When a given device 13 recognizes the BIDI 42 address signal as its address signal, that device 13, and only that device 13, supplies an ADDRI (Address In) signal to CU-O over line 51. Device 13 simultaneously supplies the binary two complement set of address signals on BIDI 42 for verification by CU-O. STATI (Status In) 52 is an inbound tag line which signals CU-O that status information has been placed on BIDI 42 by the device 13 that was selected. This inbound tag line 52 is activated as described later with respect to the idealized waveforms indicating the operation of the CU-to-device interconnections.

Gap line 50 is a bidirectional tag line which carries a GAP OUT signal from CU-O to device 13 to indicate to device 13 to scan for an end to an interblock gap, i.e., a non-record area (can be erased or contain special characters or signal patterns) between successive or adjacent records on a record medium. Device 13 can supply a GAP IN signal, signifying that it is moving tape at operating speed for a data signal transfer. GAP OUT also indicates that a non-data area pattern has been detected in CU-O.

Preparatory connection 32 has three lines, two outbound lines and one inbound line. SCO (serial clock out) 53 is a line that carries signals supplied by CU-O to the attached devices 13 for timing data signals supplied by CU-O over line SDO (serial data out) 54. Devices 13 do not respond to CU-O based upon the SCO 53 signals. Rather, devices 13 only use SCO 53 signals to time detection of the signals on SDO 54. SDO 54 carries control signals from CU-O to devices 13 that are not selected, i.e., not used in connection with interconnections 30, 31. The third line, and the single input line is RPI (repositioning in) 55, is activated by device 13 command for testing the status of device 13. The purpose of the preparatory connection is to control a device 13 which is not selected for activity on interconnections 30, 31. This enables CU-O to start a device 13 to operate before a data transfer operation is required for the device 13. This tends to maximize overlap of operations between a plurality of devices. The preparatory connection 32 also enables execution of certain operations which do not require the later described microprocessor to be functioning. The preparatory connection is so simple that any errors in the transfer of a command prevents the execution of that command. Device 13 responds to such an error condition over the interconnections 30, 31 the next time it is selected by SELO 48. Device 13 then provides a unit check response to the attempted selection. Generally, the sequence of operations is that a device 13 which is about to be selected will receive an appropriate command over the preparatory connection 32. When a device 13 which is currently selected completes its operation or reaches a breaking point, then that device 13 will be deselected and the device 13 being prepared will be selected for a data transfer or other operation.

Figure 6:
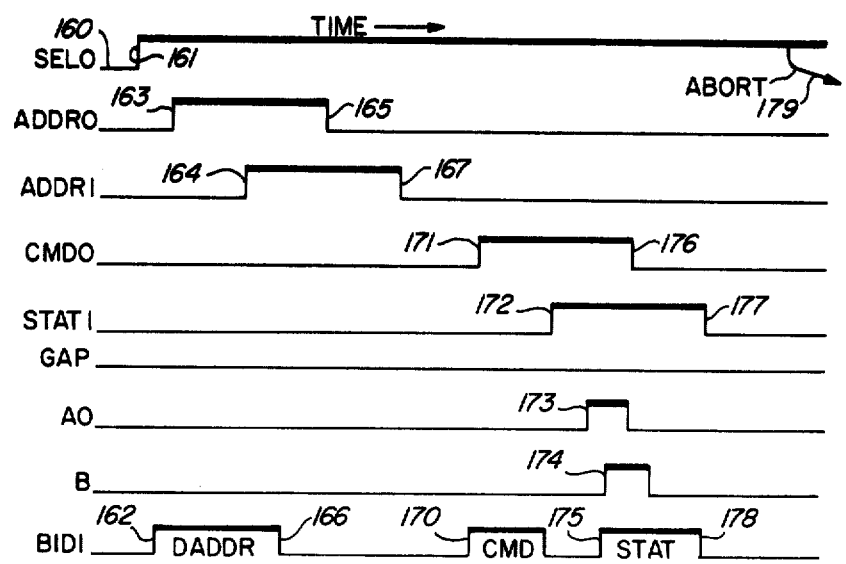
FIGS. 6 through 10 respectively show idealized signal waveforms for the interconnection of FIG. 5 respectively for initiation sequence, data transfer sequence, alert sequence, sense sequence and the control sequence.

FIG. 6 shows idealized waveforms for the connections 30, 31 relating to an initial sequence for selecting an addressed device 13. Initially, SELO 48 is inactive as at 160. To begin the sequence of selection, SELO 48 is activated at 161. Then, CU-O activates BIDI 42 at 162 by supplying address signals identifying one of the devices 13 to be selected. Immediately following activating BIDI 42, CU-O activates ADDRO 49 at 163. This address tag signifies to all of the devices 13 on a given cable that BIDI 42 contains an address signal. Each of the devices 13 decodes the BIDI 42 address signals. At 166, CU-O erases the device address signals, DADDR, from BIDI 42 so an addressed device 13 can verify address decoding. ADDRI 51 is deactivated at 167 after CU-O erased the BIDI 42 address signals at 166. One, and only one, of the devices 13 will have an address matching DADDR sent over BIDI 42. That particular device 13 responds by sending a signal over the ADDRI 51 line beginning at 164 to indicate that it is supplying the 2's complement notation of the address signal over BIDI 42.

Next, the command signal is to be supplied. CU-O initiates this sequence by activating CMDO 47 at 171 after supplying a command code permutation signals to BIDI 42 at 170. The addressed device 13 receives the command signals and decodes them in the normal course of operation. Upon a successful decoding of the command signals, device 13 will activate its STATI line 52 at 172. This action signifies to CU-O that the device 13 has decoded the command and has supplied status signals to BIDI 42. CU-O responds by sending a signal on AO 44 at 173 to send a second byte of status signals beginning at 175. These status signals are validated by the B clock line 46 being activated at 174. CU-O then removes the active signal from AO line 44 and the device 13 removes its active signal from B line 46. CU-O begins termination of the initial sequence by deactivating CMDO 47 at 176. Status-in is completely reported and the sequence is completed by device 13 deactivating STATI 52 at 177 and removing its signal from BIDI 42 at 178. In subsequent operations, SELO 48 remains active through all operations. In the event of an error, CU-O can drop SELO 48 signal for aborting the operation, such as indicated by arrow 179.

Figure 7:
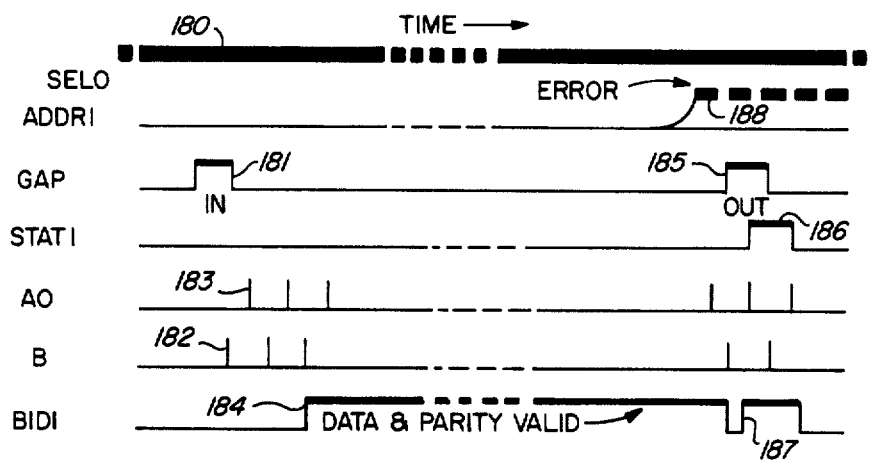

FIG. 7 illustrates idealized waveforms for effecting a data transfer which typically will follow sequences shown in FIG. 6. SELO 48 is active throughout the operation, as indicated at 180. Device 13 begins the data transfer operation for either a read or a write by sending a so-called GAP IN signal over line 50, as at 181. This action signifies to CU-O that a data transfer operation is imminent. Following the GAP IN signal, device 13 will start sending B signals 182 over line 46. CU-O responds by returning AO signals 183 over line 44. By arbitrary definition, two B signals and two AO signals are exchanged before any data is exchanged over BIDI 42. The third occurring B signal on line 46 begins the write data transfer over BIDI 42 as at 184. The write data transfer continues until CU-O has determined that a complete record or block of signals has been supplied to device 13 for recording. This action is indicated by the GAP OUT signal on line 50 occurring at 185. The GAP OUT signal immediately follows an AO signal 183. The next AO signal requests a byte of ending status signals. Device 13 responds with status signals being supplied over BIDI 42 as at 187 with the associated tag-in signal STATI at 186 being supplied over line 52. The B signal is in time coincidence with STATI at 186 to time the BIDI 42 signals. Acknowledgement is supplied by the last AO 183 signal, which is shown as time coincident with the end of STATI 186, the latter timing relationship is coincidental and not required. A device 13 can request end of data transfer by supplying an active signal 188 over ADDRI line 51 to CU-O. CU-O responds by terminating data transfer, as described.

Figure 8:
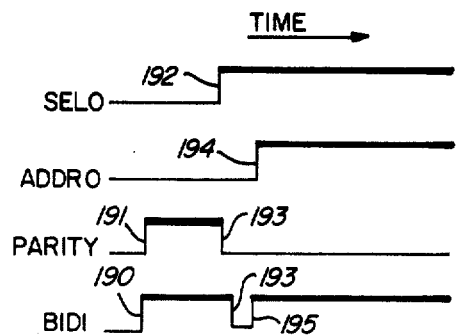

FIG. 8 illustrates the idealized waveforms for an alert sequence. That is, a device 13 is signalling the control unit for the completion of a disconnected operation (such as rewind). A status change of not-ready-to-ready (a magnetic tape loaded onto the recorder has reached beginning of tape location at the transducing station), completion; of repositioning of any kind, a manual rewind or an unload switch was activated by an operator (not shown), or later described changes to the microcode in the device 13 is needed. Once an alert has been supplied to a control unit it cannot be withdrawn until after the control unit has responded with the initial sequence described with respect to FIG. 6. The alert is considered cleared when any command has been received by the alerting device 13 over connection 30.

The alert process begins when SELO 48 is inactive. The device 13, which is doing the alerting, activates both BIDI 42 and the parity line portion of BIDI 42 at 190 and 191, respectively. The signal on the parity line need not actually correspond to parity of the device address supplied by the alerting device 13 over the data lines of BIDI 42. Further, more than one device 13 can provide an alert signal at any given instant. The control unit 11 responds to the 190-191 signals by activating SELO 48 at 192. Device 13 responds by clearing BIDI 42 of both parity and data at 193. The control unit then can respond to the alert by beginning an initial sequence, such as at 194 and 195 on ADDRO 49 and BIDI 42, respectively, which corresponds to the beginning of the initial sequence shown in FIG. 6 respectively at 163 and 162 for ADDRO and BIDI.

Figure 9:
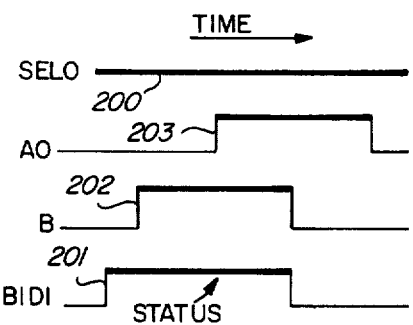

FIG. 9 shows the idealized waveforms associated with a sense command which occurs after the initial sequence waveforms of FIG. 6. SELO 48 is active as indicated at 200. The device 13 has already decoded the sense command and will supply sense (status) signals to BIDI 42 beginning at 201. Device 13 then activates B line 46 at 202. The control unit responds by activating the AO line 44 at 203. The signals are terminated as shown in FIG. 9. Following transmittal of the sense or status information, an ending sequence, as shown in FIG. 13, follows.

Figure 10:
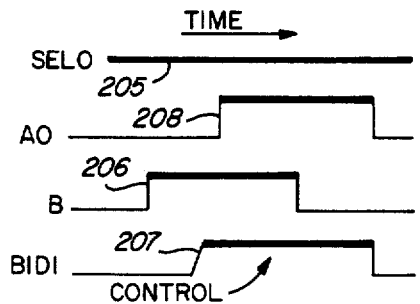

FIG. 10 shows the idealized waveforms associated with supplying control information or control data by the control unit to the addressed device 13 selected in accordance with the sequences shown in FIG. 6. SELO 48 is active all the time as at 205. The addressed device 13 requests the control data by activating B line 46 at 206. The control unit responds by supplying control-data signals to BIDI 42 at 207 and activating the AO line 44 at 208. The signals are then removed as indicated in FIG. 10. This sequence can be repeated until all bytes of the control information have been transferred as determined by either the control unit 11 or device 13 as indicated in the description of the ending sequences.

Figure 11:
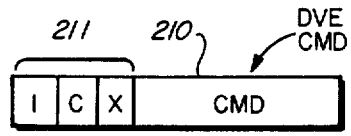
FIG. 11 shows a format of a command transmitted to a peripheral device from a control unit which indicates the character of work to be done by the associated command.

FIG. 11 illustrates the command structure used by control unit 11 to cause functions to be performed by an addressed device 13 that is sent over BIDI 42. The command code itself is in CMD 210. For an 8-bit BIDI 42 plus parity command, CMD 210 can consist of 5 binary digits. Section 211 indicates the character of the operation to be performed. There are three types of operations corresponding to the three device work queues in device operation table 136. The operation indicated in section 211 by the letter "I" corresponds to the information control sequences operations listed in the device work queue ICQ 22. In a similar manner, letter "C" denotes the control operation queued in CCQ 21. Similarly, the letter "X" in 211 corresponds to the operations listed in XQ 23. The code permutations in 210 are interpreted differently for the bits in "I", "C" or "X". The combination of the code permutations in sectons 210 and 211 determine whether any control-data signals are supplied following the transmittal of the command. Such control-data signals will be supplied in a sequence indicated in FIG. 10. A diagnostic command can be indicated by making section 211 equal to all ones or all zeros. Other variations of peripheral system 10 operations as they pertain to devices 13 can be implemented by varying the code permutations from that described above. The commands will be described later such that the interrelationship between the preparatory connection 32 and the data and control connections 30, 31 can be better understood.

Figure 12:
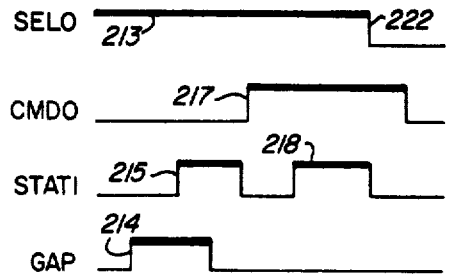
FIGS. 12 through 14 show additional idealized waveforms respectively indicating the functions of ending a transfer by the control unit, ending a sense control or locate function by a control unit, and ending a data transfer on insistence of a peripheral device.
Figure 13:
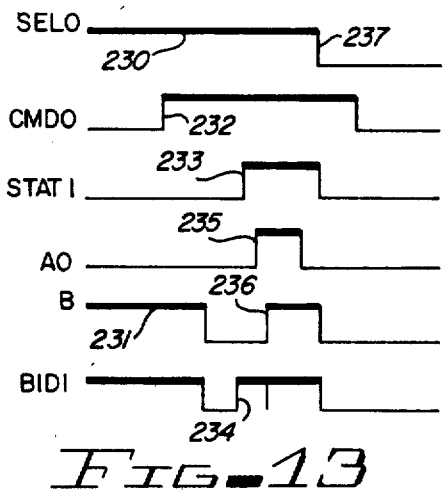
Figure 14:
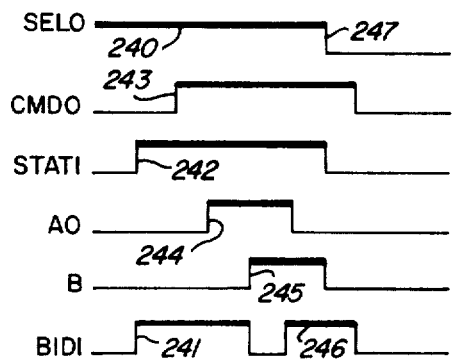

FIGS. 12, 13 and 14 show idealized waveforms for ending sequences, i.e., termination of the devices 13 selections. FIG. 12 illustrates a control unit initiated ending sequence. SELO 48 is active as indicated at 213. The last occurring B line 46 and AO line 44 pulses 182 and 183, respectively, are shown. At 214, the control unit supplies a GAP OUT signal over line 50. In response to the GAP OUT signal, the selected device 13 responds by supplying status signals to BIDI 42 at 216 and indicating same by the STATI signal on line 52 at 215. This action is followed by the control unit supplying a CMDO signal over line 47 at 217. The CMDO signal indicates to device 13 that the control unit 11 wishes to terminate the selection. Device 13 responds by supplying a second status byte at 219 over BIDI 42 and indicating same by activating STATI line 52 at 218. The control unit activates an AO signal 220 on line 44 and the device responds with a B signal 221 on line 46. The selection is terminated by the control unit 11 deactivating SELO line 48 at 222. The other signals terminate as shown. The two status bytes can be replaced by one or a greater plurality of status bytes, depending upon the peripheral system 10 design.

The ending sequence for a sense command, control sequence, and the like is shown in FIG. 13. SELO line 48 is active at 230. The device 13 supplied signal on B line 46 and BIDI 42 are active at 231. The control unit activates CMDO line 47 at 232. This action is followed by the device supplying STATI signal on line 52 at 233. Device 13 also supplies a first byte of status information over BIDI 42 at 234. The control unit 11 acknowledges the status information at 235 by sending the AO signal over line 44. Device 13 responds to the AO signal at 235 by supplying a second byte of status or sense signals to BIDI 42 and activating B line 46 at 236.

A device 13 can initiate an ending sequence, such as shown in FIG. 14. SELO line is active at 240. Device 13 places status signals on BIDI 42 as at 241. It then activates STATI line 52 at 242. The control unit 11 senses the status signals on BIDI 42 and responds by activating CMDO line 47 at 243. and the AO line 44 at 244. The AO line 44 indicates that a second status byte should be sent by device 13. Device 13 responds by supplying the second status byte signals to BIDI 42 at 246 and activating B line 46 at 245. The selection is terminated at 247 by a control unit 11 deactivating SELO line 48.

Figure 15:
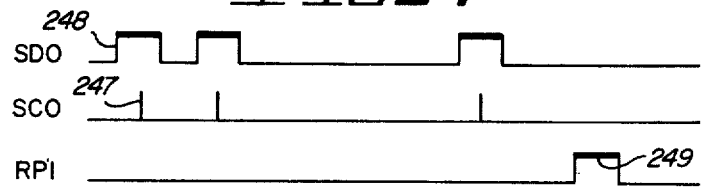
FIG. 15 shows idealized waveforms associated with a preparatory connection between a control unit and a peripheral device.
Figure 16:
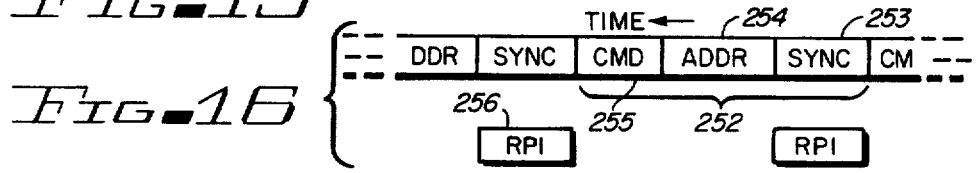
FIG. 16 shows a format and signal timing in accordance with the FIG. 15 illustrated idealized waveforms.

FIGS. 15 and 16 illustrate the preparatory connection 30 protocol and idealized waveforms. In FIG. 15 pulses 247 travel over SCO line 53 for timing all signal transfers. The absense of signal on SDO line 54 indicates binary zero data is being transferred. Any binary one data that is transferred over SDO 54 must be time-coincident and bracket the pulses 247, such as indicated by the binary 1 indicating data pulses 248. Normally, device 13 does not acknowledge command signals supplied over SDO 54. However, under certain circumstances, as later described, the RPI line 55 will receive a pulse 249 in response to a particular command supplied by control unit 11 over SDO 54. If the device 13 status is such that a pulse 249 is not supplied, then the absence of a pulse will indicate the status is absent. The format of the preparatory connection is shown in FIG. 16. Each message 252 has three portions. The first occurring portion 253 labeled SYNC indicates to the devices 13 that a message is coming over the preparatory connection 30. The SYNC field 253 consists of all binary 1 signals, i.e., a train of pulses 248. Immediately following a predetermined number of successive binary 1 signals 248 in section 253, the address of the device 13 to receive the ensuing command is supplied as section 254. All of the devices 13 decode the address and only one will realize that the ensuing command is for that device. All other devices 13 will ignore the ensuing command. The ensuing command is found in field 255. The device 13 which receives the command 255 has electronic circuitry and a microprocessor, later described, for executing the command, including performing the preparatory action for a data processing function. Under certain circumstances, device 13 responds with an RPI signal such as at 256 to indicate to the control unit 11 that certain preparatory actions are occurring. If no preparatory actions are occurring, or if the command requires no response, then action on RPI 256 is dispensed with.

Some of the commands supplied over BIDI 42 to device 13 have corresponding commands supplied over the preparatory connection 32. For example, a TEST command instructs the device 13 to supply status signals. On connection 30, such status signals are supplied, as shown in FIG. 9. On the preparatory connection 32, the RPI signal 256 constitutes the status signal. This status only indicates whether or not the addressed device 13 is repositioning tape medium or not. Other commands may be used such that RPI may indicate error status. The use of the TEST command on the preparatory connection 32 is a way for the control unit 11 to test to see whether or not the addressed device 13 is actually preparing for an ensuing data processing operation by bringing the tape record member up to recording/reproducing speeds. Another command found on both connections 30 and 32 include the read forward, read backward, and write commands. These commands are so-called motion commands, requiring that the magnetic tape record member be transported. Each of these commands also refer to a data transfer between buffer 15 and a selected device 13. The sequence of operations is to provide the data transfer-motion command first over the preparatory connection 32. This command is interpreted by the addressed device 13 to prepare for an expected data transfer operation. Accordingly, the tape record member (not shown) is transported in the forward direction for the read forward and write commands, and in the backward direction for the read backward command. These commands to the addressed device 13 occur when another device 13 has been selected for a data transfer operation. When the other device 13 is deselected, either through its own initiative or through control unit 11 action, such as described in FIGS. 12-14, then control unit 11 sends a TEST command over the preparatory bus 32. If an RPI is returned, then the addressed device 13 is ready for selection and the ensuing data transfer operation. At this time, control unit 11 selects the formerly addressed device 13 either to provide signals over bus 30 either RDI 40 or receive signals over BIDI 42.

Of course, BIDI 42 will carry a larger number of commands to a selected device 13, such as is common practice in the data processing art. Many of the commands from the control unit to devices 13 will have corresponding commands being sent from host 12 to control unit 11. Control unit 11 interprets the received peripheral commands from host 12 and generates the device commands for a device 13 indicated in the received peripheral command.

The preparatory connection 32 also has additional commands not necessarily relating to preparation of an ensuing data processing operation or data transfer. One such command is called CLAMP. Device 13 responds to a CLAMP command to place all of its signal drivers connected to any of the cables 90, 93, 94 or 95, such that no signals can be transferred from such addressed device 13 to either control unit 11. The only other command which is acceptable to such a device, that is, a device 13 that is CLAMPED, is an UNCLAMP which has to be received over the preparatory connection 32. A device 13 responds to the UNCLAMP command to reactivate all of the signal drivers for the above-listed cable connections. Another command for the preparatory interconnection is a RESETA. Each device 13 addressed by this command resets all of the electronic circuits, including a microprocessor, to a reference state.

From all of the above, it is seen that the preparatory connection 30 provides a maximal overlap of device operations for enhancing peripheral system 10 operation, as well as providing an additional signal path for controlling devices on a operation independent basis. All of the above is achieved at low cost. Further enhancement of peripheral system 10 operations is achieved by the other factors of the control unit 11, as will become apparent from a continued reading of this description.

A PERIPHERAL DEVICE

Figure 17:
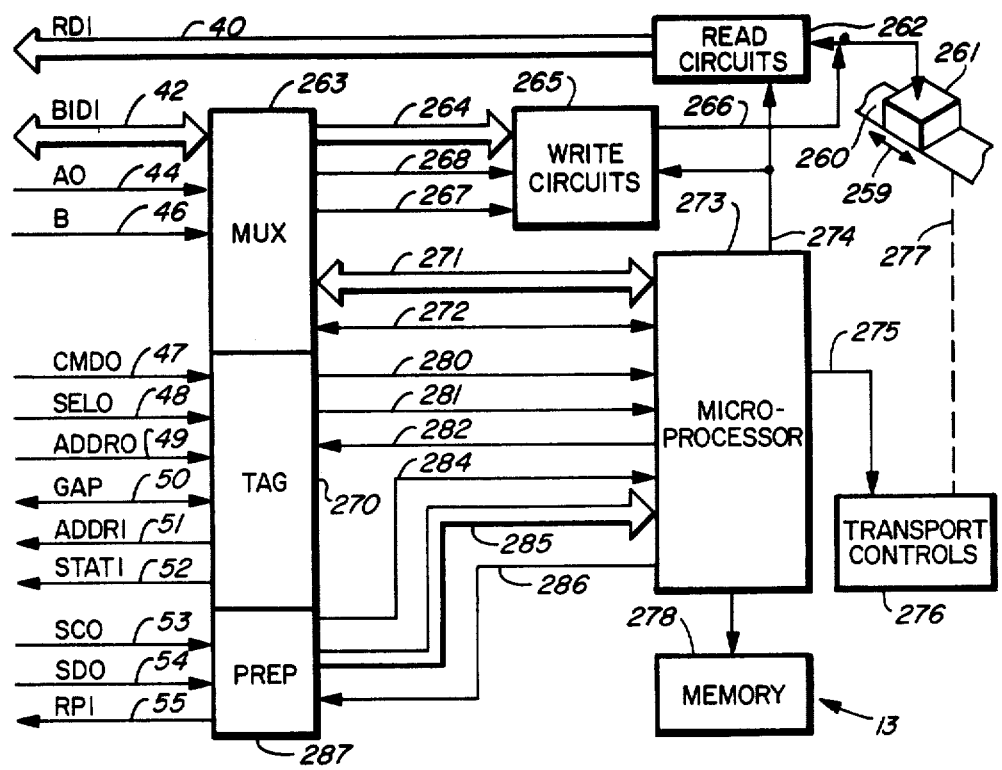
FIG. 17 is a schematic block diagram of a peripheral device constructed using the teachings of the present invention.

The peripheral devices 13 used for describing the present invention are magnetic tape recorders, such as shown in FIG. 17. The mechanical transport portion, reel-to-reel tape transport, is not shown in detail as those types of recorders are well known. A magnetic tape record member 260, preferably a ½-inch tape having a magnetic coating, is suitably transported forward and backwardly as indicated by double-headed arrow 259 past a transducer station including a transducer head assembly 261. Preferably, the transducer assembly 261 has 9, 18, 36 or 72 gaps for recording and reproducing signals on and from tape 260. The signals sensed by head assembly 261 are supplied through read circuits 262 which amplify the readback signal for transmission over RDI bus 40 to data flow circuits 83. Signals to be recorded on tape 260 are received over BIDI 42 and switched through MUX (multiplexing) circuit 263 to bus 264, thence write circuits 265 to bus 266 to transducer assembly 261. MUX circuit 263 can be any multiplexing or de-multiplexing circuit known in the electronic art. Such circuits are controlled by tag circuits 270 in response to the tag signals received over interconnection 31, such switching is performed in a usual manner. In addition to the data signals being supplied to write circuits 265, MUX circuits 263 pass the AO signal as a timing or clock signal over line 267. Further, the mode of operation, i.e., recording, is signified over line 268.

It will be remembered that BIDI 42 also transfers command signals to device 13. As shown in FIG. 17, MUX 263 switches in response to the CMDO signal on line 47 as decoded (decoding circuits not detailed) by tag circuits 270 to supply the command signals over bus 271 to microprocessor 273. Microprocessor 273 decodes the received device commands using known microcode techniques. Microprocessor 273, in general, operates the device 13 of FIG. 17. Control signals are supplied over lines 274 to write circuits 265 and read circuits 262 for indicating modes of operation, beginning of operation, and the like. Additionally, read circuits 262 supply a GAP IN indicating signal over line 274 to microprocessor 273 for relaying to control unit 11, as will be later described. Microprocessor 273 also supplies eight motion control signals over lines 275 to transport controls 276. Controls 276 are constructed in a usual reel-to-reel servo configuration. The mechanical transport of tape record member 260 is indicated by dash line 277 which diagramatically represents a reel-to-reel tape transport. Microprocessor 273 in controlling device 13 employs microcode logic modules stored in a control memory 278. These microcode logic modules are transmitted to memory 278 via BIDI 42 during initialization processes of peripheral system 10, using known data processing techniques. Alternately, said logic modules are in ROM, i.e., permanently wired into device 13.

Microprocessor 273 also communicates with the connections described with respect to FIG. 5, as indicated by line 272. Tag circuits 270 supply an interruption signal to microprocessor 273 over line 280. This signal signifies to microprocessor 273 that action is required because a SELO signal was received over line 48, for example. Further, the GAP OUT signal received over line 50 by tag circuits 270 is relayed over line 281 to microprocessor 273. This signifies to microprocessor 273 that it is the end of a record and that a second gap is to ensue. Further, line 282 carries a GAP IN signal to tag circuits 273 for relaying to control unit 11 over line 50. The preparatory connection 32 has preparatory circuits 287 that are constructed similar to the tag circuits 270 and are further described with respect to FIG. 18. An interruption signal from preparatory circuits 287 is selectively supplied over line 284 for interrupting microprocessor 273 for the purpose of executing a command received over the preparatory connection 32. Command coding supplied over bus 285 from preparatory circuits 287 to microprocessor 273 for responding to the CLAMP, UNCLAMP and RESETA commands. The RPI signal for line 55 is supplied over line 286 from microprocessor 273. RPI indicates repositioning is occurring in the device 13.

Figure 18:
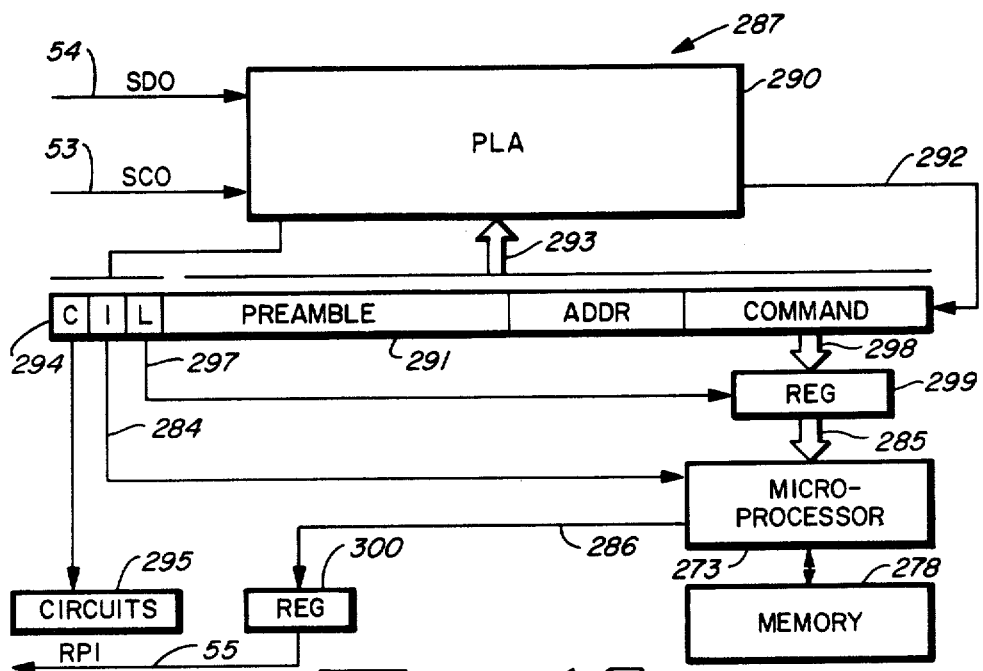
FIG. 18 shows a decoding and control circuit operatively associated with a device of FIG. 17 and receiving signals from a control unit over a preparatory connection.

FIG. 18 shows preparatory circuits 287 of device 13. A programmable logic array PLA 290 provides all of the decoding and control for preparatory circuits 287. SDO 54 and SCO 53 go directly as inputs to PLA 290. PLA 290 has an internal shift register 291, shown externally for purposes of illustration. The SDO 54 signals are supplied over line 292 in time synchronism with SCO 53 signals. Shift register 291 shifts the signals synchronously as an open-ended shift register, such that the preamble or SYNC is in the lefthand portion of shift register 291, followed by the address ADDR and command codes. All of the signals in the shift register 291 are continuously supplied to detection logic circuits of PLA 290 via bus 293. It will be remembered that this is an internal bus to PLA 290. When the preamble portion of shift register 291 has all one's, then PLA 290 knows that a complete preparatory connection message is in shift register 291. At this time, PLA 290 examines the address portion of shift register 291. If the address is for the device 13, then PLA 290 examines the command portion. If it is a command for clamping, then a control bit C 294 is set to the active condition. C supplies clamping signals to circuits 295 for preventing device 13 from activating any tag or input lines on any of the interconnection tables 90, 93, 94 or 95. Resetting bit C 294 releases the clamping action of circuits 295. The connection of circuits 295 for clamping the drivers (not shown) for the cables is dispensed with for simplicity; it is understood that clamping circuits is a well known electronic circuit technique. A second control bit resulting from decoding the commands of shift register 291 is the I bit, which supplies an interruption signal over line 284 to microprocessor 273. Similarly, the L bit of shift register 291 supplies a loading signal over line 297 for transferring the content of the command portion of shift register 291 over bus 298 to output register 299. Output register 299 then supplies a statusized command signal over bus 285 to microprocessor 273. Microprocessor 273 will strobe the contents of register 299 using known microprocessor strobe techniques. As soon as the command code of shift register 291 is tranferred to registe 299, shift register 291 then can receive the next incoming preparatory connection 32 message. The operation of PLA 290 is sufficiently fast that the command 298 can be decoded and transferred to register 299 before the next bit of a synchronization portion of a next occurring preparatory connection 32 message is received.

Microprocessor 273 in controlling the transport of tape 260 will know in its control table (not shown) whether or not tape 260 is moving, i.e., is the tape being repositioned? As long as tape 260 is being repositioned, microprocessor 273 over line 286 will momentarily set register 300 to supply the RPI signal over line 55. Register 300 can be a monostable multi-vibrator. It is understood that microprocessor 273 receives the TEST command from PLA 290 as described with respect to register 299. U.S. Pat. No. 4,302,785 shows a microprocessor controlled tape recorder which performs control of tape motions and related functions.

PRIORITY CONTROL

Figure 19:
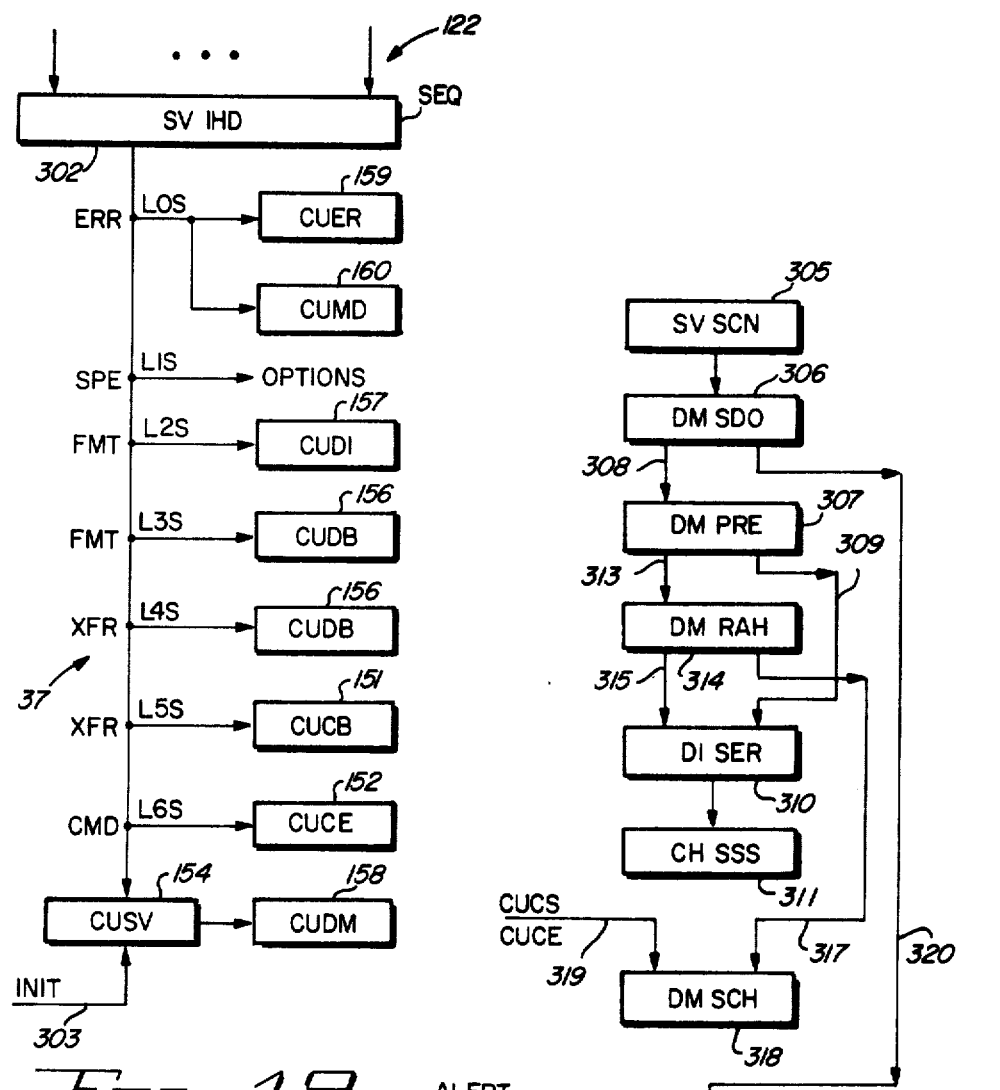
FIG. 19 shows a logic of priority interrupts of a microprocessor for effecting a priority of operations in a peripheral system.

FIG. 19 illustrates the priority of operations within peripheral system 10. In particular, FIG. 19 expands the description of item 37 of FIG. 1. The highest priority operation is to respond to interruption signals, such as received over lines 122. The usual electronic interrupt-handling circuits sort the incoming signals into the separate classes of interrupts. Microcode logic module SV IHD 302 enables microprocessor 110 to respond to the sorted interruption signals for enabling interruption scans for determining the cause of the interrupt signal. SV IHD 302 corresponds to SEQ of 37. Logic module SV IHD 302 is a portion of microcode logic modules CUSV 154 which also include the lowest order priority of operation within peripheral system 10. Following the analysis of the interrupt, the highest priority of operation within peripheral system 10 is to handle error conditions and maintenance procedures respectively by microcode logic modules contained in group CUER 15 and CUMD 160. These two groups operate at the zero or highest level of interrupt scan labeled LOS. The second level is the so-called option level SPE and labeled L1S. The options are determined by setting time-out timers (not shown) of usual design such that when the time-out timers time-out, an interrupt signal on line 122 is supplied for activating SV IHD 302 is a known manner. Various device and control unit functions including interconnection functions can be timed in this level of operational control. The third level of operational control is L2S which relates to certain tape record format (FMT) functions, such as beginning of block and tape mark detection. These functions are handled in the group of logic modules called CUDI 157. The fourth level also is related to format, but concerns the transfer of data signals. L3S, the fourth level, is generally associated with the group of logic modules CUDB 156 which relate to the measurement and generation of interblock gaps, previously mentioned. The fifth and sixth levels of operational priority are the L4S and L5S levels which relate to actual transfer of data signals. The L4S level relates to group of microcode logic modules CUDB 156, which relates to the transfer of data signals between a device 13 and buffer 15. The sixth level L5S relates to the transfer of data signals between buffer 15 and a channel (not shown) of host 15 as handled through a group of logic modules CUCB 151. If the device 13 data rates were higher than the channel data rates, then L4S and L5S functions could be reversed. The seventh level relates to command execution preparation handled through CUCE 152 as level L6S. The lowest or eighth level relates to scanning functions, and other ancillary functions necessary to the successful operation of peripheral system 10. For example, device management handled through CUDM 158 is in the eighth level. Such device management includes allocation of buffer space through CUBM 150, as well as transfer of device assignments between control units 11 through portions of CUDM 158. The idle scan or scanning for work by microprocessor 110 occurs in CUSV 154. Initialization of the control unit 11 is by a start bus (not shown) which supplies a start signal over line 303, labeled INIT, which initiates the initialization of control unit 11 and hence, peripheral system 10. Included in the initialization is the transfer of microcode from control unit 11 to the devices 13 for use by their microprocessors 273. Such microcode is stored in their respective memories 278.

DEVICE COMMUNICATION CONTROL

Figure 20:
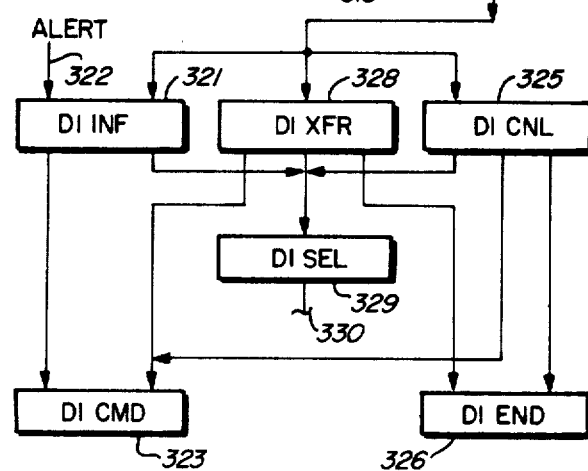
FIG. 20 shows a series of logic modules in a control unit for activating a preparatory connection or a data transfer connection between a control unit and its attached peripheral devices.

FIG. 20 illustrates the interrelationship with a plurality of microcode logic modules used in describing the invention as it is practiced in the FIGS. 1 and 2 illustrated peripheral system 10. Many of the logic modules are in CUDM 158, the eighth level of priority of operations. Logic module SV SCN 305 constitutes an idle scan within microprocessor 110. In looking for jobs to do for peripheral system 10 after all of the higher priority work has been achieved which maximizes efficiency of peripheral system 10, microprocessor 110 from SV SCN 305 will check to see if a device operation should be scheduled, i.e., scheduled in the device work queues of DOT 136. To schedule a device 13 operation, microprocessor 110 responds to DM SDO 306 to determine the priority of the requests for device activity relative to other device activity requests waiting to be done as identified in the three device work queues 21-23 of DOT 136. As soon as the device requests are analyzed, the request for device activity will be placed in DOT 136 in one of the three queues 21, 22 or 23. Results of these functions will be that a device operation has been queued for starting, a device operation is not queued because a corresponding entry in the queue already exists, or an invalid request has been made. The generation of a request for device activity can be the result of a command execution, or examination of a most-recently used list of buffer 15 segments 16 for transferring data signals between buffer 15 and a corresponding device 13. Other sources of activity may also be provided.

If a data transfer operation is to occur, then a device 13 should be prepared via the preparatory connection 32. This preparation is achieved via logic module DM PRE 307 via input line 308. Microprocessor 110, when responding to DM PRE 307, looks for device operations identified in the data transfer queue XQ 23 of DOT 136 for supplying commands over the preparatory connection 32 or to find a device for a read-ahead operation or to perform a buffered-write operation to a device 13. Read-ahead constitutes transfer of data signals from a device 13 to a buffer 15 independent of host 12 operation, but based upon the recent usage of the segment 16 assigned to the corresponding device 13. The latter operations are the frequency of channel to buffer transfers for the segments 16. The same procedure is followed for recording signals on tape. Generally, this logic module will not be used unless there is no device from the XQ 23 that has been selected on connections 30, 31. Assuming that a preparatory operation is to be performed, microprocessor 110 exits from DM PRE 307 over line 309 to activate logic module DI SER 310. The latter logic module is in CUDI 157. This fact does not mean that the operation is at level L2S as shown in FIG. 19. Microprocessor 110, in responding to logic module DI SER 310, determines if the preparatory connection 32 is available, i.e., the other control unit 11 may be using the preparatory connection. If the connection 32 is available, then commands are supplied to an addressed device 13 without selecting it via connection 31. From this logic module, microprocessor 110 will determine whether or not a device 13 has started preparatory action for a data transfer, is currently repositioning, i.e., already was started, there is an error condition, or the preparatory connection 32 was not available. Assuming that the addressed device 13 was started, then via logic module CH SSS 311 microprocessor 110 updates the status in status store 100 using known memory recording techniques for indicating the addressed device 13 is being started.

Additionally, DM PRE 307 may result in microprocessor 110 initiating a read ahead operation by following path 313 to logic module DM RAH 314. Microprocessor 110, when executing DM RAH 314, searches the above-mentioned MRU lists (not shown) for buffer 15 segments 16 channel transfer operations to perform either a data transfer from a device 13 to buffer 15 or from buffer 15 to a device 13. Accessing logic module DM RAH 314 means that no device 13 must be in a preparatory phase, i.e., a device 13 must be identified for preparatory action. If such a device is identified, then microprocessor 110 follows path 315 to logic module DI SER 310 for preparing a device for later data transfer functions.

Microprocessor 110 also uses logic module DM SDO 306 for selecting a device over connections 30, 31. This selection is achieved only after the above-described functions are usually performed in connection with the preparatory connection 32. If that function had failed, then the peripheral system 10 will wait for the device 13 being selected to reach operating speed before the data processing operation occurs. This is a backup phase of peripheral system 10; however, no or very little device overlap occurs during this backup or degraded mode. From DM SDO 306 microprocessor follows path 320 to activate one of the three logic modules DI INF 321, DI CNL 325 or DI XFR 328. Logic module DI INF 321 is activated for an information transfer sequence whenever a device operation was queued in ICQ 22. DI INF 321 may be activated by microprocessor 110 in response to an alert signal received from a device 13, as indicated in FIG. 20 by line 322. It is to be understood that other logic modules will be involved in this latter operation between the connection 31 and logic module DI INF 321.

However, since the handling of alert or interrupt signals is well known, it is not further described for that reason. One of the purposes of DI INF 321 is to issue a command to a device 13. If no device 13 is currently selected, then DI CMD 323 enables microprocessor 110 to issue a device command to a device 13 over BIDI 42. It is noted that the device 13 must be selected as described with respect to FIGS. 6, et seq. If the desired device 13 is not already selected, then microprocessor 110 from DI INF 321 selects the desired device 13 via logic module DI SEL 329 which results in the usual subsequent data processing actions indicated by numeral 330.

DI CNL 325 results in a control code being sent to a device 13. A command is issued over BIDI 42 with data bytes which modify the command, i.e., control data. These signals pass through device adaptor 85 so-called DCB register, as described later with respect to FIG. 21. This action requires selection of the device via DI SEL 329. Completion of the control command results in activating logic module DI END 326.

Data transfers between devices 13 and buffer 15 are also handled through this procedure by activating logic module DI XFR 328. The activation of this logic module corresponds to having devices identified in XO 23. Selection of the device is made through the connections 30, 31 via logic module DI SEL 329 which enables microprocessor 110 to supply the appropriate control signals to the device adaptors 85. All of the important logic modules are described in detail later in the description.

DEVICE ADAPTOR

FIG. 21 shows a device adaptor 85 in simplified diagramatic form. Communication with microprocessor 110 is via external registers XR 118. Addressing of the registers 337–346 within device adaptor 85 is via address decoder 335, which receives addresses from microprocessor 110. The external register 118 is coupled to all of the registers 337 through 346 of device adaptor 85 via bidirectional bus 336. Register 337 is a device interrupt register which receives the interruption signals from the devices as described above. In FIG. 21, device selection is indicated by AND circuits 350 selectively gating the ADDRI signal on line 51 whenever the SELO 48 signal is inactive. There is one AND circuit 350 for each of the devices and accordingly, there is one bit position in DIR 337 for each of the devices. DCB 338 handles the control or status information incoming from a device 13 for use by microprocessor 110. DSE 339 is a device status error register which contains field replacable units. Error indicating data includes the RPI signal and error related information. DCR 340 is a device control register which activates a logic gating circuit represented by numerals 347 and 348, the details of which are not pertinent to the present invention and which are known in the data processing art. DSR 341 and DSC 342 contain information over the preparatory connection 32 and as received by the circuits shown in FIG. 18, particularly register 294. DTR 343 is a device tag register connected to connection 31, while DTR 344 is a device tag register for outbound tags. ITC 345 contains time-out timers related to interconnection operations. These time-outs are mainly for error detection, i.e., device 13 does not respond. DCB 346 corresponds to DCB 338, but is in the outbound direction for transferring the command modifier or control data from microprocessor 110 to a selected device 13 or circuits 351 (FIG. 21) combine the outputs of DCB 346 with the output signals from data flow 83 onto BIDI 42. BIDI 42 is also connected through the gating circuits to DCB 338, DIR 337 and DTR 343, 344. RDI 40 goes directly to data flow circuits 83. For sequencing all of the above operations pursuant to the tag sequences shown in the FIGS. 6 through 10 with the idealized waveforms is performed by sequencer 352 using known data processing techniques. The details of this sequencing can be determined from examination of the idealized waveforms.

Figure 22:
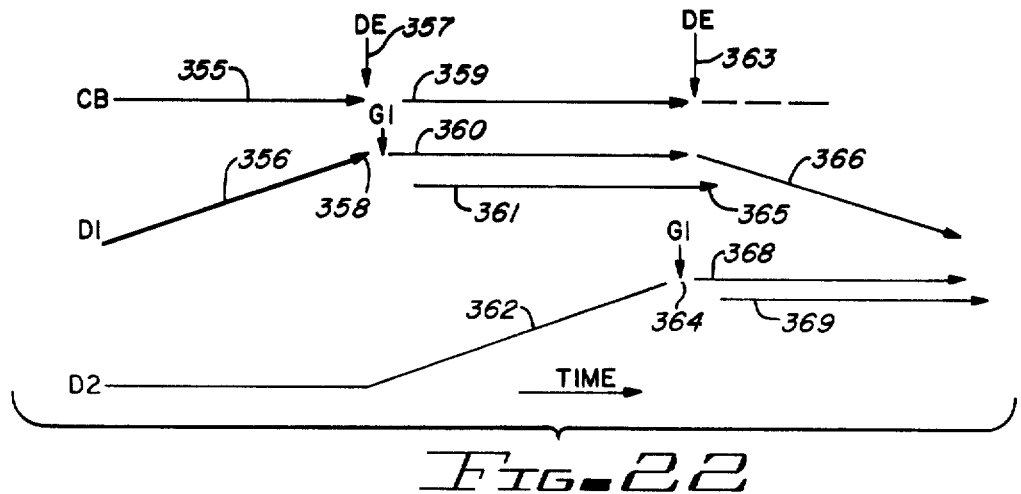
FIG. 22 is a timing diagram illustrating overlapped device operation.

FIG. 22 is an operations indicating diagram showing overlapped operations of a plurality of devices 13 in peripheral system 10. The upper line CB indicates channel-to-buffer transfers, the second line D1 indicates transfers between buffer 15 and a device 13, while the third line D2 indicates transfers between buffer 15 and device 13 labeled D2. A write operation is assumed. At 355, data is being transferred to buffer 15 for use by a device D1. Simultaneous to that transfer, a device D1 is accelerating its tape record member, as indicated by arrow 356. Upon completion of the channel-to-buffer transfer 355, a device end DE is given at 357. This DE indicates to the writing host that peripheral system 10 has completed the recording operation, while in fact, the data only is in buffer 15. At 358, the device 13 D1 gives a GAP IN (GI) indicating to control unit 11 that it is desired for device D1 to receive data from the buffer 15. This ensuing data transfer is indicated by a numeral 360. Simultaneous to the transfer from buffer 15 to device D1, data is additionally being transferred from the channel to the buffer 15 at 359 for use by D2. The recording operation represented by arrow 360 is checked by a read-after-write (RAW) 361. Since in a two gap per track transducer, a write gap usually precedes a read gap by a so-called and well known intergap spacing, the read-after-write 361 begins sometime after the recording operation begins. Simultaneous to the recording operations 360, 361 and the channel-to-buffer 15 transfer 359. Device D2 begins accelerating at 362. Since device D1 has been selected for data transfer 360, control unit 11 accesses device D2 over the preparatory connection 32 by addressing the device D2 and supplying it a command WRITE. At 363, the channel-to-buffer 15 transfer for D2 has been completed and a device end DE is given to the host. The arrow 360 recording operation stops before 364. Device D1 is deselected. At 365, the read-after-write operation 361 is completed. At 364, device D2 supplies a GI signal indicating it is ready to record signals. Then, at 366, D1 decelerates to a stop-lock position. D2 begins receiving data from buffer 15 at 368 with a read-after-write check at 369. Various permutations in the timing can be employed while practicing the present invention; the main point of FIG. 22 is to show there is a maximal overlap between the receipt of data signals by buffer 15. The transfer of data signals from buffer 15 to a first device 13 with simultaneous actuation of a second device D2 for it to prepare for an ensuing data operation. Accordingly, it is seen in FIG. 22, there are three levels of overlap; the channel-to-buffer transfer, the buffer-to-device transfer, and the device preparatory actions. This procedure is advantageous when the burst or maximal data signal transfer rate between a host 12 and buffer 15 is greater than the corresponding transfer rate between buffer 15 and any device 13.

FIG. 23 illustrates a channel adaptor CAA 80. All other channel adaptors are identically constructed. The major components of the illustrated channel adaptor include a channel adaptor memory CAM 370 and a plurality of programmable logic array (PLAs). A first PLA 371 provides for internal communication (IC), such as communication with microprocessor 110 via connection 103 and the major components of CAA 80. The second PLA 372 is a tag control (TC) PLA which provides tag synchronization in accordance with U.S. Pat. No. 3,400,371 with input/output channel 14 and also communicates over interconnections 81 and 96 which are internal to control unit 11. Communications with various elements of control unit 11 from CAA 80 are via the external register 118 to MP 110, register 373 which staticizes signals received from and supplies signals to input/output interface 14 and exchange registers 374, 375 which provide a buffer function with respect to interconnections 81 and 96. The last two PLAs 376 and 377 respectively are for generating status signals (ST), such as supplied during status in time of U.S. Pat. No. 3,400,371, and for internal sequencing (SEQ) of CAA 80.

A primary function of CAA 80 is to provide communications with a host 12 via input/output interface 14 which includes receiving signals via CBO 16, supplying signals over channel bus in (CBI) 380 and exchanging tag or control signals respectively over channel tag out (CTO) 381 and channel tag in (CTI) 382 cables via register 373. Internal CBO 384 is a logical continuation of CBO 16 extending it to buffer registers 374, 375 and to PLA 377 via AND-OR (AO) circuits 385. PLA 377 includes circuit components of a command decoder 383. The A2 input portion of AO 385 is gated by the CMDO tag signal received from a host 12 over line 381-1 which is a part of CTO 381. PLA 377 supplies data output signals, decoded command signals and the like over cable 387 for storage in CAM 370 and for transmittal to other portions of contol unit 11 via registers 374, 375 and supplies certain control data signals to host 12 via input/output channel 14. Cable 388 carries address signals for accessing registers within CAM 370. These address signals are generated in PLA 377, PLA 376, or transmitted via PLA 371 as received from microprocessor 110.

CTO 381 is logically connected to an internal CTO bus 390 which extends to registers 374, 375 for exchanging tag control signals with the respective data flow circuits 83 of the two control units 11 and to PLA 372 for synchronization of CAA 80 with host 12 tag signals during selection/deselection and status reporting times. It is a usual procedure for a channel adaptor 80 to provide tag synchronization with the host 12 during these times while the data flow circuits 83 and other automatic circuits (not shown) provide a tag sequencing such as SERVICE IN, SERVICE OUT during data transfer times without involving the channel adaptor 80 control circuits. PLA 372 provides tag derived sequencing and control signals and supplies same over cable 391 to PLA 376 for sending status signals to input/output channel 14. Additionally, it should be understood, because of the complex functions of CAA 80, PLA 372 also has additional inputs not pertinent to an understanding of the present invention, all as indicated by truncated arrow 393 with additional outputs indicated by arrow 392. Similar to internal CTO 390, CAA 80 has an internal CTI 394 which is logically connected to CTI 382. Registers 374, 375 are connected to CTI 382. Registers 374, 375 are connected to internal bus 394 for supplying internal CTI signals from the respective data flow circuits 83 of control units 11.

Bus 396 extending from register 398, connected to the output of AO 397, is the internal CBI which is logically connected to CBI 380. Registers 374, 375 also provide signals to internal CBI 396. AO 397 has register 398 for statusizing its output for supplying electrical signals to internal CBI 396. AO 397 receives data signals, which can be control data signals, over cable 399 from CAM 370 via A-1 input portion. In a similar manner, the A-2 input portion receives similar signals from PLA 377. Control of AO 397 is via inputs 400 which are derived from tag signals via PLA 372, derived from microprocessor 110 via PLA 377 all in a timed sequence enabling CAA to accomplish the procedures set forth in U.S. Pat. No. 3,400,371.

Registers 374, 375, which connect respectively to the data flow circuits 83 of the control units CU-0 and CU-1, have bidirectional buses 403 and 404, respectively, which are timed and sequenced by tag control signals on bidirectional tag lines 405 and 406. All sequencing is generally in accordance with the teaching of U.S. Pat. No. 3,400,371 and as otherwise well-known in the data processing art.

The input and output connections of CAM 370 include a data bus 410 extending from PLA 371 which is a logical extension of microprocessor 110 bus 120 using external register 118. Other data inputs to CAM 370 are from AO circuits 411 which receive data signals from PLA 371 via its A1 input portion as controlled by signals received over line 413 also connected to PLA 371 (connection now shown). Additionally, the A2 input portion of A0 circuits 411 (also termed A0 411) gates the signals from bus 387 which carries the signals generated by PLA 377 as gated by the control signals on line 414 from PLA 377. The output signals of A0 411 go over bus 415 to CAM 370. The output signals of CAM 370 are carried over bus 399 to previously described A0 circuits 397. Bus 399 also extends to PLA 371 such that its output signals can be relayed to microprocessor 110 via external register 118. Bus 399 signals are transferred via A0 circuits 397 to previously described A0 circuits 385 wherein the A1 input portion gates the bus 399 signals under control of a timing-control signal on line 417 received from PLA 377.

For status generation, PLA 376 receives input signals over bus 420 from A0 circuits 421. The A1 input portion of A0 421 is controlled by signals on line 422 received from PLA 377 (connection not shown) for gating the signals on bus 399 to PLA 376. Additionally, the A2 input portion is gated on by the signals on line 424 received from PLA 377 to gate the signals on bus 423 carried from external register 118. The purpose of this connection is to transfer microprocessor 110 generated status signals to PLA 376. Additionally, PLA 376 receives signals over bus 425 from external register 118 which are ordered and controlled by microprocessor 110 and not subject to selective gating by PLA 377. PLA 376 in order to provide all of the interfacing and control status related functions of CAA 80 requires connections not pertinent to an understanding of the general operation of CAA 80 for the present invention, these additional functions are indicated by the two arrows 426 and 427 respectively indicating additional input and outputs on PLA 376.

PLA 377 is the sequence control for CAA 80. It has an output line 430 extending from PLA 377 to the input of PLA 376. PLA 376 notes the signal on line 430 for generating UNIT CHECK status via encoder 436, which is embodied in PLA 376. Additionally, PLA 376 supplies channel command retry (CCR) signals over line 435 to PLA 372 for relaying to input/output channel 14. Returning to PLA 377, it will be appreciated with all of the complicated elements of CAA 80 that sequencing PLAs will have a multitude of connections many of which are not necessary to an understanding of the general arrangement or the present invention. Accordingly, arrows 431, 432 respectively indicate additional inputs and outputs of sequence control PLA 377.

PLA 371 has a multitude of connections to microprocessor 110 as indicated by numeral 103. Address signals are exchanged over bus 441 and a clock signals over bus 442, which are beyond the scope of the present description. External register select lines 117 extend from local store 114 of FIG. 3 for selecting external register 118 to gate the signals flowing between microprocessor 110 and CAA 80. The signals of clock bus 442 are logically extended to internal bus 443 which form an input to PLA 371. Additional connections to external register 118 are via buses 444, 445 which respectively carry REQUEST IN signals to microprocessor 110 as well as data signals. In other words, PLA 371 relays signals read from CAM 370 as requested by microprocessor 110 through external register 118.

Shown in CAM 370 are registers for memorizing status of the host 12 to control unit 11 connection. For example CMD 455 stores the bit pattern received over input/output channel 14 which constitutes the command byte of an input/output command. DADDR register 456 stores the device address immediately preceding the command signals stored in register 455 and identifies which device 13 is being addressed by host 12.

Channel adaptor 80 detects received commands and end of chain signals and supplies an interruption signal to microprocessor 110 over line 122-6, i.e., level 6 of the interruption scheme as mentioned with respect to FIGS. 3 and 19. PLA 377 supplies the interruption signal over line 122-6 after decoder DEC 383 has decoded the received command. Following this interruption signal, microprocessor 110 accesses CAM 370 of channel adaptor 80 for fetching the decoded command and any other control data associated with the decoded command. PLA 372 detects the end of a chain and supplies an interruption signal to microprocessor 110.

PLA 372 includes a chaining latch 447 (CHN) which indicates a chaining condition for the operation occurring between a host 12 and peripheral system 10. The chaining condition is initiated at the end of the first command of the chain of commands pursuant to OEMI, supra (Background of Invention). In this regard AND circuit 448 sets CHN 447 to the active or chaining indicating condition in response to a channel end signal on line 449 generated in the usual manner, a status end signal received over line 450 and generated in the usual manner and a SUPPRESS OUT signal from host 12 received over line 451 via CTI 381. In a similar manner AND circuit 452 detects the end of a chain for setting CHN 447 to the inactive condition. Further, AND circuit 452 supplies an interruption signal over line 122-6 to signify to microprocessor 110 that a command level operation is occurring between host 12 and peripheral system 10. AND circuit 452 responds to the lines 449 and 450 signals plus a SUPPRESS OUT=0 signal on line 453 to reset CHN 447. That is, the chaining condition between peripheral system 10 and host 12 is determined at the end of a command execution which is signified at CHANNEL END time and with STATUS IN being supplied over channel tags in bus 380.

CONTROL UNIT TABLES

Figure 24:
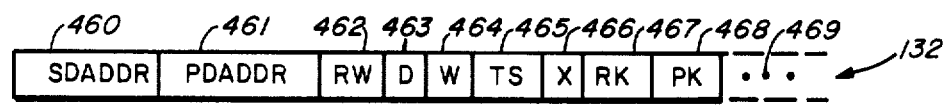
FIG. 24 is a diagrammatic showing of a selected device table of the FIG. 2 illustrated control unit.
Figure 25:
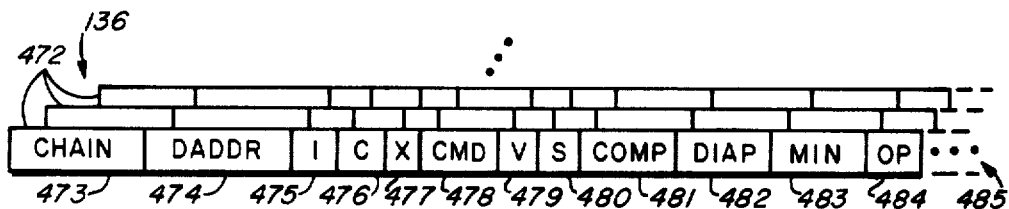
FIG. 25 is a diagrammatic showing of a device operations table used in the FIG. 2 illustrated control unit.
Figure 26:
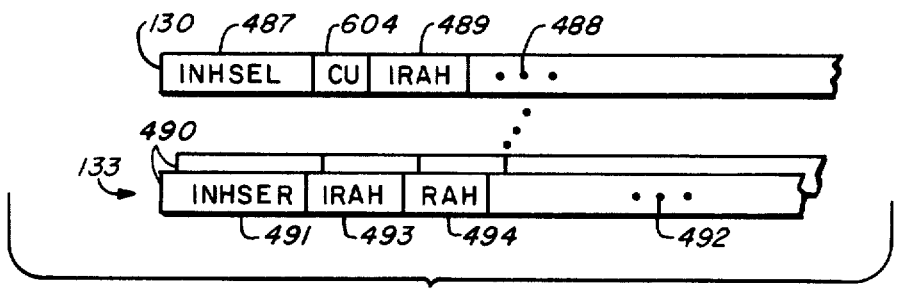
FIG. 26 is a diagramatic showing of a control unit table and a logical device table of the FIG. 2 illustrated control unit.

FIGS. 24-26 are partial diagramatic showings of four tables identified in FIG. 4. These four tables are those tables and portions thereof necessary for an understanding for practicing the present invention in the illustrated embodiment. FIG. 24 partially illustrates a selected device table SDT 132. SDT 132 is a single register containing several bytes of data. Section SDADDR 460 indicates the address of the currently selected device 13; that is, device 13 communicates with a control unit 11 over a connection 30, 31. PDADDR section 461 contains the address of the device 13 which is being prepared for selection as over the preparatory connection 32. When PDADDR section 461 contains the address of a device 13, microprocessor 110 in a control unit 11 will know that another device need not be prepared. RW section 462 indicates whether the operation currently being conducted with the selected device 13 identified in SDADDR section 460 is a read operation or a write operation. D section 463 indicates the direction of relative tape motion, i.e., forward or backward. W section 464 is set to the active condition whenever an entry is made in XQ 23 of DOT 136; in other words, a data processing operation has been scheduled and is waiting completion of an operation being conducted with respect to the device 13 indicated in SDADDR section 460. TS section 465 indicates that the selection of the present device 13 will be terminated at the end of the next record being transferred. This control occurs in either read or write operations. This control bit prevents an extended operation occurring between a given device 13 and a given host 12 from degrading the performance of peripheral system 10 for a plurality of hosts 12. X section 466 indicates that some device 13 is currently transferring data signals with buffer 15. RK section 467 indicates the number of records to be processed in the current device 13 selection. Usually, this is a minimum number of records to transfer, i.e., once a tape recorder has started transporting tape, it is desired to keep that transport going for a minimum period of time, i.e., a minimum number of records. This selection enhances throughput of the peripheral system 10. PK section 468 indicates the number of records processed so far during the current device selection. Whenever PK has a number greater than RK, then transfer will continue only if W 464 is inactive, i.e., there is no operation waiting. Ellipsis 469 indicates the SDT 132 has other control data used in connection with operating a selected device, such data not being pertinent to practicing the present invention.

FIG. 25 illustrates, in abbreviated form, DOT 136. This table has a plurality of registers 472, one register for each logical device in the peripheral system 10. A logical device is the combination of a buffer segment 16 and the device 13. The combination of the two is treated as a single logical entity. Chain section 473 contains the pointer to registers 472 for the three device work queues 21, 22 and 23. Work registers (not shown) contain initial pointer to the first entry of the respective queue, i.e., there are three work registers pointing to three registers 472. The first register 472 in each of the three queues 21, 22 and 23 will point to the respective second register in that queue, the second register in turn points to a third respective register, and so forth. DADDR section 474 identifies the device 13 associated with the register 472. DADDR 474 represents a logical device which has the same address as a physical device. 13. I section 475 indicates a device information sequence operation. C section 576 indicates a control sequence operation. X section 477 indicates data transfer is to be retained in the buffer, i.e., it is a read operation, as opposed to a control operation or a tape mark. CMD section 478 contains the code permutations for a device command code. These code permutations are for the commands being transferred from the control unit 11 to an addressed device 13. These code permutations are not necessarily the same code permutations for corresponding peripheral commands transferred from a host 12 to a control unit 11. V bit 479, when active, indicates the device 13 indicated in DADDR 474 is waiting to execute an operation. If V bit 479 is not active, then the other portions of that register 472 are not valid. S bit 480 indicates that a device operation has started over a connection 30, 31. COMP (complete) bit 481, when active, indicates a device operation has been completed. DIAP section 482 is the control store 111 address of a data area for control and information sequences (DIA pointer). This corresponds to DIA 139 of FIG. 4. MIN section 483 indicates the minimum number of records that have to be processed in a given buffer 15 to device 13 data transfer operation. For non-data transfer operations, such as space operations where a certain number of records are spaced over, MIN section 483 indicates the number of records to be skipped by transporting tape past the transducer station of device 13. OP 484 when set to unity indicates that no device 13 operation has been scheduled. Ellipsis 485 indicates other sections of DOT 136 not pertinent to the present description.

FIG. 26 shows CUT 130 and LDT 133 in abbreviated diagramatic form. CUT 130 is but a single register indicating the status and control data for a given control unit 11. Insofar as the present invention is concerned, the only portion pertinent in the INHSEL bit 487 which inhibits the given control unit from selecting any device 13. Ellipsis 488 indicates the numerous other data areas of CUT 130 not pertinent to an understanding of the present invention. CU 604 indicates whether there is one or two control units in peripheral system 10. IRAH 489 when set inhibits read ahead operations by the control unit.

LDT 133 includes a plurality of registers 490, one register for each logical device. Included in the registers, but not shown, is a DADDR section. Of interest to the present invention is INHSER bit 491, which inhibits the use of the preparatory connection 32 for the logical device identified in the corresponding register. Ellipsis 492 represents other sections of LDT 133. IRAH 493 when set inhibits read ahead for the respective device 13 while RAH 494 when set indicates that a read ahead operation is in progress.

The four described tables as well as the other tables shown in FIG. 4 store control-data signals for use by the later described operations performed by microprocessor 110 following the next described logic modules, which are microcode modules. As such, all of the tables provide an operational tie-in such that all of the logic modules will, when executed by microprocessor 110, co-act as a single coherent logical structure for performing peripheral system 10 operations.

STARTING DEVICE OPERATIONS

Figure 27:
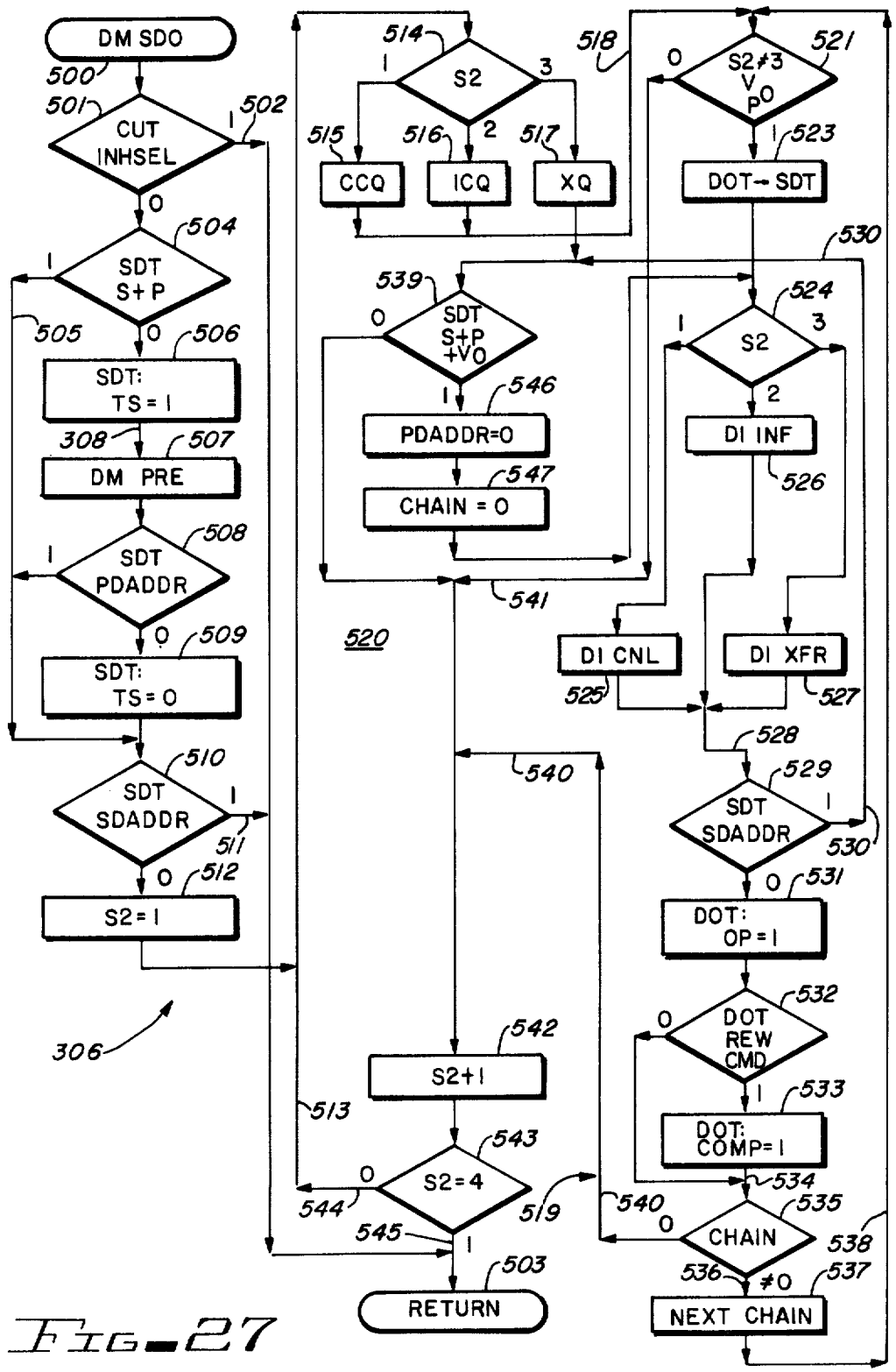
FIG. 27 is a detailed logic flow chart of a logic module used to start device operations.

FIG. 27 illustrates the detail logic of logic module DM SDO 306 which is used by microprocessor 110 to schedule or start a device operation as scheduled in one of the three device work queues of DOT 136. Microprocessor 110 activates logic module 306 at 500 and as indicated in FIG. 20. At 501, microprocessor 110 examines CUT 130 section INHSER 491 to determine whether or not the control unit is inhibited from selecting any device. Such inhibition may be for diagnostic or error recovery purposes. If selection of a device is inhibited, no further action can be taken; microprocessor 110 then follows path 502 to return 503 for returning to a logic module SV SCN 305 (FIG. 20). During normal operations, selection is not inhibited. Accordingly, microprocessor at 504 examines SDADDR section 460 and PDADDR section 461. Further and with respect to SDADDR 460, microprocessor examines a time-out timer (not shown) which would indicate that the device 13 selection was recent. Accordingly, in symbol 504 the letter S indicates a device 13 selection that was recent, while the letter P indicates a device 13 being prepared for selection. If either of these above conditions are met, then another device 13 should not be prepared for data processing at this time. That is, for a recent selection, time should be allowed for the selected device 13 to perform its data transfer functions. Accordingly, microprocessor 110 follows path 505 to some later described steps. If neither of the above described conditions S or P were satisfied, then at 506, SDT 132 is accessed to set TS bit 465 to unity. It will be remembered that TS 465 when active indicates that the present selection of a device 13 is to be terminated at the end of the next record being transferred. This is a preparatory step subject to revision based upon the microprocessor 110 activity in connection with logic module DM PRE 307 as activated at 507 via line 308 which corresponds to line 308 of FIG. 20. DM PRE 307 is described later with respect to FIG. 28. Microprocessor 110 in following logic module DM PRE 308 sets up a device 13 for preparatory actions.

Completion of an attempted preparatory action by microprocessor 110 following logic module DM PRE 308, microprocessor 110 at 508 examines the result of that attempt. If a device 13 preparation was initiated, then the address of that device 13 is stored in section PDADDR 461 of SDT 132. Accordingly, at 508 microprocessor 110 examines section 461. If there is an address in section 461, then path 505 is followed to later described step 510. If no device was prepared, than at 509, SDT 132 is accessed and TS bit 465 is reset to zero. Resetting TS bit 465 indicates to the control unit 11 that any presently selected device 13 need not terminate its data transfer operation at the end of the next record because no other device 13 is currently being prepared for a data transfer operation.

Path 505 and exit of step 509 are joined at step 510 wherein SDT 132 is accessed to determine if a device 13 is currently selected as indicated by SDADDR 460. If a device 13 is selected, microprocessor follows path 511 which joins path 502 to return 503. On the other hand, if no device 13 had been selected, then at 512 an operation cycle counter S2 (not shown, a work register in microprocessor 110) for scanning the three device work queues of DOT 136 is set to unity at 512. With S2 equal unity, the top priority work queue of DOT 136 is scanned, it will then be incremented to number 2 which will scan the second priority work queue. Then the third priority work queue (data transfer) is scanned. When S2 is equal to 4, scans have been completed. From 512, microprocessor 110 follows path 513 to begin the first pass of the work queue scan in a loop labeled 520. A nested loop 519 enables microprocessor 110 to scan for device work within each of the respective device work queues. That is, the nested loop 519 will be repeated three times for the three passes through the device operation scan loop 520.

In the operations loop 520, the first step 514 enables microprocessor 110 to examine work register S2 to see which of the three device work queues have to be examined. The microprocessor 110 fetches the pointer (a register of control store 111 which is not separately identified) to the first register 472 of DOT 136 to examine the first entry of the respective queues by execution of loop 519. This set up procedure consists of a single transfer step for transferring from control store 111 the pointer address to the DOT 136 register having the first entry in the respective device work queues. At 515, the pointer to CCQ 21 is fetched for S2 to equal 1. At 516, the pointer to the first entry of ICQ 22 is fetched for S2 to equal 2, while at 517, the pointer to the first entry of XQ 23 is fetched when S2 equals 3. From steps 515, 516 microprocessor 110 follows path 518 directly to loop 519. From step 517 some preparatory steps, later described, are performed before microprocessor 110 follows path 518 into loop 519. Before completing the discussion of loop 520, the detail of nested loop 519 for scanning the respective work queues is described.

At 521 microprocessor 110 checks that for an information or a control operation respectively indicated by CCQ or ICQ that a device 13 is now almost up to speed for a data transfer operation. That is, at 521 unless a device 13 is prepared (P) at velocity V0 and the value of S2 is not equal to 3 i.e., a data transfer operation work queue will not be examined. If these conditions are not met, a data transfer operation is to be performed next. Accordingly, microprocessor 110 follows path 541 leaving loop 519 for return to loop 520. Assume that the loop 519 is to be performed (the conditions at 521 are met), then at 523 microprocessor 110 transfers selected information from DOT 136 to SDT 132. A DOT 136 register 472 is accessed based upon the DADDR 474 section which is determined by the chain field 473 as set up in steps 515, 516 or 517. Additionally, MIN 483 is transferred to SDT section RK 467. Also, CMD 478 is transferred to work registers within the microprocessor 110 for processing. For a control operation there may be no bytes to be transferred. Accordingly, all zeros will be transferred from DOT 136 to SDT 132 section 467. At 524, S2 is examined again for determining which logic module is to be activated. For S2=1, DI CNL 325 (FIG. 32) is activated at 525. If S2=2, then at 526, DI INF 321 (FIG. 33) is activated. For S2=3, a data transfer operation, logic module DI XFR 328 (FIG. 34) is activated at 527. Return from any of the three logic modules activated at 525, 526 or 527 via line 528 results at 529 in microprocessor examining SDT 132 section SDADDR 460 to determine if a device 13 was selected by microprocessor 110 via any of the above-described logic modules of steps 525-527. If a device 13 selection was made, then microprocessor 110 follows path 530, leaving the scan of the device work queues to peform some termination steps, as will become apparent. If no device 13 was selected as detected at step 529, the scan of the work queue continues. At 531, DOT register 472 of the device that was just examined but not selected, is accessed to set OP section 484 to unity. This indicates an operation is pending. At 532, microprocessor 110 examines CMD 478 of the register 472 corresponding to the same device to see of the commands indicated in section 478 is a rewind command. If it is, then the rewind was started and therefore, COMP section 481 is set to unity at 533 to indicate completion of the operation. At 534, microprocessor proceeds to step 535 for determining whether or not the chain fields 473 of the register 472 for the device that was just examined is 0 or not. The chain section 473 equaling zero indicates the end of the work queue. Accordingly, microprocessor 110 follows path 540 to increment the operation scan of loop 520, as will be later described. If the chain field is not 0, then another register 472 is examined via loop 519. From path 536, microprocessor 110 at 537 accesses the next-pointed-to register 472 having an address indicated in the chain section 473 of the just-examined device 13. Microprocessor 110 then follows path 538 to repeat steps 521, et seq., as just described above.

Steps 539, 546, 547 do preliminary checking when S2=3, and each time exit 530 of loop 519 is used. At 539, microprocessor 110 determines if a device 13 is almost up to speed for a data transfer operation and than no other device is currently selected. That is, SDADDR 460 must be equal to zeros (alternatively all ones or some other pattern indicating no device selection). If no device is prepared (PDADDR=0) or the device 13 is not up to velocity V0, then path 541 is followed for indexing the scan which will index S2 to 4, thereby leaving the device operation scan loop. On the other hand, if a device operation can be performed (a device is being prepared), microprocessor 110 at 546 sets PDADDR 461 of SDT 132 to 0 and sets the chain field of DOT 136 register 472 corresponding to the device being selected to 0 at 547. Then, loop 519 is entered at 524. Return from loop 519 to the indexing portion of loop 520 is through path 540; i.e., the chain field was set to 0 and is sensed at 535.

Indexing of the operation scan is performed from path 541 with the indexing step 542 adding unity to the value of S2. When S2 is equal to 4 as determined at 543, all three device work queues, 21, 22 and 23, have been scanned. Accordingly, microprocessor 110 follows path 545 to return 503. If the device operation scan was not complete at 543, microprocessor 110 follows path 544 to join path 513 for fetching the address pointer to the first entry of the next lower priority device work queue as described with respect to step 514 earlier.

Figure 28:
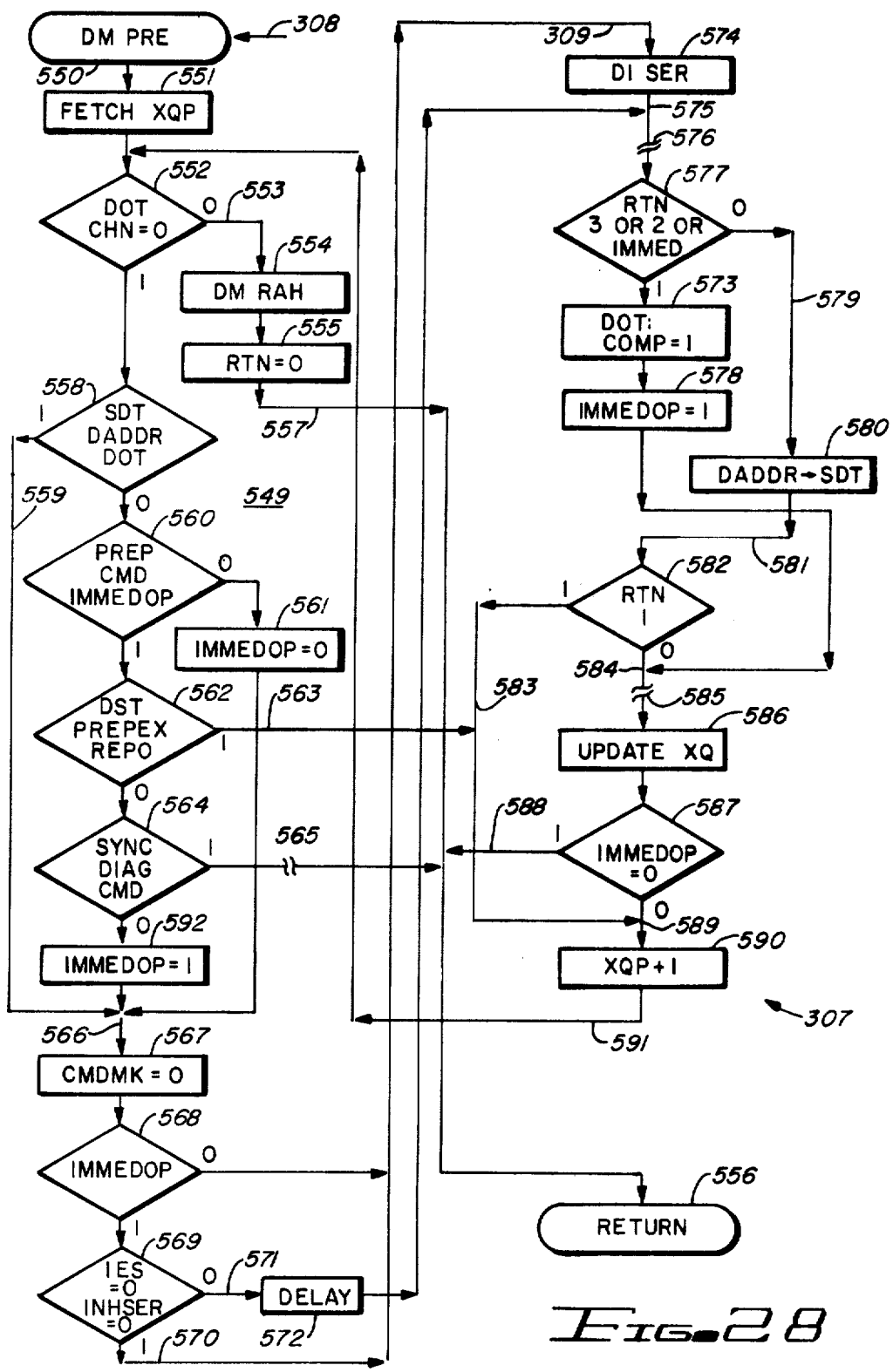
FIG. 28 details in logic flow a logic module used to prepare a peripheral device for an upcoming data processing operation.

FIG. 28 illustrates the detail logic of module DM PRE 307 as activated via line 308 (FIG. 20) and at 550 of FIG. 28. Three different types of operations can occur. The so-called immediate operations which can be done only on the preparatory interface such as RESETA, CLAMP, UNCLAMP or TEST IO. Nonimmediate operations which start device 13 tape motions via connections 32 in preparation for a selection over connection 30, 31 which is also referred to as a preparation step for a data processing operation. A third category is special commands, such as tape synchronous operations (not further described), or diagnostic operations of all types. Multiple operations within an immediate type of operations are achieved on a single invocation of the logic module. For the preparatory operations, if bit 491 of LDT 133 for the device to be prepared is inhibited, then the device 13 is simply marked as being prepared without actually sending signals over the preparatory connection 32. The effect of this action is to transfer the corresponding command, such as READ or WRITE, to the connection 30, 31 for later starting the addressed device 13. At that time, the device 13 will be started without the preparatory action which means peripheral system 10 is being operated in a performance degraded mode. A plurality of the immediate operations is achieved by plural passes through the logic module.

Figure 30:
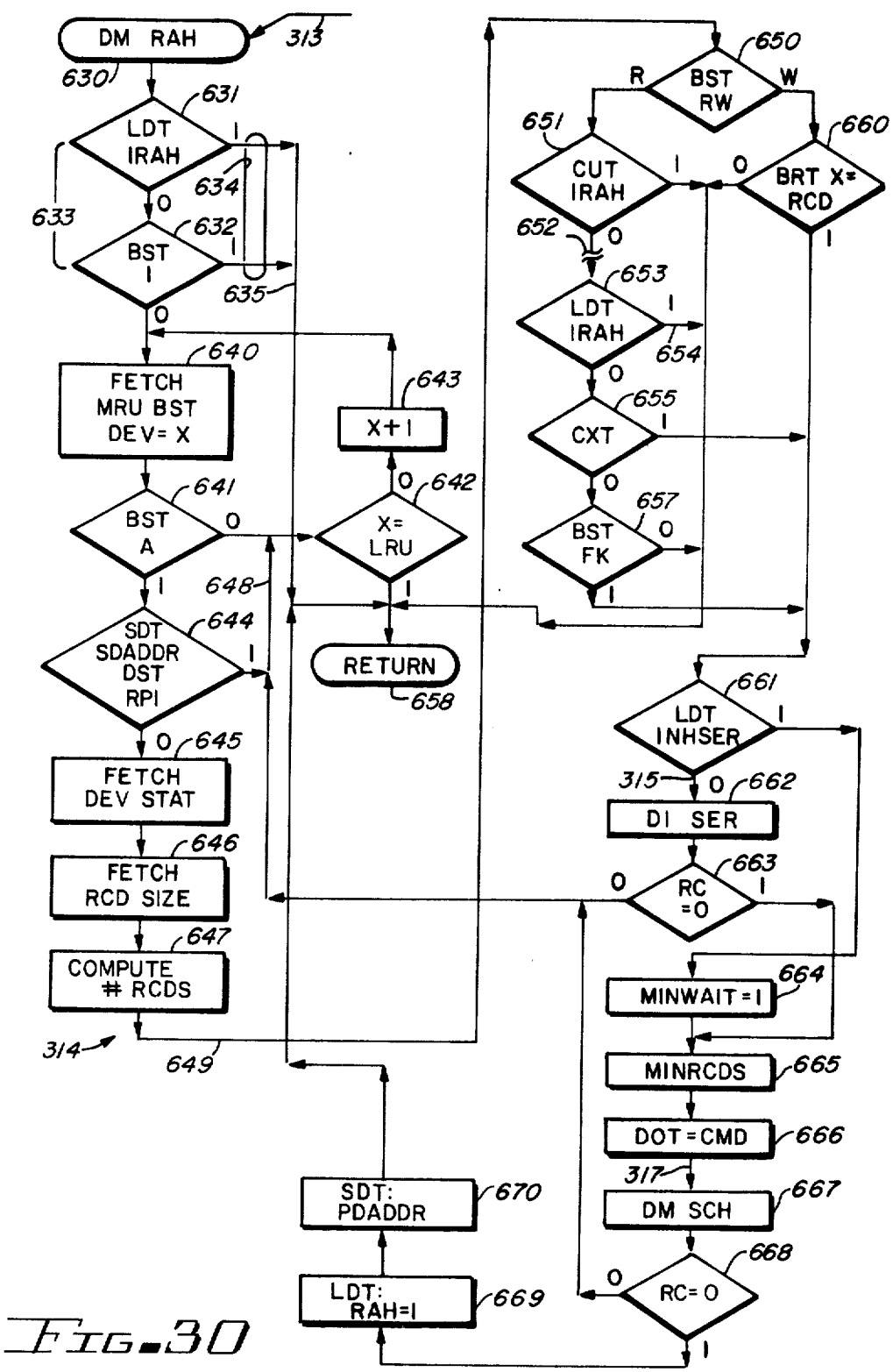
FIG. 30 illustrates a logic module used to select a peripheral device for preparatory data transfer operations between a data buffer and the peripheral device.

At 551, microprocessor fetches the pointer from control store 111 indicating the address of register 472 which is the first entry in XQ 23. This pointer is indicated as being XQP. A scan of XQ 23 is performed in loop 549 which includes inter alia steps 552 and 590. At 552, DOT 136 chain section 473 of the first register 472 is examined for 0. If the chain section 473 is 0, the end of the chain is indicated. Accordingly, the scan of XQ 23 is completed by loop 549. Then microprocessor 110 follows path 553 to activate logic module DM RAH 314 (FIG. 30). Microprocessor 110 has now determined that there are no scheduled device 13 operations to be performed. Accordingly, additional device work is to be set up such that data transfers between buffer 15 and any of the devices 13 that can be done will be done asynchronously to host 12 operations. After executing logic module DM RAH 554, which results in an entry in XQ 23 for asynchronous device operations, microprocessor 110 at 555 indicates a return code of 0, i.e., a device operation is to be set up. Then microprocessor 110 follows path 557 to return 556. Since no device has been prepared following this route, PDADDR 461 of SDT 132 is all zeros with the resulting operation described with respect to step 508 of FIG. 27.

When the chain section 473 is not 0, at 558 SDT 132 section SDADDR 460 is compared with the DADDR contents of section 474 of the addressed register 472 in DOT 136. If these values are the same, then the device 13 indicated in XQ 23 has already been selected. Accordingly, microprocessor 110 follows path 559 to perform some preparatory actions for continuing the device selection as will become apparent. If the selected device 13 and the device 13 indicated in DOT 136 XQ 23 are not equal, then microprocessor 110 at 560 determines the type of preparatory action that has to be taken. If the command in section 478 is an immediate command, such as RESETA, CLAMP, or UNCLAMP, then an immediate operation can be performed by the indicated device 13. That is, the circuitry shown in FIG. 18 of the device 13 can perform the indicated operations without requiring any tape motion in the device 13. For an immediate operation, repositioning of the tape is allowable while that operation is occurring. If the commands are not an immediate operation, microprocessor 110 at 561 sets a flag (not shown) with a work register of microprocessor 110 called "IMMEDOP" to zero to indicate that it is not an immediate operation.

For an immediate operation, microprocessor 110 at 562 examines DST 140 (FIG. 4) to see if preparation has been executed (PREPEX) or if the device is still repositioning. Most of these status are in DST 140, the repositioning being indicated by RPI 55 from device 13 to control unit 11. If this status is present, then no more device preparation actions can occur. Accordingly, microprocessor 110 proceeds to the next device by following path 563 to index the XQ 23 pointer at 590. On the other hand, if the status is not met, then at 564, if there is a synchronous operation occurring, this means that the device 13 is operating synchronously with respect to a host 12 or some diagnostic operations are being performed, then no device can be selected or prepared. Accordingly, microprocessor 110 performs some non-pertinent functions at 563. It then exits the logic module at 556 returning to the activating logic module. When the conditions at steps 564 and 562 are not satisfied, then the commanded immediate operation sensed at 560 can be performed. Accordingly, IMMEDOP is set to unity at 592. If neither of the conditions sensed at 562, 563 are met, path 559 was followed, or step 561 was executed, microprocessor 110 follows path 566 to read the command from section 478 of DOT 136. Reading the command from section 478 results in additional indicators such as V 479 being carried along since the minimum access to the table is greater than the number of bits in CMD 478. Accordingly, at 567 those extraneous bits are masked out leaving the comman code within a work register (not shown) of microprocessor 110. At 568, IMMEDOP flag (not shown) is examined (as set elsewhere within logic module 307). If an immediate operation is to be performed, microprocessor 110 goes to step 569; otherwise, path 570 is followed to path 309 for activating connection 32. At 569, LDT 133 is accessed to determine if INHSER 491 indicates that activation of a device 13 over preparatory connection 32 is inhibited, and if a so-called early start of the addressed device 13 is inhibited (early start means starting tape motion via connection 32). If use of the preparatory connection 32 is inhibited at 569, then via path 571 a delay is instituted at 572. If not, microprocessor 110 follows path 570 to path 309. The delay at 572 allows electronic circuitry (not shown) associated with a serial start in the connection 32 between control unit 11 and device 13 to complete usual electronic sequences.

Activation of the preparatory connection 32 is via logic module DI SER 310 (FIG. 29) as activated over path 309. Following the activation of logic module 310, logic of operations joins the logic flow from step 573 at 575. Following some non-pertinent functions at 576, microprocessor 110 at 577 senses the return codes from DM SDO 306. For a non-immediate operation or a return code of other than 2 or 3, microprocessor 110 follows path 579 to step 580 for transferring the contents of DADDR 474 of DOT 136 register 472 being examined to SDT 132 PDADDR section 461 for indicating a device is being prepared. Otherwise at 573, a successful start of device 13 is indicated in LDT 136 by setting COMP bit 481 and at 578 IMMEDOP to unity. On the other hand, setting IMMEDOP at 578 allows another device 13 to be prepared such that a plurality of operations can be performed based upon the listing in the device operation work queues 21, 22 and 23 without waiting for any data transfer operations to have occurred.

In a non-immediate operation, from step 580, microprocessor 110 follows path 581 to check the return code of DI SER 310 at 582. If that return code is unity, as explained later with respect to FIG. 29, microprocessor 110 follows path 583 to index the XQ 23 pointer at 590. Otherwise, mirocprocessor 110 follows path 584 which joins the path from step 578 to perform non-pertinent functions at 585. At 586, XQ 23 is updated by removing the prepared device 13 from the queue by resetting the bit 479 and adjusting the chain sections 473 to eliminate that particular register 472 from the logical chain. Such updating is well known and not described for that reason. At 587, if a non-immediate operation has started, i.e., IMMEDOP=0 at 587, path 588 is followed to indicate that no further preparatory operations can be performed. Accordingly, microprocessor returns at 556. On the other hand, if an immediate operation was scheduled, then further preparatory actions can occur with respect to another device. XQ 23 pointer is then indexed at 590 and path 591 is followed.

Indexing of the scan loop for scanning XQ 23 is performed from path 589 which is entered from step 587, path 583, or path 563. The chain fields 473 of the register 472 just-examined is transferred to the addressing circuit which increments the XQ pointer by 1 at 590. Over path 591, an entry of the described loop is made at 552 with the operations proceeding as just described. From this description, it is apparent that several scans can be performed in DM PRE 307 with a sequence of preparatory commands being supplied over preparatory connection 32 by repeated activations of logic module DI SER 310 at 574. Therefore, a plurality of such immediate operations on a plurality of devices 13 can proceed the actual overlapped starting of any device 13 via DI SER 310. This re-entrant looping adds to the efficiency of peripheral system 10.

Figure 29:
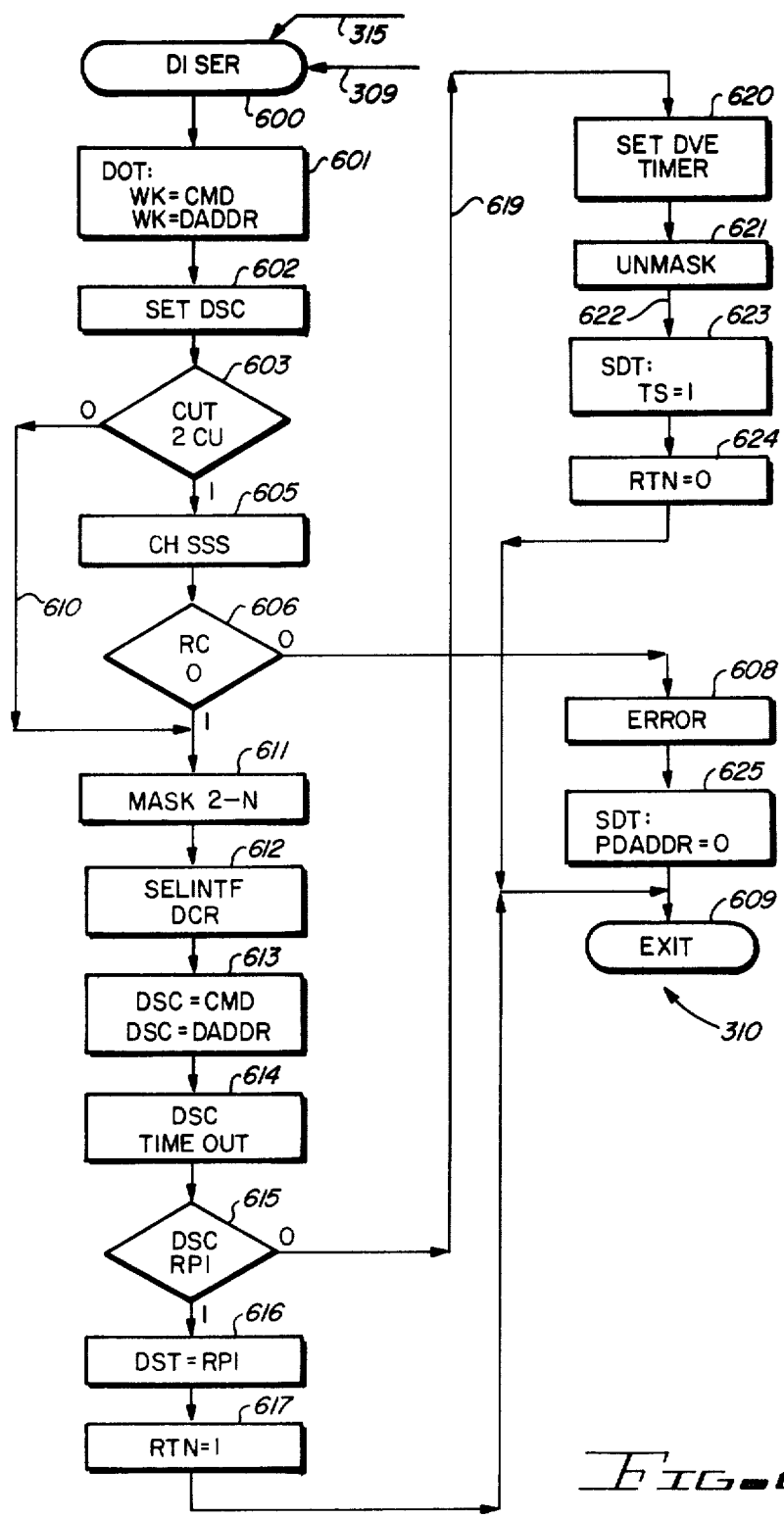
FIG. 29 is a diagram of a logic module used to activate the preparatory connection between the control unit and a peripheral device.

FIG. 29 details logic module DI SER 310. Activation of this logic module is via paths 309 and 315, as shown in FIG. 20. Activation occurs at 600; the first step 601 accesses DOT 136 to transfer the contents of CMD section 478 and DADDR section 474 for the addressed device 13 to work registers (not shown) within microprocessor 110. These two transferred entities will be later transmitted to device adaptor 85, as shown in FIG. 21. At 602, a time-out timer in DSC 342 (FIG 21) is set to a predetermined value. Then at 603, CU section 604 of CUT 130 is examined to determine if there are one or two control units 11 in peripheral system 10. It may be noted at this point that peripheral system 10 can have either one control unit 11 or two control units 11. If two control units are not in the system, path 610 is followed. If two control units are in the system, then before the preparatory connection 32 can be used, access to the connection must be first determined. This is achieved at 605 via logic module CH SSS (not shown) for accessing status store 100 which has a memory indicating which of the control units 11 has access to the preparatory connection 32. A return code is examined at 606. If the return code is not 0, then microprocessor 110 follows path 607 to error building instruction 608. Then at 625 SDT 132 is accessed with section PDADDR 461 being reset to 0. Then at 609, logic module 310 is exited. If the return code is 0 at 606, then the logic operation joins the path 610 from step 603 followed when there is only one control unit 11 to perform step 611. At 611, the interrupts levels 2 through N are masked off. In the illustrated embodiment, all but the error indicating interrupts are masked, wherein N is equal to 7. At 612, the preparatory connection 32 is selected by supplying control signals to DCR 340 of FIG. 21. At 613, the command and device 13 address fetched at 601 are transferred to DSC 342 of device adaptor 85 for transmittal over SDO 54. At 614, DSC 342 time-out is awaited. As soon as it times out at 615, DSE 339 of device adaptor 85 (FIG. 21) is examined for receiving the RPI signal over line 55. If the RPI signal has been received (RPI=1) at 616, that fact is transferred to DST 140. A return code of unity is set at 617.

Returning to 615, if the RPI signal (lodged in DSC 342 of FIG. 21) is not received (RPI=0) over line 55, then step 620 is reached from path 619 for setting another timer relating to device operations. At 621, the interrupts masked at 611 are unmasked. Then, via line 622, SDT 132 is accessed in steps 623 to set TS bit 465 to unity. This means that any selected device 13 will terminate its operation at the end of the next record. At 624, a return code of 0 is set and return is made at 609 from either 624 or 617.

Data records are transferred between devices 13 and the respective segments of buffer 15 in accordance with a priority of most recent usage of the respective segments as identified in a list (not shown) of most recently used (MRU) buffer 15 segments 16 in BST 137. The recording operations are scheduled in the same manner, reads and writes from and to devices 13 are interleaved in accordance with most recent segment 16 usage. These transfers are achieved as shown in FIG. 30 via logic module DM RAH 314. The purpose of DM RAH 314 is to enable microprocessor 110 to create device 13 activity in anticipation of host system 12 requests such that performance enhancement of peripheral system 10 can be maximized. Activation of DM RAH 314 occurs at 630 via line 313 (FIG. 20) with an AND/OR logic function consisting of steps 631 and 632 being first executed. If either read ahead is inhibited for a device 13 (LDT 133, IRAH 493=1) or buffer 15 asynchronous operations are inhibited (BST 137, I=1, not shown) then via logic OR function 634 logic path 635 leads microprocessor 110 to return 658. On the other hand, if the AND condition represented by numeral 633 is satisfied, i.e., neither read ahead nor asynchronous buffered writes are inhibited; then at 640, the BST 137 segment 16 entry which is MRU is fetched and stored in microprocessor 110 work registers (not shown). At 641, microprocessor 110 examines the fetched entry to see whether or not the identified segment 16 is allocated (BST 137, A=1, not shown). If the segment 16 is not allocated, then a scan is instituted which includes steps 642 and 643. At 642, microprocessor 110 determines whether or not the addressed segment "X" for a BST 137 entry is the last (LRU) segment in the MRU list (not shown). Step 643 increments X by unity to scan the status of a next device 13. If it is the last MRU segment, then return 658 is made since no device 13 activity is to be scheduled. If it is not the last segment, steps 640 and 641 are repeated for the next less "most recently used" segment 16 of buffer 15. As soon as an allocated segment 16 is found, i.e., a logical device is active in that a device 13 has an allocated segment from buffer 15; at step 644, microprocessor 110 determines whether or not the corresponding device 13 is busy. If this device 13 is busy, no asynchronous operation can be instituted. Accordingly, the just-described scan 641, 642 and 643 is re-entered via path 648 at step 642. On the other hand, if the device associated with the logical device is not selected, i.e., not busy or is not repositioning, (RPI), i.e., not performing a stand-alone operation, then the logical device is eligible for asynchronous read or write device operations. At 645, microprocessor 110 fetches device status from device status table, DST 140, DST 140 contains the last reported status for the device associated with the logical device being considered for an asynchronous operation. Then at 646, the record size indicator BLKS (not shown in FIG. 26) from LDT 133 for the identified logical device is fetched for the purpose of determining the number of records that can be transferred in the ensuing asynchronous data processing operation.

Block size is measured by counting the number of bytes transferred in a record (block). This number is assumed to be constant for purposes of predicting the number of records to transfer. At 647, the number of records (RCDS) that are expected to be transferred is computed. This number is a function of the number of records that can be transferred between buffer 15 and the device 13 in a preset time period based upon record lengths BLKS. Then, following path 649, microprocessor 110 at 650 reads BST 137 RW bit (not shown) to determine the mode of operation, i.e., is the data processing operation a read from device 13 or a write to device 13.

For a read operation, microprocessor 110 at 651 determines from CUT 130 IRAH bit 489 whether or not read ahead is permitted for the control unit 11. Read ahead could be inhibited for error control purposes during an error recovery procedure or during diagnostic procedures. If read ahead is inhibited, then microprocessor 110 follows path 654 to return 658. If read ahead is permitted, then at 652, microprocessor 110 fetches the direction of tape motion from BST 137 bit D (not shown) for the data processing operation, i.e., either forward or backward, and places the direction indicator in a work register (not shown) within microprocessor 110. Then at 653, microprocessor 110 determines whether or not read ahead is permitted for the logical device bing considered for the asynchronous read operation (indicated in LDT 133 bit IRAH 493). If IRAH=1, a return to the activating logic module is made at 658 via path 654. If read ahead is permitted at 653, then at 655 microprocessor 110 examines CXT 143 to see if a channel-buffer data transfer is presently occurring for the device being considered for asynchronous read. If there is a data transfer to channel occurring, then because of the channel rates, buffer overrun cannot occur. A device operation is instituted beginning with step 661 as later described. If at 655, a channel transfer is not occurring for the addressed logical device, then the number of free bytes of buffer space in the segment 16 of the addressed logical device is sensed at 667 from BST 137 for determining whether or not sufficient buffer space within the segment 16 of interest is available to justify a read ahead operation. If yes, then a device operation is instituted beginning with step 661, later described. It should be noted that the computation at step 647 designates a minimum number of records. If that minimum number is not met, then microprocessor 110 returns to the activating logic module via 658 (FK is less than MIN).

On the other hand, if a write operation is detected at 650 in BST 137; then at 660, BRT 141 is examined for the eligible device "X" to see if there is a complete record in the buffer 15 segment 16 of logical device. If there is not a complete record in buffer 15, an asynchronous write operation cannot occur. Accordingly, microprocessor 110 returns to the activating logic module via path 654.

Instituting a device 13 operation for either an asynchronous write or an asynchronous read between buffer 15 and device 13 begins at 661 wherein LDT 133 is examined in section 491 to see if a preparatory start via connection 32 is inhibited or not. The bit 491 of LDT 133 (FIG. 26) can be set based upon several conditions as described elsewhere in this specification. If there is no inhibit, then the addressed device 13 can be activated for a preparatory action by accelerating the tape record member to operational velocity via logic module DI SER 310 (FIG. 29) at 662 thence, via line 315. Returning from logic module DI SER 310, microprocessor 110 proceeds to 663 for checking the return code. The return code of 0 indicates a successful transfer of a command over preparatory connection 32. When RC does not equal 0 at 663, the scan loop 640-644 is again entered at step 642 for going to the next device 13, i.e., a device 13 was not activated for preparatory action at 662. On the other hand, when the return code is 0, the device was satisfactory started such that scheduling by insertion into XQ 23 can now occur.

Returning to step 661, if preparatory action is inhibited, a MINWAIT is set to unity at 664. MINWAIT is a flag (not shown) within microprocessor 110 which has the effect of giving priority to starting device 13 over the connection 30, 31 at the earliest possible moment. That is, it is desired to transfer the data between buffer 15 and device 13 as early as possible. At step 665, which is reached from either 664 or 663, a minimum number of records is indicated for the ensuing data transfer. This function has been described earlier. At 666, the command to be sent to device 13 (by another logic module) is inserted into DOT 136 section 478. The device is not inserted into XQ 23 at this time, i.e., the chain section 473 is not altered. Then, over line 317 (compare FIG. 20) microprocessor 110 activates DM SCH 318 (FIG. 31) at 667. The return code is checked at 668 for being equal to 0. If it is not 0, no device was scheduled. Therefore, scan 640–644 is again entered at 642. If the return code was 0, a device was successfully scheduled by logic module DM SCH 318. Then at 669, LDT 133 bit RAH 494 for the address device is set to unity. This indicates that a read ahead operation is occurring. The term read ahead operations include both writing data to device 13 from the segment 16 of buffer 15, or reading signals from device 13 to its associated segment 16. At 670, SDT 132 is accessed to set PDADDR 461 to the address of the device 13 which was addressed via the aforementioned most recently used list. It should be noted at this point that if DI SER 310 actually caused a preparatory start, then PDADDR would indicate that. However, if a preparatory start is inhibited at 661, PDADDR 461 is set anyway such that the device 13 can be started over interconnection 30, 31. From step 670, return 658 is made to the activating logic module.

Figures 31, 35:
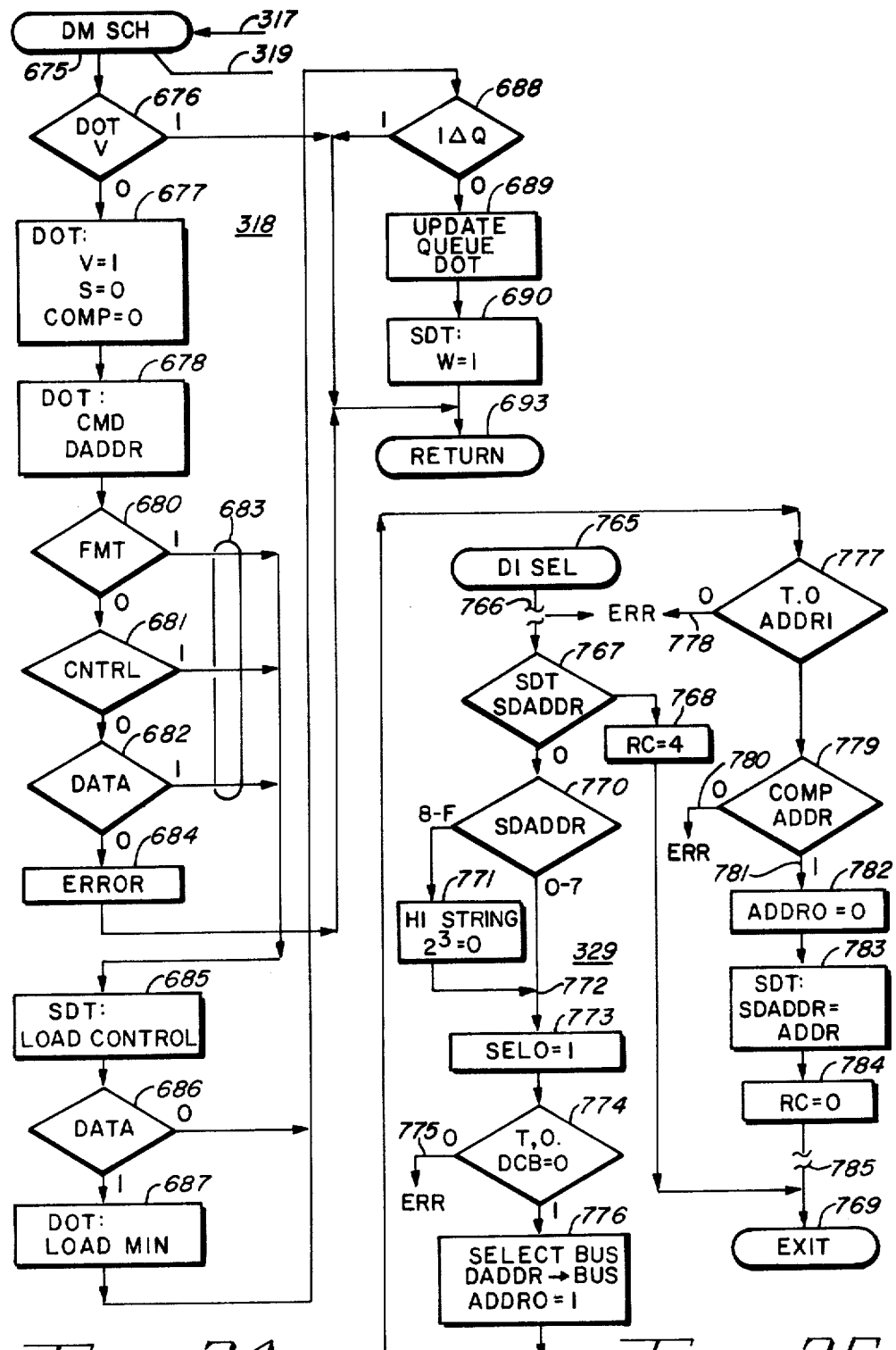
FIG. 31 illustrates a logic module used to schedule device operation.
FIG. 35 illustrates the logic for initiating a peripheral device selection for an ensuing data transfer operation.

FIG. 31 details logic module DM SCH 318. This logic module enables microprocessor 110 to schedule a device operation by inserting suitable signals into XQ 23 of DOT 136. It is remembered that the priority classes for device operation are set forth in the three queues. CCQ 21, ICQ 22, and XQ 23. Priority in the present embodiment are for the device control operation in ICQ 22 and finally data transfer operations listed in XQ 23. The three queues are established via the chain section 473 of the registers 472 in DOT 136. All of these functions are performed by microprocessor 110 when it enters DM SCH 318 at 675 from either paths 317 or 319 (FIG. 20). The first step is to examine DOT 136 V bit 479 at 676 to determine whether or not a device operation has already been scheduled for the addressed device 13. If a device operations has already been scheduled then a return is made to the activating logic module at 693. If no operation has been scheduled (V=0), then at 677, the DOT 136 register associated with the addressed device 13, as indicated in section 474, is altered by setting V bit 479 to 1, S bit 480 to 0, and COMP bit 481 to 0. S and COMP bits respectively represent a device 13 operation having been started and completed.

At 678, the DOT 136 register 472 is updated with the new device command in section 478 and a new DADDR, if necessary. At this point in time, which queue 21–23 is to receive the entry has not been determined. Accordingly, steps 680, 681, 682 are executed respectively to select queue ICQ 22, CCQ 21 or XQ 23. If the queues 21–23 are empty, then an error has occurred which is identified as 684 and reported to host 12 later after returning to the activating logic module at 693. On the other hand, one of the three queues 21–23 can be updated as indicated at 683 (logic OR function). Then at 685, control information is loaded into SDT 132 (FIG. 24). All of this control information will be in sections of SDT 132 represented by ellipsis 469. For a control sequence a similar pointer is loaded into its own pointer field (not shown) in SDT 132 for the first entry of CCQ 21. For a data transfer operation as detected at 682, a pointer to XQ 23's first entry is loaded into SDT 132 for pointing to a minimum number of records to be transferred as was calculated via a logic module leading into DM SCH 318. Then, at 686, microprocessor 110 determines whether or not the device operation is a data transfer operation as detected at 682. For a data transfer with a device 13, SDT 132 has its section RK 467 filled with MIN for indicating the minimum number of records to process in the current upcoming device 13 selection. The situation is such that when the number of processed records set forth in PK 468 of SDT 132 exceeds the number in RK 467, the operation proceeds only when W bit 464 is turned off.

Next microprocessor 110 at 688 determines whether or not incrementing any of the respective queues 21–23 is inhibited. If queue incrementing is inhibited, then a return is made at 693. If any queue 21–23 can be incremented, then at 689 the queue in DOT 136 is updated, as previously described. Then at 690, the W bit 464 of SDT 132 is set to unity. At this point in time, a device 13 has been scheduled for operation by inserting an appropriate entry into one of the three queues 21–23. Microprocessor 110 will later scan those queues and then, as shown in FIG. 20, activate logic modes for actually activating device 13 to transfer data or perform other functions as identified in respective queues.

Figure 32:
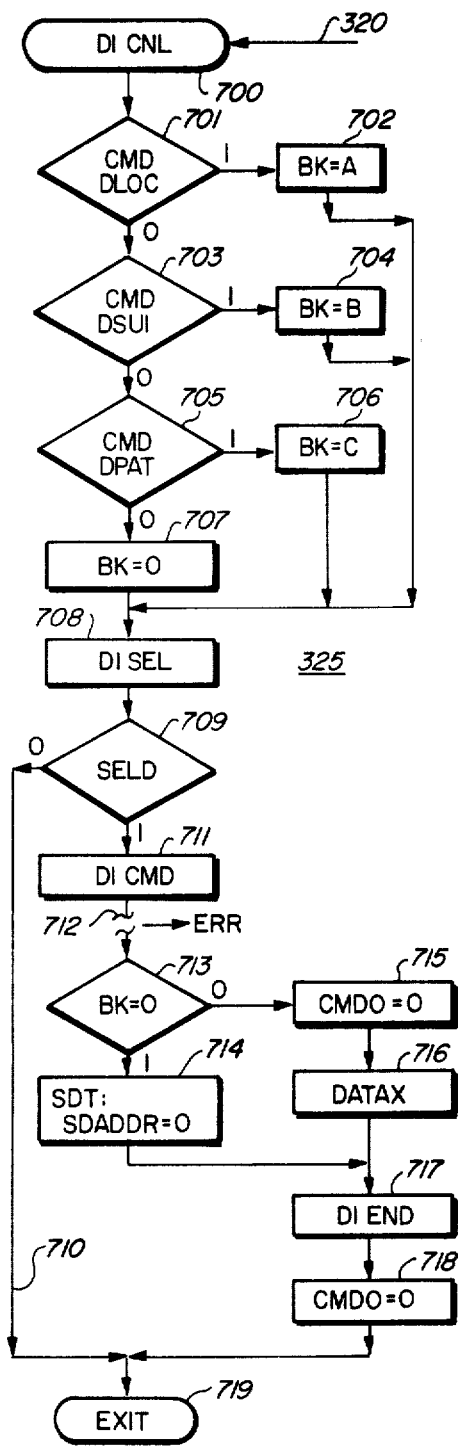
FIG. 32 illustrates a logic module used to set up a transfer for a control command from a control unit to an addressed peripheral device.

FIG. 32 illustrates logic module DI CNL 325 which is activated via line 320 (FIG. 20). Activation at 700 is followed by step 701, wherein it is determined whether the command in section 478 of DOT 136 is a LOCATE command; that is, the tape in device 13 must be transported to a predetermined addressed location. This requires address information to be transferred along with the command. Accordingly, the byte count of the command modifier data is set to a predetermined number of bytes "A" at 702. If the command is not a LOCATE command, at 703 the command is analyzed to see if it is a DISPLAY command which indicates a volume identification. Such a volume identification requires command modifier data to be transferred along with the command. The number of bytes BK is set to B at 704. For neither one of the commands at 701 or 703, the command at 705 can still be a patch command. Patch merely transfers data to the device 13 for patching the microcode in its control store. The byte count is set to C at 706. Otherwise, no command modifier bytes need to be transferred along with the command. For these latter commands, BK is set to 0 at 707. At 708, all of the paths from steps 701 through 707 are joined for activating logic module DI SEL 329 (FIG. 35). This logic module selects a device such that the command and its associated command modifier data can be transmitted. AT 709, microprocessor 110 determines whether or not a device 13 was selected via logic module DI SEL 329. If no device 13 was selected, then microprocessor 110 follows path 710 to exit 719. That is, no command can be executed since the selection was not completed. In connection with following path 710, microprocessor 110 may set error status for reporting the non-selection. For a successful selection, from step 709, step 711 results in activating logic module DI CMD 323 (FIG. 36) which transfers the command to device adaptor 85 for transferring to device 13 using the sequence of FIG. 6. At 712, non-pertinent functions are performed which may include error detection in connection with the transfer of commands at 711. At 713, the value of BK is examined. If BK is equal to 0, then at 714, SDT 132 is accessed for resetting SDADDR 460, i.e., another device can be selected. If BK is not 0 at 713, then at 715 CMDO is reset to 0. At 716 a data transfer is implemented from control unit 11 to device 13 for transferring the requisite number of bytes as indicated respectively at 702, 704 or 706. Then at 717 logic module DI END 326 (FIG. 37) is activated for ending the transfer. CMDO is reset to 0 at 718 with exits to the calling logic module occurring at 719.

Figure 33:
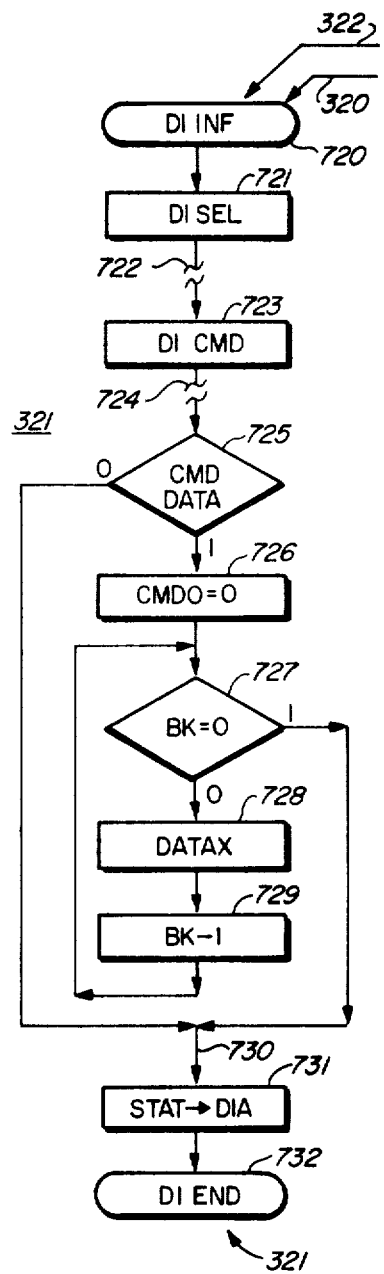
FIG. 33 illustrates a logic module used to set up a signal transfer for an information sequence command from a control unit to a peripheral device.

FIG. 33 illustrates the logic module DI INF 321. Activation is via paths 320, 322, as shown in FIG. 20. After activation at 720, at 721 logic module DI SEL 329 (FIG. 35) is activated. Returning from that logic module, non-pertinent functions are performed at 722 which may relate to error detection. If an error is detected, an exit may be taken (not shown). Then at 723 logic module DI CMD 323 is activated for transferring the command to the device 13. Following that action, non-pertinent functions are performed at 724 which again may relate to error checking. At 725 microprocessor 110 determines whether or not command modifier data is to be transferred. For command modifier data being transferred at 726, CMDO is reset to 0. Then loop 727, 728, 729 is entered. At 727 the byte count is checked for 0. If it is non-zero another byte is transferred at 728. The byte transfer is indexed at 729 by subtracting 1 from BK. Then step 727 is again performed. These steps are repeated until BK=0 whereupon line 730 is reached jointing with the exit from step 725 corresponding to no command data being transferred. At 731 ending status from the device 13 is transferred to DIA 139. Then DI END logic module 326 (FIG. 37) is activated at 732.

Figure 34:
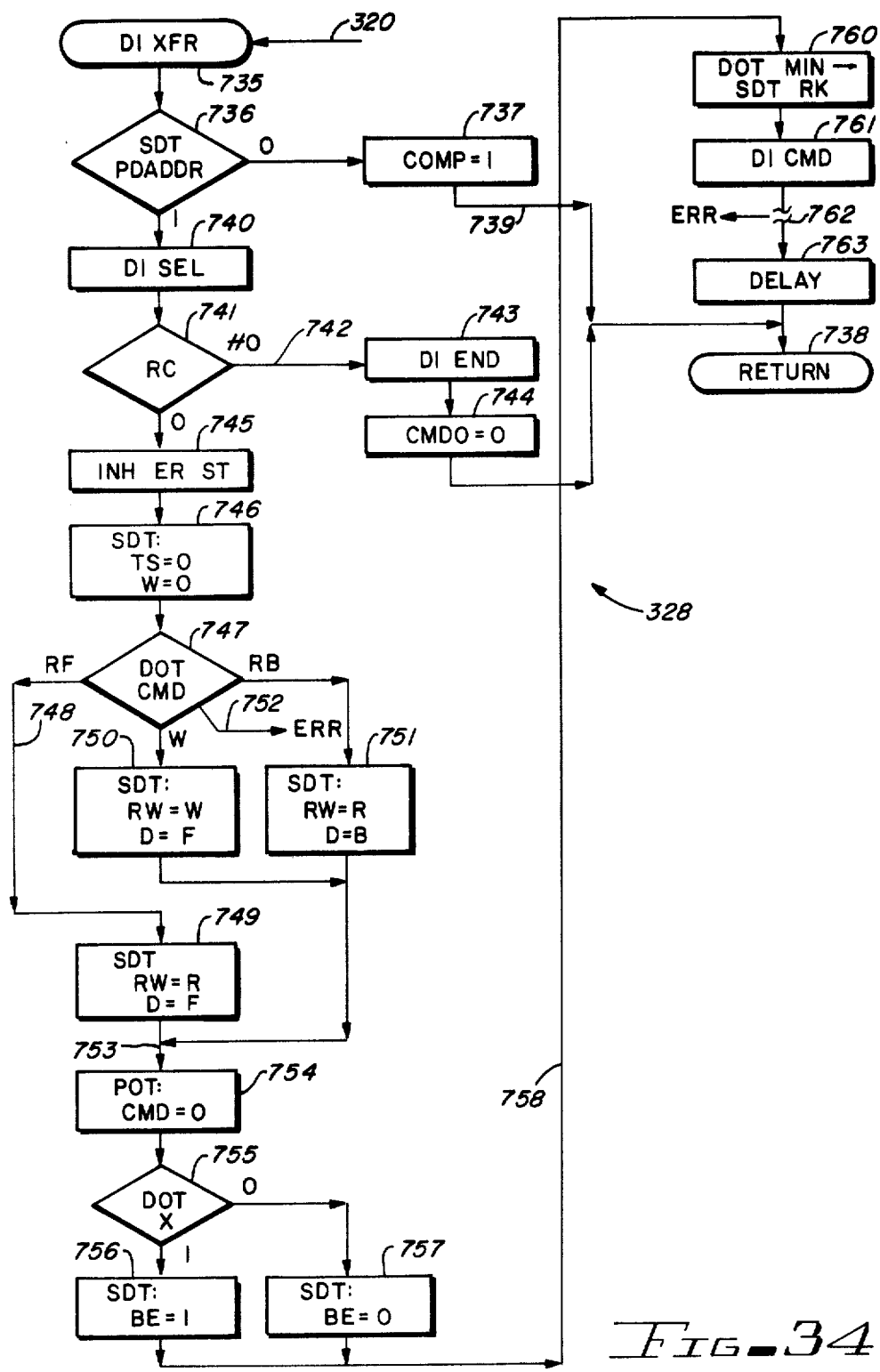
FIG. 34 illustrates a logic module used to set up a transfer for a data transfer command from a control unit to a peripheral device.

Logic module DI XFR 328 is shown in FIG. 34. Activation of this logic module is via path 320 and occurs at 735. At 736 SDT 132 is accessed to examine the value of PDADDR 461. Normally, this section should have the address of the device 13 which was prepared or which will be started via DI XFR 328. If section 461 is 0, i.e., contains no device address, then the present operation is complete. Accordingly, COMP 481 of DOT 136 corresponding to the addressed device 13 is set to unity at 737. Path 739 is followed to return 738. Normally, PDADDR 461 will contain a device address at 736. Then, at 740 logic module DI SEL 329 (FIG. 35) is activated for selecting a device 13 in preparation for a data transfer over interconnection 30. At 741 the return code is checked. If the return code is non-zero, a selection was not successful. Accordingly, microprocessor 110 follows logic path 742 to activate logic module DI END 326 (FIG. 37) at 743. CMDO is set to 0 at 744 and return is taken at 738. If selection was successful, the return code equals 0 at 741. At 745 a time-out timer (not shown) is set such that no additional devices will be prepared over preparatory connection 32. This timer allows the device 13 now being selected to perform a data transfer operation having a minimal number of records. Then, at 746 SDT 132 is accessed for resetting W bit 464 and TS bit 465. At 747, DOT 136 section CMD 478 is examined to determine the type of command. For a read forward (RF) command, path 748 leads to 749 whereat SDT 132 is accessed for setting RW 462 to the read mode and direction bit D 463 to the F or forward direction. For a write command W, at step 750 microprocessor 110 accesses SDT 132 for setting RW 462 to W (write) with the direction bit D 463 to the foward direction. For a read backward (RB) command, at step 751 SDT 132 is accessed to set RW bit 462 to R and the direction bit D 463 to B (backward). At 753, logic flow joins from steps 749, 750, 751. If none of the three commands RS, W or RB are detected at 747, an error is indicated, as indicated by arrow 752. From path 753, microprocessor 110 at 754 accesses DOT 136 to reset CMD section 478. At 755, DOT 136 X section 147 is accessed to determine whether the operation associated with the current device 13 selection is a data-transfer operation or a non-data operation. X means that the data should be maintained in buffer 15 until the host retrieves it or the operation with the addressed device 13 is aborted. If X is equal to 0, then at 757, a buffer enable (BE) flag (not shown) of SDT 132 is reset to 0 allowing erasure of all data transferred to buffer 15 as an incident to performing a non-data operation, i.e., such as a space block operation. On the other hand, if X is equal to 1, the buffer enable flag (not shown) is set to unity at 756 to enable retention of data in the buffer received from device 13. Following path 758, microprocessor 110 at 760 takes the signal contents of MIN section 483 of DOT 136 and transfers it to RK section 467 of SDT 132. At 761 logic module DI CMD 323 (FIG. 36) is activated. Return from that logic module results in non-pertinent functions 762 being performed which may result in an error indication. At 763, a delay is instituted in control unit 11 for allowing a next arriving gap between adjacent records on the tape to be transported past a transducing station (not shown) such that actual signal transfer can occur shortly. At 738, return is made to the activating logic module.

Logic module DI SEL 329 is shown in FIG. 35. It is activated as shown in FIG. 20, while in FIG. 35, activation occurs at 765 followed by some non-pertinent error checking functions at 766. At 767, SDT 132 section SDADDR 460 is examined to see if a device is already selected. If a device 13 is already selected, at 768 a return code (RC) equal to 4 is set to indicate a device selection had already occurred. Exit is taken at 769. When SDADDR 460 contains no device 13 identification; at 770, the address of the device 13 to be selected, which is obtained from DOT 136 section 474 and contained in a work register (not shown) of microprocessor 110, is examined to see if the address range is from 0 to 7 or from 8 to F. The 8 of F address range indicates it is on the high range of high address connection string (HI). Accordingly, since only three bits of the address need to be used for any 8 devices, the high string indicator $2^3$ is reset to 0. A latch (not shown) in device adaptor 85 DCR register 340 is set indicating that the three bits of the device address are of the high string connection. For the low string, 0 to 7, no action need be taken and the latch (not shown) of DCR 340 is not set. Path 772 is followed to 773 wherein the select out SELO line 48 is activated via DTR 344 of FIG. 21. At 774, a time out is checked (not shown) which is set in DCB 346 to time the response of device 13 identified in the address field examined at 770 for the response indicated in FIG. 6. If there is a time out, i.e., no response, then an error is indicated at 775. With an appropriate response, as indicated in FIG, 6, at 776 the address fetched from DOT 136 is supplied to BIDI 42 and the signal ADDRO on line 49 is activated. A similar time out in DCB 346 is again set and waited for at 777. If there is a time out before ADDRI signal on line 51 is received, an error is indicated at 778. Otherwise, at 779 the complement of the address furnished at 776 is examined as received from the addressed device 13. In other words, BIDI 42 should be all one's. If it is not all one's, an error is indicated at 780. Otherwise, path 781 is followed to step 782, whereat ADDRO signal on line 49 is reset to 0. At 783, SDT 132 is accessed and the SDADDR section 460 of SDT 132 is set equal to the address of the just-selected device 13. A return code of RC O is set at 784.

Non-pertinent functions are performed at 785. A return to the activating logic module is made at 769.

CONTROL UNIT TO DEVICE COMMUNICATIONS

Figure 36:
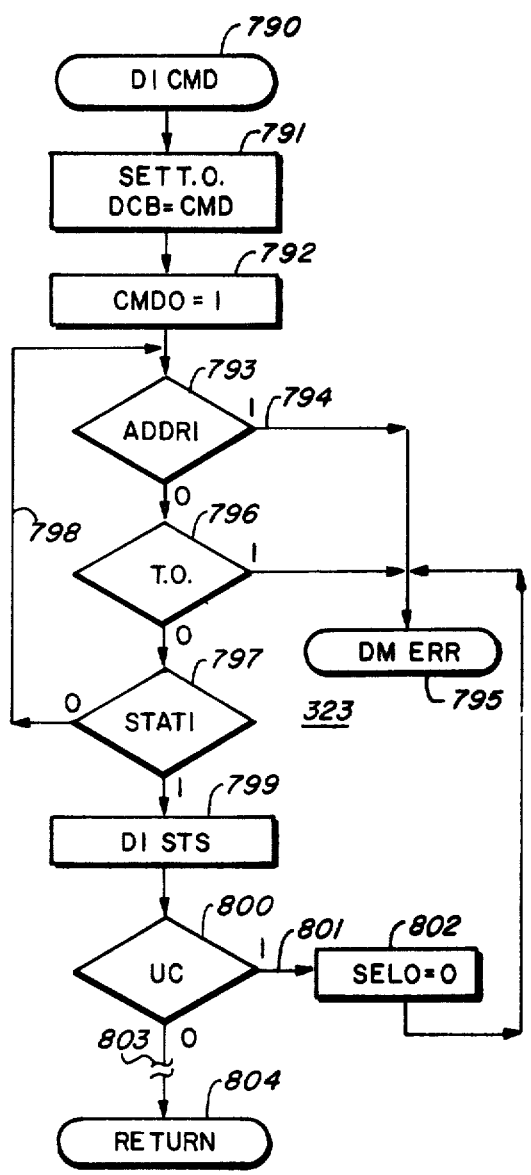
FIG. 36 illustrates a logic module used to control or monitor transfer of a command from a control unit to a selected peripheral device.

Transmittal of a device command to a selected device 13 is shown in FIG. 36. Logic module DI CMD 323 is activated at 790. At 791 the register DCB 346 is made equal to the code permutation fetched from CMD section 478 of DOT 136 of the register 472 containing the DADDR 474 of the selected device 13. CMDO line 47 is activated at 792 to indicate that the signals on BIDI 42 received from DCB 346 are the command signals for the device 13. A sensing loop is then entered, consisting of steps 793–798. At 793, microprocessor 110 examines ADDRI line 51 for the address-in signal. If a device 13 supplies an ADDRI signal, an error is indicated at 795 via path 794. A time-out set in 791 is examined at 796. If there is a time-out with no device response, an error is indicated at 795. Otherwise, step 797 is examined for the receipt of a STATI line 52 signal; the addressed and selected device 13 is returning initial status. If none of the conditions are met, path 798 returns microprocessor 110 to step 793. Assuming that STATI line 52 signal was received, at 799 logic-module DI STS (not shown) is activated. Logic module DI STS enables microprocessor 110 to transfer the status-in signals received over BIDI 42 to DST 140. It will be remembered that DST 140 stores the latest reported status signal from each of the devices 13. Transfer of data signals from an input data bus, such as BIDI 42, to a memory 111 is well known in the data processing art and is not detailed for that reason. At 800, a unit check (UC) status from the device 13 is checked. That is, during initial status, error conditions are reported by each of the selected devices 13. This unit check information will be stored in DST 140. If there is unit check reported on path 801, SELO line 48 signal is reset at 802 and error exit DM ERR 795 is taken. DM ERR (not shown) is a logic module that assembles error information and determines the course of recovery for control unit 11. Such course of recovery may include reporting the error status to a host 12. For minor errors, control unit 11 can be controlled via microprocessor 110 to recover errors on its own. Recovered errors can be put in a so-called buffered log. The buffered log is a well known data processing technique for accumulating error and other operational status information for later reporting to host 12. This allows host 12 to analyze peripheral system 10 operations. Normally, there will be no unit check reported at 800, in this case non-pertinent functions are performed at 803 with the return being made at 804.

Figure 37:
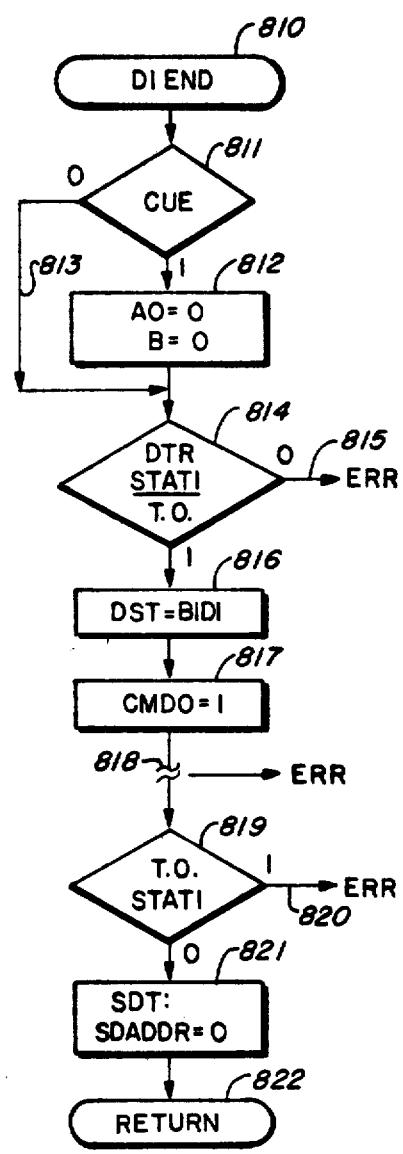
FIG. 37 illustrates a logic module used to control the ending of a data transfer operation.

After a command is transmitted and device selection have been achieved, automatic circuits (not shown) in device adaptor 85 transfer signals between device 13 and buffer 15 a known manner. At the end of the transfer sequence, some ending controls are exercised by microprocessor 110. FIG. 37 shows logic module DI END 326 which performs a portion of these ending controls. Most of the ending controls are known in the data processing art and are not detailed further for that reason. Activation of logic module DI END 326 occurs at 810. At 811, it is determined whether the control unit 11 or the device 13 is initiating the end of the communication between control unit 11 and device 13. If it is a control unit 11 initiated end, then at 812 A0 line 44 and B line 46 are reset to 0. Otherwise, no activity is taken through path 813. Following path 813, step 814 enables microprocessor 110 to examine DTR 343 (FIG. 21) for a received STATI 52 signal and to check whether or not a time-out (not shown) has expired. If a time-out has expired, then an error is indicated at 815. For an error-free operation, step 816 causes microprocessor 110 to transfer the contents of BIDI 42 to DST 140. This action is the same as described for initial status; the status reported at this time is ending status. Control unit 11 responds to the receipt of ending status by setting CMDO line 47 to unity at 817. Some non-pertinent error handling steps at 818 precede step 819, whereat control unit 11 examines for a second STATI line 52 signal or in the alternative, a time-out. For a time-out, an error is indicated at 820. If STATI line 52 signal is received before a time-out, then at 821 SDT 132 is accessed for resetting SDADDB 460 to 0, i.e., no device 13 is now selected. Conclusion of logic module DI END 326 completes the deselection of device 13 from control unit 11. A return is made at 822.

EXECUTION OF HOST SUPPLIED COMMANDS

Figure 38:
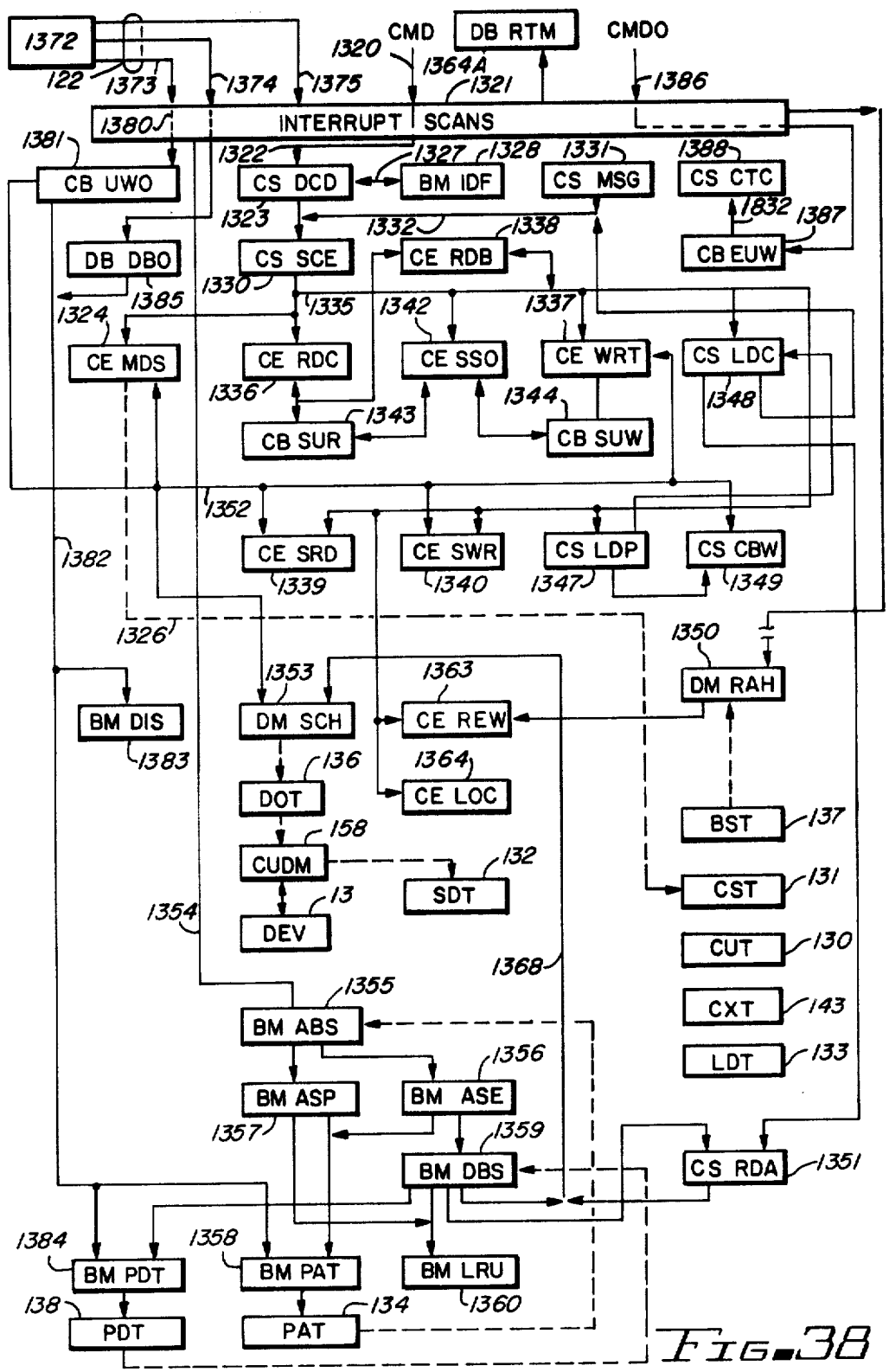
FIG. 38 is a logic block diagram showing host to control unit interaction.

FIG. 38 shows the microcode logic module interaction achieved via microprocessor 110 for initiating and stopping data transfer through buffer 15. In particular, logic modules are those stored in control store 111 and are portions of the various logic module groups 150–161 identified in FIG. 4. The various logic modules illustrated in FIG. 38 can be identified with the module groups by the first two alphabetic characters, for example CS DCD logic module 323 is in group CUCS 155. The right-most two alphabetic digits of the FIG. 4 denomination CS correspond to the left-most alphabetic characters of the FIG. 38 denomination. In a similar manner CB UWO 1381 is a logic module in the group CUCB 151. The various lines in FIG. 38 illustrate the interaction between the logic modules as those modules are executed by microprocessor 110. The tables shown in FIGS. 24 through 26 are also indicated in FIG. 38. The cooperation between the various tables and the various logic modules is best understood by reference to FIGS. 39 et seq. The description of FIG. 38 will follow generally the receipt of a command, decoding of a command, a description of execution of some of the commands, the supplying of CCR's based upon buffer conditions, and continued execution of commands, including synchronous modes and preparatory actions. Such descriptions will be followed by activation of devices 13 which in turn are followed by a description of allocation and deallocation control of buffer 15. These descriptions are followed by description of the length detector which includes a circuit description of a measuring instrument for buffer 15 operations together with the logic modules that handle overrun measurement which constitutes a length measurement, the resultant control of the buffer 15 and institution of a so-called tape synchronous mode of operation.

A command from host 12 is partially decoded by a channel adapter 80. This partial decoding results in an interruption signal being supplied to microprocessor 110, as indicated in FIG. 38 by numeral 1320 indicating that a command has been received. Microprocessor 110 operating through its interrupt scans 1321 senses the channel adapter 80 supplied interruption signal. As a result microprocessor 110 proceeds over path 1322 (executing logic modules not pertinent to an understanding of the present invention, as used to handle interrupt signals, etc., as is known) to execute logic module CS DCD 1323 as detailed in FIG. 39. For each functional command received from host 12, this command decode logic module puts the device address and channel adapter status code into internal registers (not shown) of microprocessor 110 for later use. Microprocessor 110 checks the received command code and control unit indication to correct any errors or unusual situations, if they exist. Microprocessor receives accessory data associated with a channel command, if there is any. In the commands described with respect to present invention only the MODESET command has such data. Microprocessor 110 determines which control unit 11 the command will be executed by and will send the command message to the other control unit 11 if the device 13 has been previously allocated to the other control unit 11. Microprocessor 110 increments a channel command retry count (not shown) if a channel command retry is initiated. This incrementation is effected over path 1327 for activating logic module BM IDF 1328, not described in detail. From logic module CS DCD 1323 microprocessor 110 proceeds to start the command execution through logic module CS SCE 1330. Microprocessor 110 in executing this module for each functional command received ensures that a buffer 15 segment for the addressed device 131 has been allocated for a buffer 15 using command, such as READ or WRITE. Microprocessor 110 initiates appropriate buffer and device preparation for the received command, as will be later explained. Microprocessor 110 also activates the appropriate microcode command execution logic modules for executing the command as will be described with respect to FIG. 38. Microprocessor 110 also uses logic module CS SCE 1330 for presenting ending status to the channel adaptor and adjusting the command status table 131, as appropriate. This logic module is not only activated from logic module CS DCD 1323 but also from a received message CS MSG 1331 and from CS LDC 1348 as indicated by line 1332.

In FIG. 38, line 1335 represents the operative activation of the various command execution modules of CUCE 152 by microprocessor 110 executing logic module CS SCE 1330. Included in these logic modules are CE RDC 1336 which executes a first received READ command, as detailed in FIG. 41. Microcode logic module CE WRT 1337 is activated to execute a WRITE command as detailed in FIG. 42. Logic module CE WRT 1337 is used for activating a so-called buffer write mode and a so-called tape write mode, as well as any first received WRITE command independent of a tape synchronous mode. When a tape synchronous mode is set up, logic module CE SWR 1340 starts WRITE command execution. Execution of the READ DATA BUFFER command is by logic module CE RDB 1338, not detailed, which transfers data to be written on tape but still in buffer 15 back to host 12. In the buffer write mode, a DEVICE END signal is given host 12 when the write data is in buffer 15. In the tape write mode, the DEVICE END signal is given only after the write data is recorded on tape in a device 13. The tape synchronous mode requires simultaneous data transfer between the buffer 15 with host 12 and device 13 for a given block of signals, i.e., device 13 supplies data of a given block of data to buffer 15 while buffer 15 supplies data from the given block of data to host 12; and vice versa.

When the tape synchronous mode has been instituted in the control unit, a sync bit (not shown) of LDT 133 (FIG. 26) is set to the active condition. Microprocessor 110 in executing logic module CS SCE 1330 senses this sync bit to determine which command execution module to activate. When the synchronous mode is indicated, then microprocessor 110 in a read mode activates logic module CE SRD 1339 for a tape synchronous read or CE SWR 1340 for a tape synchronous write, as respectively detailed in FIGS. 47 and 48. Microprocessor 110 in executing modules 1339 and 1340 merely sets up the control unit for executing a READ or WRITE command in a tape synchronous mode. Accordingly, microprocessor 110 activates the channel adaptors 80 to send a CCR to host 12. When the preparation of the buffers and the device have been completed, then microprocessor 110 activates the appropriate channel adaptor 80 to send a DEVICE END signal to host 12 signifying preparation is complete. Subsequent to the DEVICE END, the READ or WRITE command is again sent by host 12 to storage subsystem 10. As a result, microprocessor 110 in executing module CS SCE 1330 activates logic module CE SSO 1342 as detailed in FIG. 49. This logic module enables microprocessor 110 to start a tape synchronous operation that was set up by either CE SRD 1339 or CE SWR 1340.

In a read operation, the data transfer from buffer 15 to channel adaptor 80 thence host 12 is started by microprocessor 110 executing logic module CB SUR 1343, not detailed, which conditions the FIG. 50 illustrated automatic data transfer circuits for a host 12 and buffer 15 data transfer. Activation of CB SUR 1343 is from either CE RDC 1336, CE RDB 1338, or CE SSO 342. In a similar manner logic module CB SUW 1344, not detailed, enables microprocessor 110 to start the transfer of data from host 12 into buffer 15 by conditioning the FIG. 50 illustrated circuits. Logic module CB SUW 1344 is activated from either logic module CE WRT 1337 or logic module CE SSO 1342.

Figures 46, 47:
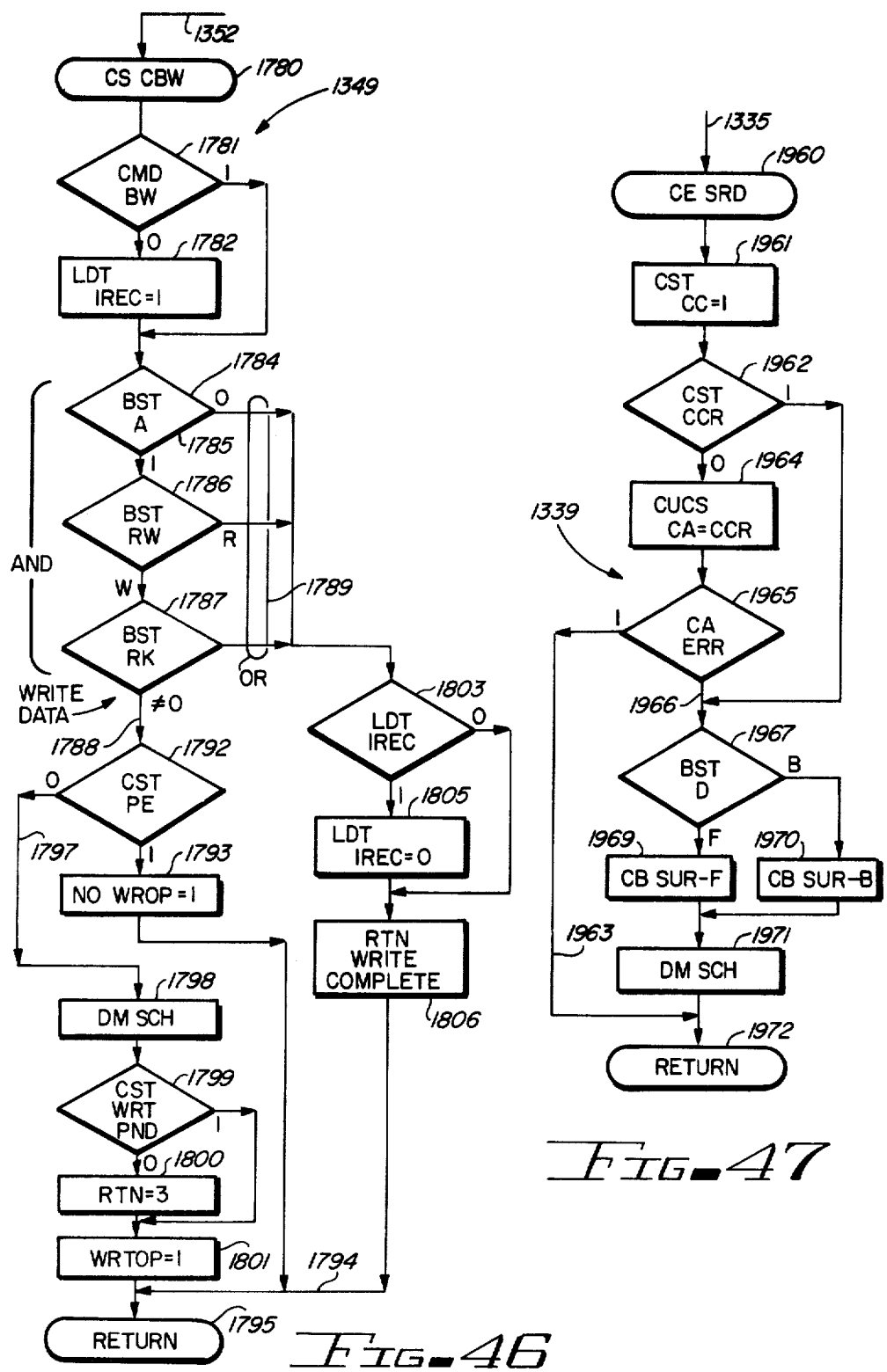

Logic module CS SCE 1330 enables microprocessor 110 to prepare the buffer, i.e., prepare the logical device for command execution. That is if a CCR is sent because the logical device is not constituted or other buffer conditions prevent command execution, then logical device preparation must be provided. Microprocessor 110 over path 1335 activates logic module CS LDP 1347 for logical device preparation. Microprocessor 110 in executing CS LDP 1347, as detailed in FIG. 43, accesses status store 100 for determining buffer 15 conditions. If the received command is a WRITE command and the buffer 15 segment allocated to the addressed device 13 is full, a WRITE operation to a device 113 is initiated to clear out some buffer space for data expected via the just received WRITE command. This action is achieved by activating logic module CS CBW 1349 (FIG. 46). CS CBW 1349 enables microprocessor 110 to complete writing the data to be recorded that is still in buffer 15 segment of the addressed logical device. Returning to CS LDP 1347, if the received command is a READ DATA BUFFER command, microprocessor 110 ensures that all buffer write to device 13 operations have been completed before the READ DATA BUFFER command is executed. If the just received command is not a WRITE or a READ DATA BUFFER command and the buffer 15 segment is in a write mode, then microprocessor 110 ensures that all data to be recorded is actually recorded on tape 260. Read ahead control bits (not shown) of LDT 133 are also updated. Read ahead is the transfer of data from a device 13 to buffer 15 in anticipation of a request for such data by host 12. For a received READ command while a read operation is occurring between buffer 15 and a device 13, such a read ahead operation bit in LDT 133 is reset. For a read operation from a device 13 to buffer 15 and a received command is not a READ command or a SPACE command that was accepted by a channel adapter 80, microprocessor 110 ensures that the read ahead operation is completed before the first received command is executed. On the other hand, if the received command is a READ DATA BUFFER command or a SYNCHRONIZE command and the buffer 15 segment, if there is one allocated, is in a read mode, then ending status is built immediately for the command. The READ DATA BUFFER command and the SYNCHRONIZE command are for handling write data only. Therefore, if the buffer 15 segment is allocated or if there is no buffer segment allocated, then there is no action to occur on either the READ DATA BUFFER or the SYNCHRONIZE command, then CS LDP 1347 is activated only after a CCR has been given due to these buffer conditions.

Additional logical device preparation is provided via logic module CS LDC 1348 which is activated by CS LDP 1347. Microprocessor 110 with regard to CS LDC 1348 also can update the above-mentioned control unit read ahead control bits. In the event there is no data in buffer 15, status store 100 is informed that the buffer 15 segment related to the addressed device is empty. Read ahead operations are terminated for a buffer 15 segment using command which will not use the data to be or currently being read ahead. A repositioning operation of tape 260 is ordered, as may be necessary. Record entries in BRT 141 for data records purged from the buffer are deleted. If an input/output command is pending and the command is not a REWIND, REWIND UNLOAD or LOCATE BLOCK command or a buffer deallocation is pending, microprocessor 110 via logic module CS RDA 1351 determines how many blocks were read ahead and will schedule a device 13 operation to reposition the tape 260 to a position just preceding the read ahead operation just nullified.

Many of the described operations require a device 13 activation. This activation is achieved via various described logic modules over line 1352 which activates logic module DM SCH 1353 to enable microprocessor 110 to schedule a device 13 operation, as detailed in FIGS. 20 and 27-36. Because scheduling device operations permeates subsystem 10 operations many, many logic modules can activate DM SCH 1353. Included in these logic modules are CS CBW 1349, read ahead operations by DM RAH 1350, execution of a LOCATE command by logic module CE LOC 1364, CE RDC 1336; execution of a REWIND command by logic module CE REW 1363, CE SRD 1339, CE SWR 1340, CE WRT 1337, and other modules including diagnostic logic modules not shown. Microprocessor 110 in executing logic module DM SCH 1353 loads XQ 23 in one of the three described queues of DOT 136. DOT 136 is scanned by microprocessor 110 for work to be done and activates logic modules in group CUDM 158, among others, to activate device 13 and then track a selected device operation through SDT 132. In this regard, a device 13 being selected for a start up operation will be selected only for the initial start up. The acceleration and other operations are free standing operations. When the device reaches operating speed, such device 13 signals control unit 11 that it is ready for a data processing operation. Similarly in a rewind, microprocessor 110 through CUDM 158 and other modules activate a device 13 by selecting it and giving it a rewind order. Then the device is deselected while it performs the actual rewind function.

Allocation and deallocation of buffer 15 follows usual allocation and deallocation techniques for memories. This includes a pending allocation table PAT 134 and a pending deallocation table PDT 138. Allocation of a buffer segment to a device 13 to create a logical device is initiated through an interrupt scan following path 1354 to logic module BM ABS 1355. This allocate buffer segment logic module 1355 enables microprocessor 110 to allocate a buffer 15 segment to a device 13 when the pending allocation table PAT 134 is not empty. If PAT 134 is not empty, then the first device 13 address is obtained from that table. If the device 13 has a BST 137 entry, i.e., a segment is allocated and is listed in the pending deallocation table PDT 138, then the two entries, if identical, are cancelled. Microprocessor 110 also determines whether or not the logical device will need a pair of segments 16 as opposed to a single segment 16. If the segments are allocated, then the device address is deleted from PAT 134. To implement such allocations, microprocessor 110 from BM ABS 1355 activates logic module BM ASE 1356 for allocating a single segment or logic module BM ASP 1357 for allocating a pair of buffer 15 segments. Allocation of segments may require a deallocation. Accordingly, BM DBS 1359 is activated when a deallocation is required. BM DBS 1359 can in turn activate logic module BM PDT 1384 for making an entry into PDT 138. A deallocated buffer 15 segment is defined as becoming the least recently used LRU segment. Accordingly, microprocessor 110 activates logic module BM LRU 1360 to update an LRU list (not shown) in BST 137. Deallocation of a buffer segment may also require device operations. Accordingly, microprocessor 110 from logic module BM DBS 1359 can follow path 1368 to activate logic module DM SCH 1353. When BM DBS 1359 deallocates a buffer 15 segment having data read from a device 13 via logic module DM RAH 1350, logic module CS RDA 1351 (not detailed) is activated to purge data from buffer 15.

The beginning of each chain of channel commands can include a known MODESET command. Logic module CS SCE 1330 upon detecting a MODESET command activates logic module CE MDS 1324 over line 1335. As a result of executing logic module 1324, microprocessor 110 over line 1326 will set a WM field (not shown) in CST 131 as well as activate data flow 83 to accommodate recording densities as commanded in such a command. In some embodiments of the control unit, a channel adaptor 80 may perform many of the functions of mode setting.

Circuits 1372 (FIG. 50) detect so-called buffer overrun conditions; when data coming into the buffer is to be stored in a record limiting or stop address, an overrun is signaled. An overrun from host 12 to buffer 15 is indicated by an interruption signal on line 1373. This interruption signal activates interrupt scan 1321 as indicated by line 1380 to activate logic module CB UWO 1381. Microprocessor 110 in executing logic module CB UWO 1381 determines whether or not more buffer space can be given to a record that overran its presently allocated space. If more than one record is currently stored in the buffer 15 segment of the addressed logical device and if this device is currently writing data onto tape 260, then action is deferred until the signal transfer from buffer 15 to device 13 is completed. Otherwise, the BRT 141 register (FIG. 4) associated with the record is erased and all of the other records stored in the buffer 15 segment are written on the tape via logic module CS CBW 1349. This activation is not shown in FIG. 38. Other activations of CB UWO 1381 by microprocessor 110 are indicated by line 1382 extending to logic module BM DIS 1383 which disables operation of the buffer 15 segment involved. Also logic modules BM PDT 1384 and BM PAT 1358 are actuated for deallocating a single segment and allocating a segment pair for the logical device. In the event that a segment pair has already been allocated, then the tape synchronous mode is set.

Rewinding tape 260 to BOT (beginning of tape) is achieved by CU-0 responding to a REWIND UNLOAD command executed via logic module CE REW 1363. Rapidly positioning tape 260 to an addressable location is handled via logic module CE LOC 1364 for a LOCATE BLOCK command. These three commands from a host 12 signify to subsystem 10 that host 12 is undergoing a major change in data processing. Accordingly, subsystem 10 for the addressed device 13 terminates any tape synchronous mode and read ahead (no prefetching of data to buffer 15 from the addressed device 13) or writes data from buffer 15 into the addressed device 13 so that the buffer 15 segment is empty. In addition to these commands, a tape mark (write or read mode) is interpreted as a possible major change in data processing. Accordingly, microprocessor 110 via logic module DB RTM 1364A, reached from scan 1321, upon detection of a tape mark from tape 260 or by a command WRITE TAPE MARK received from host 12 resets the subsystem 10 control relating to the addressed device 13. Such resetting includes resetting the mode to the buffer mode, inhibiting read ahead, and resetting a block size indicator (not shown) of LDT 133 to zero.

For an overrun during a data transfer from a device 13 to an allocated buffer 15 segment, circuits 1372 provide an interruption signal over line 1374 to activate logic module DB DBO 1385. Operation of DB DBO 1385 is similar to that for CB UWO 1381. The third interruption signal on line 1375 relates to buffer 15 segment being empty or full and is not fully described. Lines 1373, 1374 and 1375 are all a portion of interruption lines 122 shown in FIG. 3 for the interruption of microprocessor 110.

Termination of a data transfer operation as well as other operations of storage subsystem 10 can be achieved by a host 12 sending a CMDO (COMMAND OUT) signal as represented in FIG. 38 by line 1386. The COMMAND OUTsignal is part of the interface connection 14 protocol. Such a signal can cause, during a write operation, activation of logic module CB EUW 1387 for the termination of the data transfer currently in progress between a host 12 and a buffer 15. Execution of CB EUW 1387 results in the FIG. 50 circuits being reset to terminated host 12 and buffer 15 automatic data transfer. From logic module CB EUW 1387 microprocessor 110 activates logic module CS CTC 1388 for handling control data changes necessary for stopping a data transfer. These actions are a normal ending of a data write operation. It is to be understood that read operations and other operations are similarly terminated by other logic modules, not shown. All of the above description assumes that the microprocessor 110 and all of the other elements of storage subsystem 10 have been suitably initialized using known data processing techniques.

Figure 39:
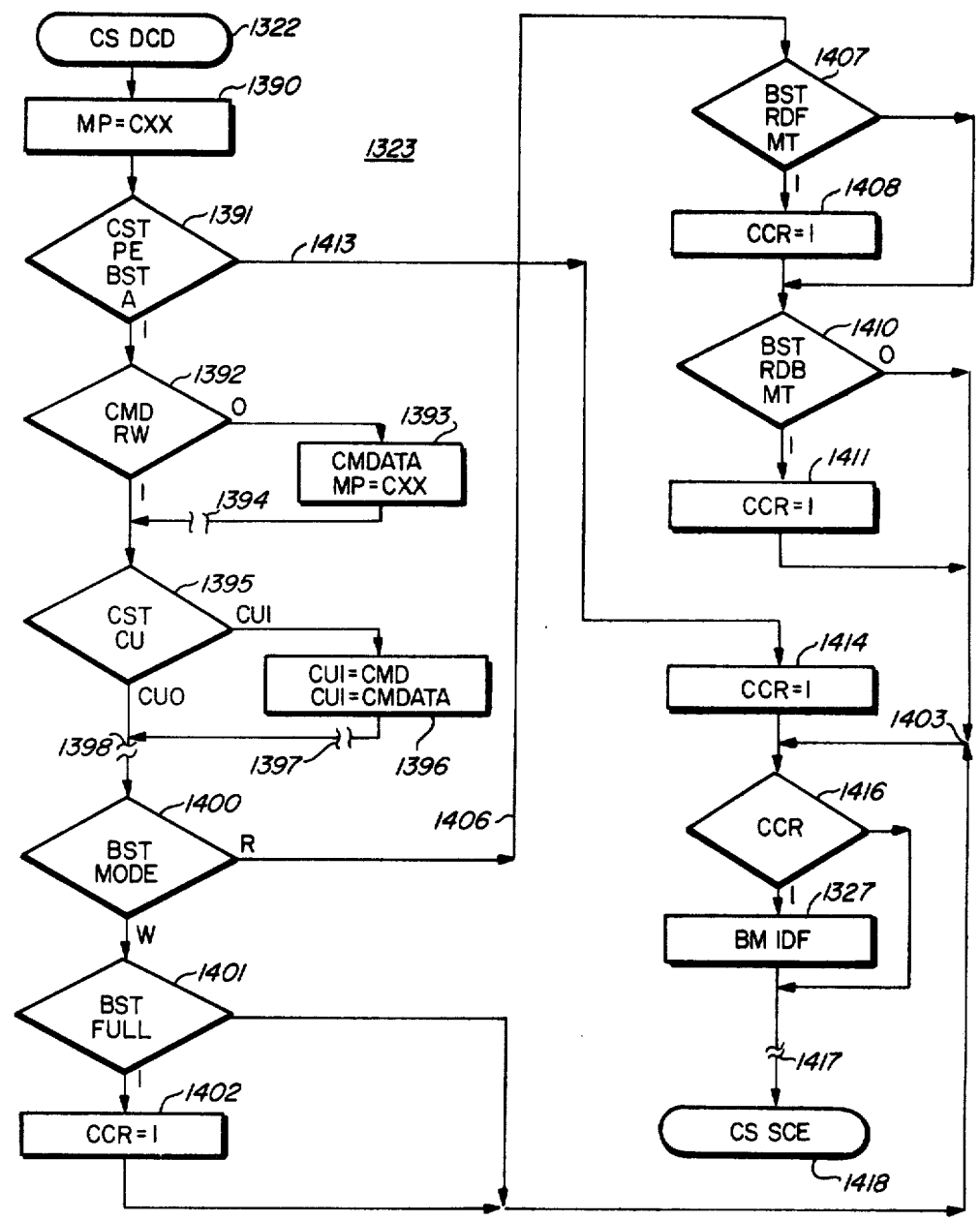
FIGS. 39-44 are logic flow block diagrams showing logic modules indicated in the tabulation below.

FIG. 39 illustrates the microcode logic module CS DCD 1323. This logic module is activated at 1322 by receiving a command or alternatively by activation internally by microprocessor 110. The first actions at 1390 analyze the source of the activation, i.e., whether or not a command was received from an adaptor 80 or a message received from the other control unit 11 (OCU), the address of the device 13 being addressed (this address is saved in a work register of microprocessor 110) and the command code (MP=CXX) indicating what is to be performed by storage subsystem 10. After the above described housekeeping operations have been completed, microprocessor 110 at 1391 senses the contents of CST 131 to determine whether or not the addressed device 13 has any identified errors or unusual conditions and whether BST 137 indicates a buffer 15 segment is allocated such that some activity for the addressed device 13 can occur. If the above-listed criteria are met, then at 1392, microprocessor 110 examines the received command stored in LDT 133 to determine whether or not the command is a READ or WRITE command. If not a READ or WRITE, then at 1393 and 1394, auxiliary functions not pertinent to an understanding of the present invention are performed; these include receiving command data (CMDATA) from the channel adaptor 80, such as parameters modifying a logical control command, and the like. Numeral 1394 indicates that the character of the command and the like has to be analyzed. Upon completion of such ancillary operations or when the command examined at 1392 is a READ or a WRITE command, microprocessor 110 at 1395 determines from CST 131 which control unit 11 is to execute the command stored in LDT 133. If the control unit is the other control unit, such as CU-1, then a message concerning the command is transferred to CU-1 via cable 109. Such message is transferred at 1396 which includes the command data and the command itself. At 1397, additional housekeeping functions are performed not pertinent to an understanding of the present invention. If the command is to be executed by the local control unit, i.e., CU-0, then no action need be taken. Additional non-pertinent logic steps are performed at 1398. Finally at 1400, microprocessor 110 reads BST 137 to determine the mode of operation of the buffer 15 segment allocated to the addressed device 13, i.e., is it in a read or write mode.

All of the remaining steps shown in FIG. 39 relate to detection of a delay in command execution. For example, at 1401, microprocessor 110 determines whether or not a buffer 15 segment allocated to the addressed device 13 is full. BST 137 has a section (not shown) which indicates whether the buffer 15 represented by the entry of BST 137 corresponding to the device 13 is full or empty. If the identified buffer 15 segment is not full, then there is no delay in a write mode. If the identified buffer 15 segment is full in the write mode, then at 1402 microprocessor 110 sets channel command retry CCR and reports this delay to channel adaptor 8 for relaying to host 12. From steps 1401 and 1402 the CCR check exit routine having steps 1416-1418 is entered through point 1403, as later described.

If, at logic step 1400, BST 137 indicates the addressed device 13 is in the read mode, microprocessor 110 follows logic path 1406 to check whether or not the buffer 15 segment allocated to the addressed device 13 is empty. This check is achieved in four steps 1407-1411. First at 1407, microprocessor 110 determines whether or not the addressed logical device is in the forward or backward mode and whether the buffer segment full or empty section as indicated in BST 137. If the logical device is in the read forward mode and the buffer 15 segment is empty, then a delay is indicated by microprocessor 110 at 1408 by setting CCR to unity and reporting a channel command retry to host 12 via a channel adaptor 80. In a similar manner at 1410, microprocessor 110 examines the BST 137 entry associated with the addressed device 13 to determine whether or not the addressed device is in the read backward mode and empty. If the buffer 15 segment is empty, then at 1411 a channel command retry is initiated. Returning momentarily to 1391, if the addressed device does not have an allocated buffer 15 segment as indicated by BST 137, then microprocessor 110 follows path 1413 to set channel command retry CCR at 1414. Microprocessor 110 has now checked all possible conditions in the decoding of commands and receipt of messages from the other control unit 11 which may relate to a command that would cause a buffer-causing delay to be indicated by a channel command retry.

The CCR checking routine having steps 1416–1418 is entered through point 1403. At 1416, microprocessor 110 checks whether or not a channel command retry has been instituted by any of the previously described operations. If not, then some "housekeeping" steps are performed at 1417, which steps are not pertinent to an understanding of the present invention. If a delay is instituted, then CCR count (not shown) in LDT 133 for the addressed device is incremented. This action is achieved by activating logic module BM IDF 1328 at step 1327, which in FIG. 38 is shown as a line from CS DCD 1323 to BM IDF 1328. The last step at 1418 activates logic module CS SCE 1330, shown in FIG. 40. Each time microcode logic module CS DCD 1323 is activated, CS SCE 1330 is also activated.

Figure 40:
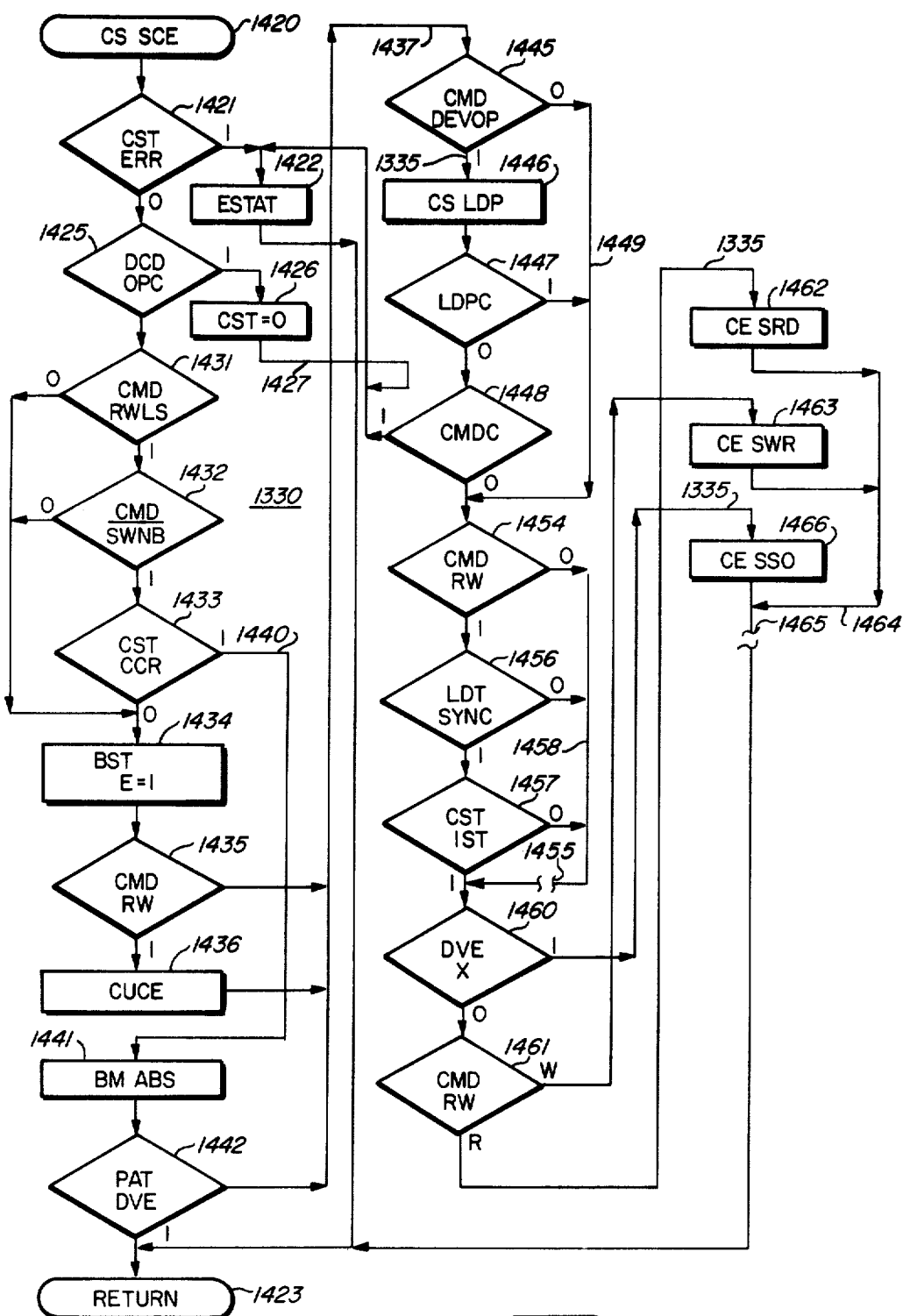

FIG. 40 illustrates logic module CS SCE 1330. This module for each command received having a required device function ensures that a buffer 15 segment for the addressed device has been allocated. If the command is a buffer using command, it also initiates buffer and device (logical device) preparation for the command as appropriate. It also calls the proper command execution logic module of CUCE 152 to execute the command as will become apparent. This logic module also enables microprocessor 110 to present ending status to the host 12 via a channel adaptor 80 and adjust the command status table 131 as appropriate, hence this logic module is the initiator and the finisher for each functional command execution. Logic module CS SCE 1330 is only entered after microprocessor 110 has executed logic module CS DCD 1323 or later described module CS LDC 1348. The logic module begins at 1420 whereupon at 1421 microprocessor 110 first checks for an error condition indicated in CST 131. If an error is indicated, then ending status (ESTAT) is reported to the host 12 via a channel adaptor 80 at 1422. Then microprocessor 110 returns to an activating logic module at 1423.

Generally an error condition has not occurred, so microprocessor 110 at 1425 determines whether or not the operation has been completed (OPC=1) as indicated by logic module CS DCD 1323. When the operation has been completed as indicated by logic module CS DCD 1323, the register of CST 131 containing the information for the current command is erased at 1426. Then microprocessor 110 follows path 1427 to report ending status at 1422 and return to the calling module at 1423. When the operation is not complete (OPC=0), microprocessor 110 at 1431 and 1432 analyzes the command. At 1431 microprocessor 110 determines whether or not the received command is a READ (either forward or backward direction), WRITE, LOCATE BLOCK, READ DATA BUFFER, SENSE or a SYNCHRONIZE command. If the command is any one of the above, then at 1432, microprocessor 110 determines that the command is *not* one of the following commands: REWIND, READ DATA BUFFER, a SYNCHRONIZE, a SPACE BLOCK command. The effect of analysis of steps 1431 and 1432 identifies those commands that will have to use buffer 15. For these commands, microprocessor 110 will verify whether or not a buffer 15 segment has been allocated. But first, at 1433 microprocessor 110 checks CST 131 to determine whether or not a CCR has been sent to a host 12 for this specific command, as such as would be required by buffer conditions. If the received command identified in steps 1431 and 1432 is not CCRed or the command is other than those identified in the logic of steps 1431 and 1432, then at 434 microprocessor 110 accesses BST 137 to set an E field (not shown) to unity to indicate that the buffer 15 segment for the addressed device is engaged, i.e., the command is about to be executed and therefore the buffer 15 segment is busy. Then microprocessor 110 at 1435 determines whether the command is either a READ or a WRITE. For a READ or WRITE command, microprocessor 110 at 1436 activates a command execution logic module within group CUCE 152 as indicated by line 1335 of FIG. 38. The logic module activated is a function of the command identified in CST 131. From steps 1435 and 1436 microprocessor 110 follows line 1437 to execute a series of steps, as will be later described.

Returning to 1433, if CST 131 had indicated a CCR had been given for the instant command, microprocessor 110 follows line 1440 to allocate a buffer 15 segment by activating logic module BM ABS 1355 at 1441. Microprocessor 110 in following logic module BM ABS 1355 will attempt to allocate a buffer 15 segment to the addressed logical device for performing the instant command. Following a return from that logic module, microprocessor 110 at 1442 determines from PAT 134 whether or not a buffer 15 segment has been scheduled for allocation to the addressed device. This information can also be provided by a so-called "return code" stored in a predetermined work register (not shown) of microprocessor 110 developed by BM ABS 1355 which indicates that PAT 134 has received a request for allocation for the addressed device. If all of this activity is successful, microprocessor 110 returns at 1423 awaiting the actual allocation and other activities that must occur before the command execution can proceed. On the other hand, if there was an allocation already in hand, then the command execution can proceed. Therefore, microprocessor 110 from 1442 will proceed along line 1437 to execute the above referred to steps, as will now be described.

At 1445 microprocessor 110 determines whether or not a device 13 operation will be required to execute the instant command. If this is the case, a logical device must be prepared via line 1335 (corresponding to line 1335 of FIG. 38) to activate logic module CS LDP 1347 as briefly described with respect to FIG. 38 and as detailed in FIG. 43. Following microprocessor 110 executing CS LDP 1347, microprocessor 110 at 1447 checks whether or not the logical device preparation has been complete (LDPC).

If preparation was not completed, microprocessor 110 at 1448 checks to see whether or not the command execution is complete (CMDC). If CMDC=1, ending status is reported at 1422, as previously described. On the other hand, at 1447 if preparation of the logical device is complete (LDPC=1) or at 1448 the command execution is incomplete (CMDC=0) or at 1445 it is not a device operation (DEVOP=0), microprocessor 110 proceeds over line 1449 to 1454 to see if the command is a READ or a WRITE command. If it is not either of those two commands, then some non-pertinent logic functions are performed at 1455 and microprocessor 110 will then return to the activating logic module at 1423. If the received command is a READ or WRITE command, microprocessor 110 at 1456 checks to see whether or not the tape synchronous mode (read or write) of operation is indicated in LDT 133. If the mode is not the tape synchronous mode, then non-pertinent logic steps 1455 are executed; otherwise microprocessor 110 proceeds to 1457 to examine CST 131 for a first pass indication of execution of the received command. If it is not the first pass, then non-pertinent logic steps 1455 are performed, otherwise microprocessor 110 follows path 1458 to logic step 1460 to determine if the addressed device has been held for the instant command (DVE X). If the addressed device has been held (DVE X=1) then, remembering that the tape synchronous mode was indicated at 1456, a tape synchronous operation can ensue. However, if the addressed device is not being held for the instant command (DVE X=0), then the tape synchronous operation mode must be set up between the control unit 11 and the addressed device 13. To do this, microprocessor 110 at 1461 determines whether the command is a READ or a WRITE. If it is a READ command, then at 1462 microprocessor 110 goes to logic module CE SRD 1339 for setting up the tape synchronous mode (read) within subsystem 10 for the addressed device. In FIG. 38 this is reached over line 1335, which is also indicated in FIG. 40. In the write mode, microprocessor 110 proceeds from 1461 via 1335 to logic module CE SWR 1340 at 1463. After executing either one of these logic modules, microprocessor 110 follows path 1464 to perform some non-pertinent logic functions at 1465 and then goes to return 1423.

On the other hand, if the addressed device has been held (DVE X=1), then steps 1462 and 1463 will have already been completed. The tape synchronous mode then can be initiated for executing the received instant command. Accordingly, microprocessor 110 from 1460 then proceeds via 1335 to 1466 which activates logic module CE SSO 1342 which actually initiates transfer of data signals between a device 13 and a control unit 11 set up by either logic module CE SRD 1339 or CE SWR 1340.

At this point in the processing of a received command, microprocessor 110 of control unit 11 had decoded the command, determined the status of the subsystem and either is in the process of preparing the subsystem to actually execute the command or has initiated execution via one of the command execution modules, such as at 1436, and as described elsewhere with respect to FIGS. 39 and 40.

Figure 41:
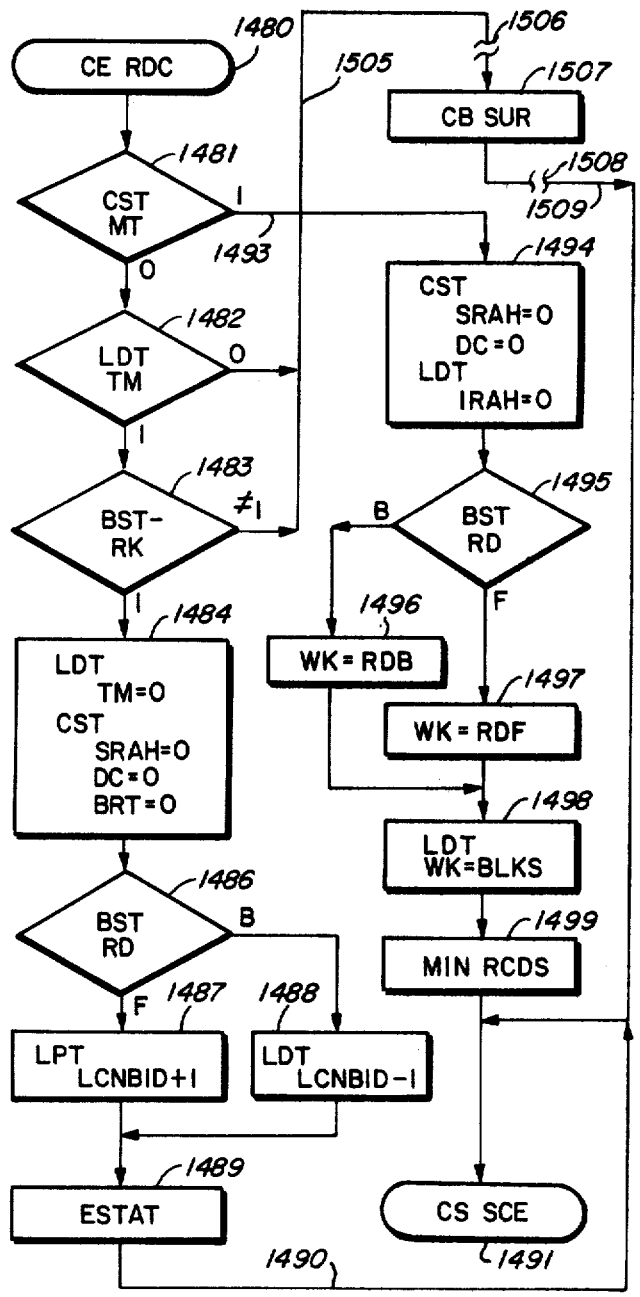

FIG. 41 illustrates logic module CE RDC 1336 which enables microprocessor to control the execution of the READ FORWARD and READ BACKWARD commands received from host 12. Microprocessor 110 in responding to logic module CE RDC 1336, activates other logic modules as shown in FIG. 38. To initiate data transfers to buffer 15 and transfers to host 12, and the received command has not been responded to by a UNIT CHECK or a CCR caused by path unavailability, i.e., buffer 15 was not available or the addressed device 13 was not available, this logic module is activated by microprocessor 110 in response to logic module CS SCE 1330 of FIG. 40. Whenever a READ command has a CCR, and host 12 returns the READ command a second time, other logic modules described elsewhere execute the second received READ command.

From logic module CE SCE 1330 microprocessor begins the logic functions of CE RDC 1336 at 1480. The first logic function at 1481 examines CST 131 to determine if this is a first pass or not. If it is a first pass, then the buffer 15 segment allocated to the addressed logical device is empty (MT). If it is a first pass and the allocated buffer 15 segment is not empty; then, at 1482 microprocessor 110 examines LDT 133 to determine if the sole record in the buffer 15 segment allocated to the logical device is a tape mark (TM). In this regard, steps 1482 through 1489 are those functions performed by a control unit 11 under control of microprocessor 110 when a tape mark is the only record in the allocated buffer 15 segment. Before proceeding with this description, the status of the buffer 15 segment will be reviewed. It can be assumed that read ahead has occurred from a device 13 to the allocated buffer 15 segment. The last record read would be a tape mark. At this time, read ahead is suppressed in the subsystem for the addressed device by setting a suppress bit in CST 131 associated with the particular data transfer. Subsequent READ commands received from host 12 cause the previously read record to be transferred to a host 12. Finally a READ command is received for the tape mark that was previously read by device 13. When this occurs, microprocessor 110 at 1482 proceeds to perform the logic functions for subsystem 10 indicated in steps 1483 through 1489. If it is not a tape mark, or not the last record in the buffer 15 segment, then other steps are performed as later described.

In processing the sole remaining tape mark record in the buffer 15 segment, microprocessor 110 at 1483 first verifies that the tape mark is the last record in the allocated buffer 15 segment. This is done by examining BST 137 to determine the record count (RK). If the record count is greater than one, then other records have to be transferred to host 12 before the tape mark can be handled. Since it is desired not to transmit the tape mark information to host 12, except for the fact that a tape mark has been encountered, microprocessor 110 upon detecting that the last record in the buffer 15 segment is a tape mark (steps 1482, 1483 determine this), microprocessor 110 at 1484 accesses LDT 133 for resetting the tape mark indication to zero. CST 131 is entered to reset suppress read ahead indication and all direction change bits (not shown). Finally the BRT 141 register corresponding to the record in buffer 15 segment containing the tape mark is cleared to zero and the entry in the corresponding BRT 141 register is erased.

In processing the tape mark record, steps 1486 to 1488 relate to logical count control. At 1486, microprocessor 110 examines BST 137 to determine if the buffer 15 segment is in a read forward or read backward mode. If it is in a read forward mode (F), then an LDT 133 section (not shown) containing the logical address (LOG) of the tape mark is incremented by 1 to indicate the next record to be read from tape 260. This logical number LOG has been identified in FIG. 41 by LCNBID. On the other hand if the direction of tape motion is in the backward direction, B, then at 1488 microprocessor 110 decrements the logical number LCNBID. Decrementing LCNBID identifies the record on tape 260 next closest to BOT. Then ending status is selected at 1489 for reporting via logic module CS SCE 1330. Return to CS SCE 1330 is via line 1490 and exit point 1491.

Returning to function 1481, if the examination of CST 131 indicates that the buffer 15 allocated segment is empty (MT=1), microprocessor 110 proceeds over path 1493 to control function 1494. There microprocessor 110 alters the contents of CST 131 for the instant command by resetting the suppress read ahead indication and the above-mentioned direction change bits (see step 1484). Also, in LDT 133 any read ahead inhibit indication is reset. Then at 1495, microprocessor 110 examines BST 137 to determine if the buffer 15 segment is in a read forward or backward mode. Then, depending upon the direction bit indicating the result of the examination, microprocessor 110 changes in a work register (not shown) within microprocessor 110 that it is a read forward F or read backward B operation as respectively indicated at 1497 and 1496. At 1498, the block size (BLKS) of the record to be transferred from the addressed device 13 to buffer 15 is transferred from LDT 133 to a work register (WK) (not shown) in microprocessor 110 for the purpose of determining a minimum of records to be transferred in the next read ahead operation. Block size (BLKS) is determined by microprocessor 110 in previous READ commands by counting the number of byte transfers; for the first received READ command; any arbitrary or capricious block size may be used. Then, the first READ command will transfer a predetermined number of bytes. This predetermined number of bytes will then be used as the next block size. As block size changes, an algorithm may be implemented for tracking the dynamic changes in block size of the data as it flows between device 13 and host 12.

At 1499, microprocessor 110 executes an algorithm for calculating a minimum number of records to be transferred on the next read ahead operation. This is indicated in FIG. 41 by MIN RCDS. While many algorithms may be employed, a good algorithm is to divide the number of free bytes in the allocated buffer 15 segment indicated in BST 137, for the allocated buffer 15 segment, by the block size number in LDT 133. This in effect divides the number of free bytes of the allocated segment by the number of bytes expected in a block of records. In other words, the minimum number of records are those records that should fill the allocated buffer 15 segment.

It will be remembered that as a read ahead is instituted and the first record is lodged into the allocated buffer 15 segment, a DEVICE END is sent by control unit 11 to host 12 indicating that the previously CCRed READ command can now be performed. Host 12 may immediately fetch the first read record from the allocated buffer 15 segment. If this is the case, then as host 12 fetches the record, the device 13 which is now transporting tape 260 during the read ahead operation will continue to transport tape and transfer records beyond the minimum number of records into the allocated buffer 15 segment for satisfying the host 12 desires for additional data. Further algorithms can be employed for limiting the time of transfer such that one process within a host 12 will not overly dominate operation of storage subsystem 10. For example, a time slot of 500 milliseconds may be employed as a maximum time for transferring data from any device 13 to any allocated buffer 15 segment. After this time out, other processes will be allowed access to subsystem 10. Since this time out is known, devices 13 can accelerate during the last portion of the data transfer time such that no tape acceleration time is lost in data transferring for maximizing subsystem 10 performance.

Returning now to logic steps 1482, 1483, if there is more than one record in the allocated buffer 15 segment or there is no tape mark record in the allocated buffer 15 segment, then microprocessor 110 follows path 1505 to perform some non-pertinent logic functions at 1506 which, by way of example, may relate to diagnostic checking to see if a diagnostic mode has been imposed upon storage subsystem 10. Then microprocessor 110 at 1507 activates logic module CB SUR 1343 (not detailed) for initiating a transfer of data signals from the allocated buffer 15 segment to host 12. Then at 1508 some non-pertinent functions are performed, such as checking for errors to build ending status if a data transfer cannot be effected and also to indicate in CST 131 that the command will be continuing, i.e, there are more functions to be performed. Then microprocessor 110 follows path 1509 to return to logic module CS SCE 1330 at 1491.

The above description has shown a start of a READ command execution. The following description describes the onset of a write operation. To begin a write operation, storage subsystem 10 must first receive a MODESET command. Logic module CE MDS 1324 (FIG. 38) executes the MODESET command within microprocessor 110. Some of the execution of a MODESET command can be in channel adaptor 80. Such operation is beyond the scope of the present description. Logic module CE MDS 1324 is always activated from logic module CS SCE 1330 as shown by line 1335 of FIG. 38. The MODESET command includes a DADDR field for indicating a device 13 being addressed and which will have a MODESET in accordance with the other fields in the command. A format field (not shown), which in a write mode, selects the density to be written on tape 260 and other format controls as may be desired. The write mode indication is decoded by microprocessor 110 in executing logic module CE MDS 1324. The MODESET can last for many chains of command.

Figure 42:
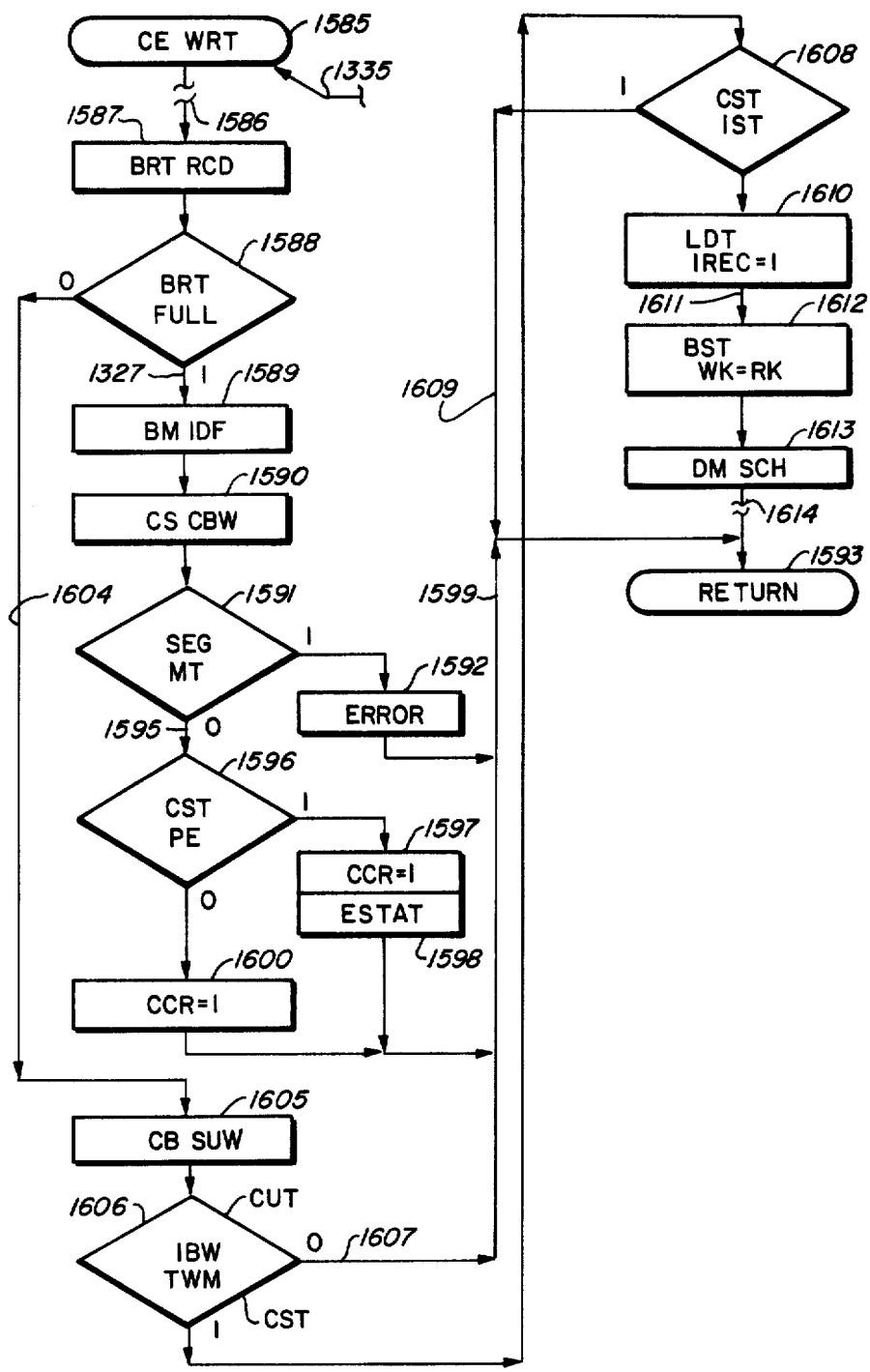

Once a MODESET command has been successfully executed, then storage subsystem 10 is ready to receive WRITE commands. The decoding of each WRITE command includes requesting allocation of a buffer 15 segment in logic module CS SCE 1330 (FIG. 40) by activating BM ABS 1355 at 1441. Accordingly, when logic module CE WRT 1337 of FIG. 42 is activated via CS SCE 1330, microprocessor 110 can then begin execution of the received WRITE command. Logic module CE WRT 1337 includes creation of an entry in BRT 141 by reserving a BRT register for the block of data expected to be received from host 12 and then starts the data transfer from host 12 to buffer 15 segment that was allocated to the addressed device 13. When a tape write mode has been set or "inhibit buffer write" (IBW) is active, then data that is currently in the allocated buffer 15 segment is first transferred to a device 13 before data can be received from host 12 under the currently received WRITE command. Logic module CE WRT 1337 (FIG. 42) is entered at 1585 which corresponds to line 1335 of FIG. 38. At 1586 certain maintenance procedures are checked in a similar manner to that described for logic module CE RDC 1336. At 1587 microprocessor 110 creates a record entry in BRT 141 by reserving a register in BRT 141 for the record that is incoming. This includes writing a link address in a link list of BRT 141. The actual reserving of a BRT 141 register is executed in CUBM 150 by a logic module BM CRE (not shown) which creates a record entry by reserving a register. Microprocessor 110, in executing BM CRE (not shown), may find that all of the registers 180 have already been assigned. In other words, BRT 141 is full. At 1588 microprocessor 110 checks the return code from BM CRE (not shown) to determine whether or not BRT 141 is full. If BRT 141 is full, then a channel command retry must be instituted, then the data already resident in the allocated buffer 15 segment or other segments must be written to tape 260 such that BRT 141 registers associated with those records can be freed. The CCR count is also incremented. Accordingly, microprocessor 110 at 1589 activates logic module BM IDF 1328 as described with respect to FIG. 38 as represented by line 1327. Following this activity, microprocessor 110 at 1590 activates logic module CS CBW 1349, as later described with respect to FIG. 46. This logic module activates the storage subsystem 10 to transfer the contents of the allocated buffer 15 segment to a device 13 for freeing BRT 141 registers for the data records next to be received. Following this action, microprocessor 110 analyzes the results of attempting to schedule the necessary recording operations on device 13. At 1591 microprocessor 110 checks to see whether or not the allocated segment was empty (MT). If it was empty (MT=1), an error condition has occurred and accordingly, at 1592 microprocessor 110 gathers error data for reporting and returns to the activating logic module via return 1593. Generally, the segment will not have been emptied; then at 1595, which represents that microprocessor 110 has scheduled a write operation to the addressed device 13 via logic module CS CBW 1349, it will check CST 131 to determine whether or not a permanent error has occurred. If a permanent error has occurred, microprocessor 110 at 1597 sends a CCR to host 12 along with ending status generated at 1598. Microprocessor 110 then follows path 1599 to return 1593. Without a permanent error (PE=0), which is the usual case, microprocessor 110 sends the CCR to host 12 at 1600. This CCR is necessary to allow the subsystem 10 time to execute the write operations scheduled via logic module CS CBW 1349. After step 1600, the activating logic module is returned to via return 1593.

Returning now to step 1588, if BRT 141 has registers available for identifying the record to be received; then microprocessor 110 following path 1604 activates logic module CB SUW 1344 at 1605. Logic module CB SUW 1344 activates a channel transfer from host 12 to buffer 15 in the same way that logic module CB SUR 1343 started a data transfer from buffer 15 to host 12. Continuing on, at 1606 microprocessor 110 examines CUT 130 for an inhibit buffer write (IBW) indication and CST 131 to see if the tape write mode is indicated. If neither of the conditions are met, then microprocessor 110 follows path 1607 to return to the activating logic module. If on the other hand, either one of the conditions are met at step 1606, microprocessor 110 at 1608 examines CST 131 for a first pass indication. If it is the first pass, then no more activity can be presently achieved. Accordingly, microprocessor 110 follows paths 1609 and 1599 to return 1593. If it is not the first pass, then some preparatory work has already been done and accordingly, reconnection to the host is inhibited at 1610 by setting an inhibit reconnection bit in LDT 133 to the active condition. Then following path 1611, microprocessor 110 performs the function at 1612 of transferring the record count RK of BST 137 to work registers (not shown) within the microprocessor. The RK value indicates to microprocessor 110 the number of records in the allocated buffer 15 segment such that this number of records can be transferred to a device 13. Such a transfer is scheduled at 1613 by activating logic module DM SCH 1353 (FIG. 31) to schedule the number of records equal to the record count RK for recording. At 1614, non-pertinent functions are performed and finally at 1593 the activating logic module is returned to.

Figure 43:
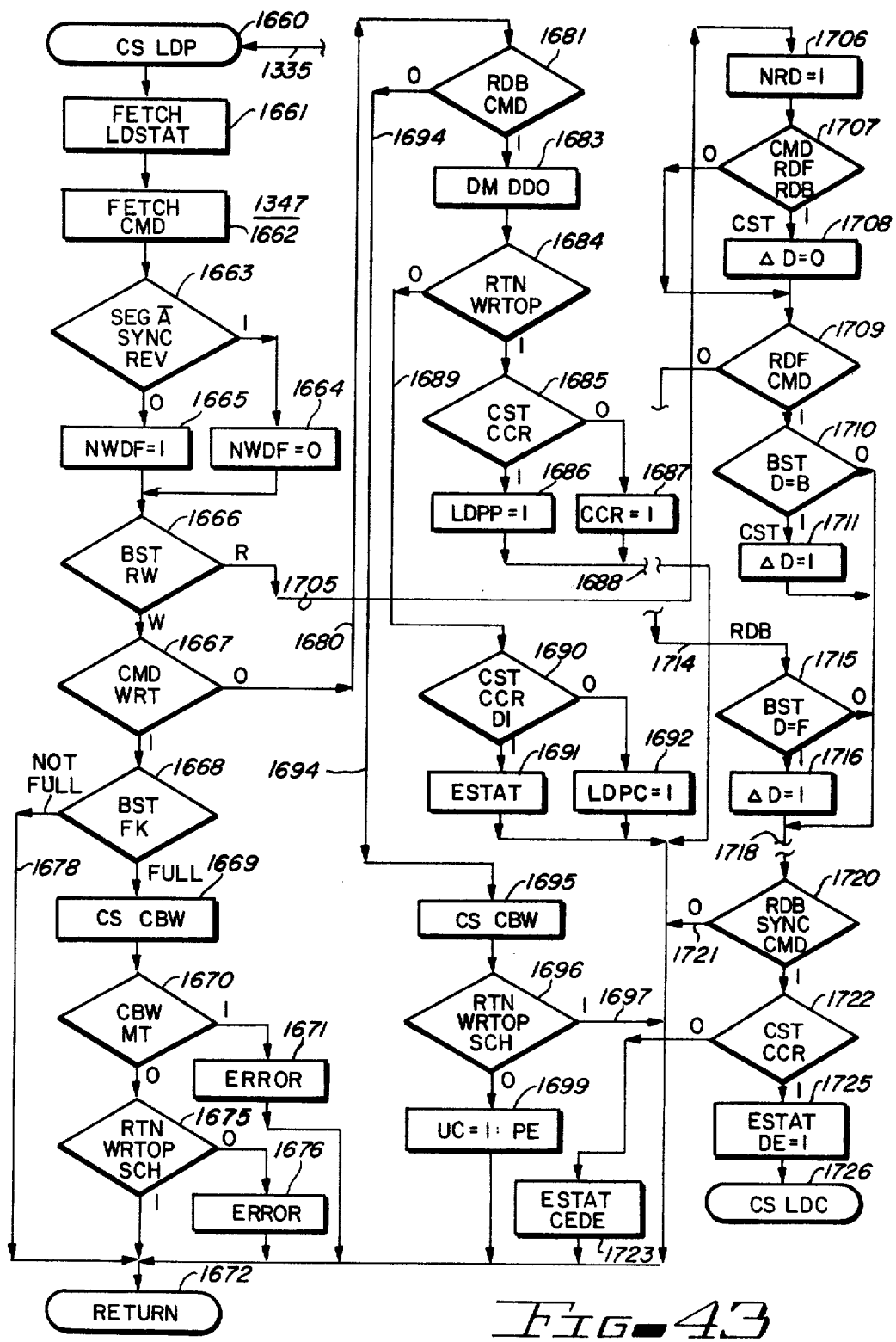

Once a CCR has been sent by storage subsystem 10 to a host 12, subsystem 10 signifies to host 12 by a DEVICE END signal that preparatory steps necessary for executing the CCR'd command have been met. Then the host 12 will reissue the input/output command to the storage subsystem. Accordingly, when a command has been received by the storage subsystem 10 and is being analyzed by CS DCD 1323 and CS SCE 1330 in preparation for execution of a READ, READ BACKWARD, or WRITE command and was previously CCR'd due to improper buffer 15 conditions (empty or full), then microprocessor 110 executes logic module CS LDP 1347 and CS LDC 1348 to prepare the logical device for the operation. FIG. 43 details logic module CS LDP 1347 which fetches present buffer condition status from status store 100 and can initiate a write to device 13 operation to make some buffer 15 space in an allocated segment available for the newly received WRITE command. For a READ BUFFER command to ensure that all writing operations to a device have been completed before the command is executed, all data to be written on a device 13 is first written to tape 260. When a newly received command is not a WRITE or READ BUFFER command, microprocessor 110 performs other operations, as will become apparent from the description of FIG. 43. Logic module CS LDP 1347 is activated as indicated in FIG. 14 via line 1335. In FIG. 43, activation occurs at 1660, then, microprocessor 110 at 1661 fetches the logical device (LD) status from status store 100. This information includes a so-called device status byte which includes indications of whether or not the addressed device 13 is repositioning, rewinding at end of tape, at beginning of tape, unit check conditions, device end conditions, file protect and other operational details. All of these signals are stored in work registers (not shown) of microprocessor 110 for execution of this logic module. Further, at 1662 microprocessor 110 accesses CST 131 to transfer the received command code to a work register (not shown) of microprocessor 110. Now microprocessor 110 has all of the necessary data plus the data in the tables of control store 111 to execute this logic module.

At 1663 microprocessor 110 examines whether or not a buffer 15 segment is allocated to the addressed logical device and whether the command is a SYNCHRONIZE, READ DATA BUFFER, REWIND, or a REWIND UNLOAD command. If the above multitude of conditions are met, then a so-called no write data flag (NWDF) is set at 1664. If the conditions are not met then the NWDF flag is reset at 1665. This flag is in a work register (not shown) of microprocessor 110. Then at 1666, if the microprocessor 110 determined that a buffer 15 segment is allocated to the addressed logical device represented by the addressed device 13, then that allocated buffer 15 segment can be in the write mode resulting in the fact there may be write data residual in that allocated buffer 15 segment. Then at 1667 if the microprocessor 110 determined that the command code fetched at 1662 is a WRITE command, microprocessor 110 at 1668 determines whether or not the buffer is full. This determination is achieved by accessing BST 137 to determine the count of free bytes in the allocated buffer 15 segment. If the free bytes are less than the block size indicated in LDT 133, then the buffer is full. Following that determination, microprocessor 110 at 1669 activates logic module CS CBW 1349 (FIG. 46) for recording the data resident in the allocated buffer 15 segment onto the addressed device 13 such that the WRITE command can be executed. Logic module CS CBW 1349 (FIG. 46) then schedules a write operation to the addressed device 13. Returning from logic module CS CBW 1349, microprocessor 110 at 1670 looks at the return code to see if the execution of CS CBW 1349 resulted in an indication that the allocated buffer 15 segment was empty (MT=1). If the return code indicated empty, then an error condition has occurred. The error data is assembled at 1671 and the microprocessor 110 returns to the activating logic module at 1672. Generally the write operation will have been scheduled by microprocessor 110 through logic module CS CBW 1349. Then from 1670, microprocessor 110 proceeds to 1675 to see if a write operation actually had been scheduled. If not, an error has occurred and that error data is assembled at 1676 with return via 1672. Without an error, microprocessor returns directly to the activating logic module. On the other hand at 1668 if BST 137 indicated that the allocated buffer 15 segment was not full, then microprocessor 110 follows path 1678 directly to return 1672.

Returning to 1667, when the command fetched at 1662 is not a WRITE command, microprocessor 110 follows path 1680 to determine at 1681 whether or not the command is a READ DATA BUFFER command (RDB). If it is a READ DATA BUFFER command, this means that host 12 wants to retrieve the data originally intended to be recorded on a device 13 and a write operation should not continue. Accordingly, at 1683 microprocessor 110 activates logic module DM DDO (not shown) which enables microprocessor 110 to delete scheduled device operations from any of the three queues 21-23 in DOT 136. If the addressed device is currently in a data transfer mode, the transfer is stopped. Logic module DM DDO enables microprocessor 110 to provide four return codes. The first code indicates that no device operation was scheduled in DOT 136 or was actually in progress for the addressed device 13. A second return code indicates that the operation was deleted from the queues in DOT 136. A third code indicates that a data transfer operation was occurring and it was terminated. The last code indicates that the addressed device is selected. Following execution of logic module DM DDO, microprocessor 110 at 1684 checks a return code for the third return code which indicates that a write operation (WRTOP=1) was terminated. If this is the case, then at 1685 microprocessor 110 examines CST 131 to see if a CCR had been sent to host 12. If a CCR actually had been sent, then microprocessor 110 at 1686 sets a microprocessor flag in a work register (not shown) indicating that logical device preparation is proceeding (LDPP) to unity. Otherwise a CCR is sent at 1687 for the existing write operation to the addressed device 13. Following these steps, microprocessor 110 at 1688 performs some non-pertinent functions and then returns to the activating module via point 1672.

Returning to step 1684, if the return code from DM DDO of step 1683 is not the third return code, then microprocessor 110 follows path 1689 to step 1690. At 1690, CST 131 is examined to determine if the CCR was given because the command had been retried due to data being processed on the device interconnection. Such a set of affairs indicates that the device operation had been completed before logic module CS LDP 1347 was currently being executed. When these conditions are met, microprocessor at 1691 sends ending status of DEVICE END to host 12 indicating that the reason for the CCR has been satisfied. Following 1691, microprocessor 110 returns to the activating logic module via 1672. If the CCR bit was not active at 1690, then at 1692 microprocessor sets an internal flag in a work register (not shown) that logical device preparation has been completed (LDPC=1) then microprocessor 110 returns to the activating module. Now returning to step 1681, if the command is not a READ DATA BUFFER command, then microprocessor 110 follows path 1694 to ensure that the data that may be in the allocated buffer 15 segment is written into the addressed device 13. This action is achieved at 1695 by activating logic module CS CBW 1349 as explained earlier with respect to step 1669. Returning from logic module CS CBW 1349, microprocessor 110 at 1696 checks the return code (RTN) to determine whether or not a write operation had been scheduled. If a write operation had been scheduled to the addressed device 13, microprocessor 110 follows path 1697 to return 1672. If a write operation had not been scheduled at 1696, then at 1699 microprocessor 110 indicates an error by setting up a UNIT CHECK (UC=1) indicating a permanent error (PE) and then return to the activating logic module via 1672.

All of the above occurs when the allocated buffer 15 segment is in the write mode. When the allocated buffer 15 segment is indicated as being in the read mode at step 1666, microprocessor 110 follows path 1705 is set a nonread command flag at 1706. This means the received command may or may not be a READ command. Then at 1707 the command fetched at 1662 is examined to determine if the received command is a READ FORWARD or READ BACKWARD command. If the received command is a READ type of command, then at 1708 the direction change flag (not shown) of CST 131 is reset. If the received command is not a READ command, then step 1708 is omitted. At 1709, microprocessor 110 determines if the received command is for read forward (RDF) which is a read in the forward direction of tape motion. Then at 1710 microprocessor 110 examines BST 137 to see if the direction indicated is in a forward or backward direction. If the indicated direction is in the backward direction, then at 1711 the change direction bit (not shown) of CST 131 is set to unity, otherwise step 1711 is omitted. On the other hand if a READ forward command was not sensed at 1709, then the received command must be a READ backward command; microprocessor 110 follows path 1714 to examine the BST 137 direction field at 1715. If BST 137 indicates a forward direction of tape motion, then at 1716 the change of direction bit of BST 137 is set to unity, otherwise step 1716 is omitted.

Following the direction change determinations, microprocessor 110 at 1718 performs some non-pertinent functions. Then, at 1720 microprocessor 110 determines from the command fetched at 1662 whether the received command is a READ DATA BUFFER or a SYNCHRONIZE command. If the command is neither, then microprocessor follows 1721 to return at 1672. If it is either of the latter two commands, microprocessor 110 at 1722 examines CST 131 CCR indication. If the indication is off, then the command has been completed and ending status of CHANNEL END and DEVICE END (CEDE) is established at 1723, then the activating logic module is returned to at 1672. Otherwise, at 1725 the conditions for the CCR have been satisfied by storage subsystem 10 and ending status is DEVICE END (DE=1). From 1725 microprocessor 110 proceeds to logic module CS LDC 1348 via exit point 1726.

Figure 44:
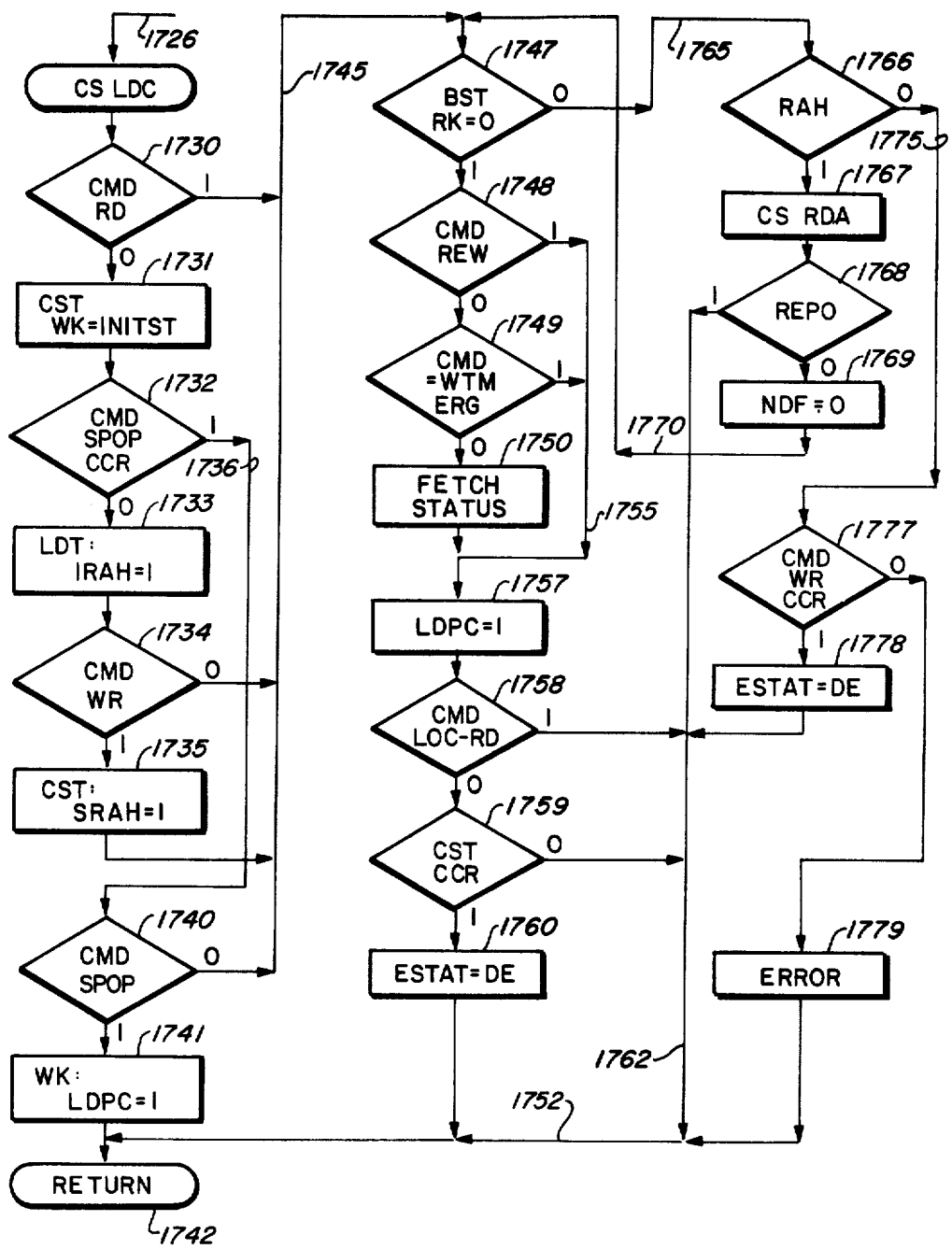

FIG. 44 illustrates logic module CS LDC 1348. After activation at 1726, microprocessor 110 determines whether the command was a READ command at 1730. If the received command fetched at 1662 (FIG. 43) was not a READ command, then from 1730 microprocessor at 1731 accesses CST 131 to place the status store 100 reported initial status into work registers (not shown) of microprocessor 110. Initial status is also that status initially supplied to host 12 for each received command by a channel adaptor 80. At 1732, the received command fetched at 1662 is analyzed for a space operation (SPOP); if the received command was not a space operation or was CCR'd by a channel adaptor 80, then the inhibit read ahead bit of LDT 133 is set at 1733 to the active condition. At 1734, if the command fetched at 1662 is a WRITE command (WR=1), then at 1735 the suppress read ahead indication of CST 131 is set to the active condition. This suppresses all read ahead.

Returning to step 1732, if the operation was a space operation or was not CCR'd by a channel adaptor 80, then microprocessor 110 follows path 1736 to step 1740 to examine the received command to determine if it is a space operation type command. For a space operation type command, at 1741 LDPC is set to the active condition. LDPC is previously described with respect to step 1692 of FIG. 43. Then microprocessor 110 returns to the logic module that activated CS LDP 1347 at 1742.

If the received command was not a space operation type command, then microprocessor follows path 1745, which also can be followed from step 1735, step 1734 when the command is not a WRITE command or from step 1730 when the command is a READ command. From path 1745, microprocessor 110 executes step 1747 by fetching the record count RK for the buffer segment contained in BST 137 for the addressed device 13 and testing it for zero. When RK is zero there are no records in the buffer 15 allocated segment. Accordingly, at 1748 microprocessor 110 examines the command fetched at 1662 to determine if it is a REWIND command. If the command is not REWIND or a REWIND UNLOAD; then at 1749, if the command is not a WRITE TAPE MARK (WTM) or an ERASE GAP command with the allocated buffer 15 segment in the read mode, then at 1750 the present status of the allocated buffer 15 segment is fetched from status store 100. In this regard, status store 100 maintains the operational state of both control units 11. The fetched status includes whether or not the buffer 15 segment has been deallocated with respect to the addressed device. Status will also include direction of motion of tape 54. The status store 100 is accessed by microprocessor 110 executing logic module CS SPS (not shown). From steps 1748, 1749 or 1750 path 1755 is followed to set a work register (not shown) flag LDPC to unity at 1757. Then at 1758 if the command is not a LOCATE BLOCK (LOC) or a READ or a READ BACKWARD command, at 1759 the CST 137 CCR indication is examined. If a CCR is indicated, microprocessor 110 at 1760 generates ending status of DEVICE END (DE=1). From steps 1758, 1759 or 1760, microprocessor 110 follows path 1762 to path 1752 and return 1742.

Returning to step 1747, if the record count RK of BST 137 representing the allocated buffer 15 segment is not zero, i.e., there are records in the allocated buffer 15 segment; then microprocessor 110 follows path 1765 to perform the following described steps. At 1766, if the data in the allocated buffer 15 segment is read ahead data, then at 1767 the logic module CS RDA (not shown) is activated. This logic module is activated whenever read ahead data in the buffer is to be deleted. Deletion is achieved by erasing the BRT 141 entry from the BRT registers allocated to the records. The addressability to the data in the buffer 15 allocated segment is destroyed thereby effectively erasing the data from the buffer. Then, microprocessor 110 determines at 1768 whether or not the addressed device 13 is repositioning based upon the execution of module CS RDA of step 1767. If no repositioning is occurring no data was in the allocated buffer 15 segment. Accordingly, a no data flag (NDF) is reset to zero at 1769; NDF is in a work register (not shown) of microprocessor 110. Following 1769, microprocessor 110 follows path 1770 to re-execute step 1747 until the logical device preparation can be completed. On the other hand at 1768 if repositioning is occurring, a return is made immediately to the original activating logic module. Returning momentarily to step 1769, if there was no data in the buffer 15 allocated segment, there is an apparent inconsistency between steps 1747 and 1769. This inconsistency is then checked out by returning to step 1747. At 1766, without read ahead (RAH=0) logic path 1775 leads microprocessor 110 to step 1777 to determine whether the receiving command (CMD) is a Write (WR) command received after a channel command retry (CCR). This means that buffer 15 has space allocated enabling system 10 to send ending status (ESTAT) of DEVICE END (DE) to host 12. At 1778, microprocessor 110 sets DE status for forwarding to Host 12 after returning at 1742 to a calling module. Otherwise, from step 1777 error status is set at 1779 for reporting.

Referring next to FIG. 45, a brief synopsis of the execution of the SYNCHRONIZE command is shown. From scan 1321 (FIG. 38) a received SYNCHRONIZE command activates logic module CS DCD 1323 and CS SCE 1330 the details of which are shown in FIGS. 39 and 40. From logic module CS SCE 1330, logic module CS LDP 1347 is activated. Numeral 2070 denotes logic steps shown in FIG. 43 but omitted in FIG. 45. Finally at step 1666 BST 137 read-write indication is examined to determine whether the segment allocated to the addressed device 13 is in the read mode or write mode. If it is the read mode then an immediate response to the SYNCHRONIZE command can be made by supplying CHANNEL END and DEVICE END. This is achieved by following path 1705, then performing the steps 2071 to step 1720. Here microprocessor 110 determines whether the received command is a READ DATA BUFFER or a SYNCHRONIZE command. If it is not either one, of course, then CS SCE 1330 is returned to over path 1721. If it is a SYNCHRONIZE command, then at 1722 microprocessor 110 examines CST 131 to determine whether or not a CCR was sent. If no CCR was sent, then at 1723 both CHANNEL END and DEVICE END are set up to be forwarded to the host 12. On the other hand, if a CCR was sent, then a DEVICE END is sent at 1725. In response to the DEVICE END the host 12 will send the SYNCHRONIZE command again. At this time the SCR will be removed and step 1723 will be performed for completing the SYNCHRONIZE command. FIG. 46 illustrates logic module CS CBW 1349 in detail. CS CBW 1349 is entered from several other logic modules, all as represented by line 1352. Entry at 1780 results in step 1781 first being executed by microprocessor 110. If a WRITE command is not in progress for the addressed device, reconnection to the channel should be inhibited. Accordingly at 1782, microprocessor 110 accesses LDT 133 to set the inhibit reconnection indication. If there is no writing to the allocated buffer segment, then step 1782 is omitted. At 1784 an AND/OR function is performed by microprocessor 110. The AND function consists of steps 1785, 1786, and 1787 all meeting conditions to result in microprocessor 110 following path 1788 indicating write data is in a buffer 15 segment. The OR path from steps 1785–1787 is over path 1789 which means that any one of the conditions of the steps is not met. At 1785, BST 135 is examined to see if the addressed buffer 15 segment is allocated for satisfying a portion of the AND condition. Otherwise the OR condition is satisfied. At 1786 BST 137 read-write indication showing a write satisfies another portion of the AND condition. A read status for BST 137 read-write indication satisfies the OR function. At 1787 BST 137 record count not being equal to 0 (there are data records in the buffer) completes the satisfaction of the AND function while no data in the buffer satisfies the OR condition.

The AND condition of 1785–1787 leads to step 1792 wherein microprocessor 110 examines CST 131 for a permanent error condition in the addressed device 13. Since there is write data in the buffer segment, a permanent error would frustrate the recording of that data onto the addressed device 13. Accordingly, at 1793 a no write operation (WROP) is set in a work register (not shown). Then microprocessor 110 returns to a calling module via path 1794 and return point 1795. Without a permanent error at 1792, microprocessor 110 follows path 1797 to schedule a device operation for writing the data onto the addressed device 13 by activating logic module DM SCH 1353 (FIG. 31). Returning from logic module DM SCH 1353, microprocessor 110 at 1799 examines CST 131 to see if a WRITE command is pending. A write command not pending means that a write operation to the addressed device 13 was scheduled. Therefore, the return parameter is set to 3. If at 1800 a write operation to the addressed device is completed; step 1800 is omitted. Then at 1801 an additional return code is set up to indicate that a write operation will ensue for the addressed device 13. From 1801 microprocessor 110 returns via 1795.

From the OR function 1784, microprocessor 110 at 1803 examines LDT 133 inhibit reconnection indication. When reconnection is inhibited, microprocessor 110 at 1805 resets this inhibit indication thereby permitting reconnection to the channel. Otherwise step 1800 is omitted. At 1806 a return code indicates that all writing to addressed device 13 has been completed. This indication results from the OR function 1784. Microprocessor 110 then proceeds over path 1794 to return to the activating logic module.

The detection of a buffer overrun results in the tape synchronous mode being imposed on tape subsystem 10 in either the read and write modes. Now storage subsystem 10 can receive the read or write command that could not be performed because of buffer limitations and that command will be executed in the tape synchronous mode because the record length is in excess of the buffer 15 segment capacity. That is, the mode of operation of the subsystem has changed from the buffer mode to the less efficient tape synchronous mode because of record length considerations.

Response of storage subsystem 10 to a received READ command in the tape synchronous mode results in logic module CS SCE 1330 activating logic module CE SRD 1339 via line 1335 of FIG. 38. FIG. 47 shows activation of logic module CE SRD 1339 from line 1335 at 1960. At 1961 CST 131 is accessed for setting the command execution is continuing indication showing that further action by control unit 11 is required. At 1962 CST 131 is again accessed for examining the status of CCR indication. If it is 0, at 1964 logic modules of CUCS 155 are activated to send a CCR signal to a channel adaptor 80 such that device 13 can be activated to reach operational speed before the channel is reconnected to the storage subsystem 10 for the data transfer. The CCR indication in CST 131 is also set to unity. At 1965 microprocessor 110 determines whether or not a channel adaptor 80 error was detected. Generally there will be no error such that at 1966 the CCR = 1 exit from 1962 is used. At 1967 BST 137 has its tape direction indication examined to determine whether tape 260 motion is going to be in the forward or backward direction of motion. For the forward direction, logic module CB SUR 1343 is activated with a notation that tape motion is in the forward direction F. For the backward direction, at 1970 logic module CB SUR 1343 is activated with the notation that tape motion is in the backward direction B. Then at 1971 logic module DM SCH 1353 is scheduled to start the device 13 moving the tape in anticipation of transferring data to the host from device 13. At 1972 microprocessor 110 returns to the calling module. In the event that a channel adaptor 80 error was indicated at 1965, microprocessor 110 follows path 1963 to return to the calling logic module. The error had been logged elsewhere therefore it is not necessary to log the error by this logic module. At this time, no data is being transferred; the addressed device 13 is getting ready to transfer data.

Figure 48:
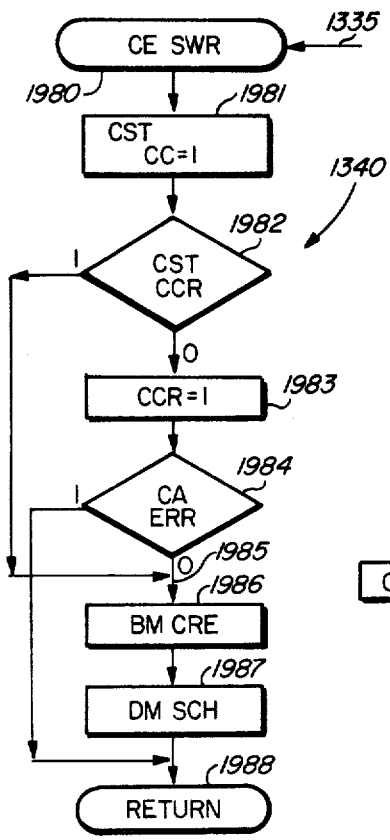

The WRITE command received first in the tape synchronous mode results in logic module CS SCE 1330 activating logic module CE SWR 1340 via line 1335 (FIG. 38) to prepare the addressed device 13 for operation in the tape synchronous mode. In FIG. 48 entry of the logic module CE SWR 1340 from line 1335 is at 1980. At 1981 CST 131 is accessed to set the command continuing indication to unity. At 1982 CST 131 is accessed to examine the value of CCR indication. If CCR is zero, at 1983 the CCR bit is set to 1 and a CCR is sent through a channel adaptor 80 to host 12 for the addressed device 13. At 1984 microprocessor 110 checks to see if a channel adaptor 80 error was reported.

If not, the action from step 1982 when CCR equals 1 and from a no error condition of step 1984 is joined to activate logic module BM CRE (not shown) of CUBM 150 at 1986. The logic module BM CRE has been previously described. Then at 1987 logic module DM SCH 1353 (FIG. 31) is activated such that device 13 can start tape 260 moving to operating speed. At 1988 microprocessor 110 returns to the activating logic module CS SCE 1330. In the event there is a channel adaptor 80 error at 1984, microprocessor 110 omits steps 1986–1987 and returns immediately to the activating logic module.

Figure 49:
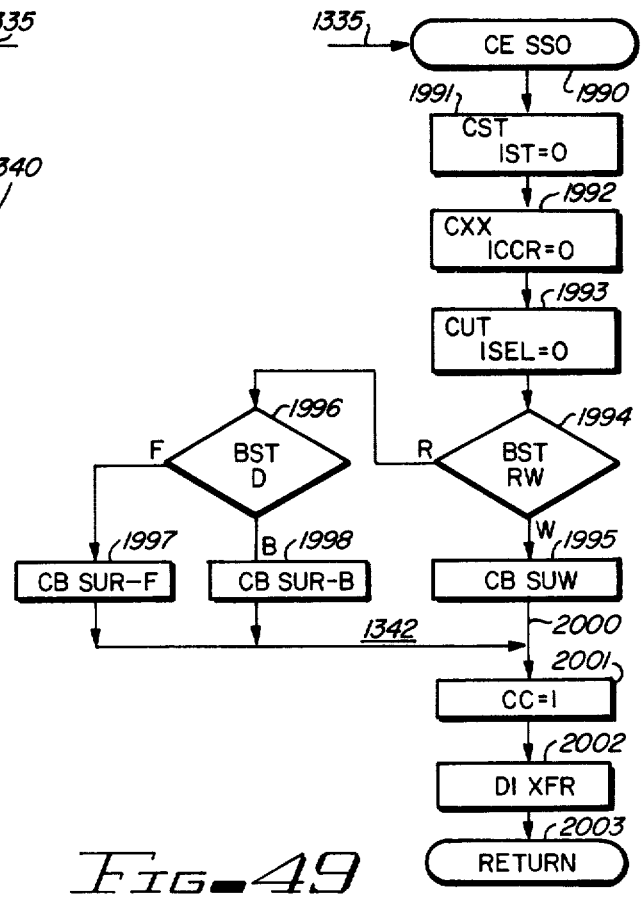

From both logic modules CE SRD 1339 and CE SWR 1340 a CCR has been sent to host 12. This CCR will cause a channel to disconnect until the device 13 is approaching operating speed. At that time a DEVICE END is sent to the host to signify that storage subsystem 10 can now perform the READ or WRITE command in the tape synchronous mode. Accordingly, the host will again send the READ or WRITE command which will be decoded by CS DCD 1323 and CS SCE 1330. This time logic module CE SSO 1342 (FIG. 49) is activated via line 1335 (FIG. 38). In FIG. 49 the activation of this logic module via line 1335 is indicated at 1990. At 1991 CST 131 is accessed with respect to the incoming commands, also the first pass indication is reset to 0. It will be remembered that this indication was set to unity to show that a first portion of the command execution had been completed. Now the second portion i.e., that portion that will actually effect data transfer is being entered. At 1992 the channel adaptor 80 denominated CXX receives a signal ICCR=0 which means that any inhibit CCR signal previously sent to the channel adapter by another logic module (not described) is removed. At this time if the addressed device 13 is not synchronized to the receipt of the command, another CCR will be sent; then device 13 will reposition tape 260 again; another try will be made at activating the tape synchronous mode. At 1993 CUT 130 is accessed to reset the inhibit selection signal indication INHSEL. INHSEL prevents the selection of the addressed device 13 until all of the preparatory actions for the tape synchronous mode are completed. At 1994 BST 137 read-write indication is examined to determine whether the tape synchronous mode is to be executed with a WRITE or READ command. If it is with a WRITE command, at 1995 logic module CB SUW 1344 is activated. For the read mode, at 1996 BST 137 tape direction indication is examined to determine the direction of tape motion. For the forward direction, logic module CB SUR 1343 is activated at 1997 with the notation that tape is moving in the forward direction. In the backward direction, logic module CB SUR 1343 is activated at 1998 with the notation that tape motion is in the backward direction. From the above steps via line 2000, microprocessor 110 at 2001 accesses the CST 131 register associated with the instant command and addressed device 13 to set the command continuing indication to the active or 1 condition. Then at 2002 logic module DI XFR 328 (FIG. 34) of CUDI 157 is activated to tell device 13 that a data transfer is to ensue. Of course the read or write indication of BST 137 indicates the direction of data transfer. At 2003 microprocessor 110 returns to the activating logic module CS SCE 1330. The data transfer in the tape synchronous mode now occurs.

Data records are transferred between devices 13 and the respective segments of buffer 15 in accordance with a priority of most recent usage of the respective segments as identified in an LRU list (not shown) of BST 137. The recording operations are scheduled in the same manner, reads and writes from and to devices 13 are interleaved in accordance with most recent segment usage. FIG. 30 shows logic module DM RAH 314. The purpose of DM RAH 314 is to enable microprocessor 110 to create device 13 activity in anticipation of host system 12 requests such that performance enhancement of subsystem 10 can be maximized.

In the write mode, at step 1666, the logic steps at 2072 (FIG. 45) are followed to path 1694 which leads to step 1695 for activating logic module CS CBW 1349 (FIG. 46) for recording all of the data records in the allocated buffer 15 segment to the addressed device 13. Logic module CS CBW 1349 of course activates DM SCH 1353 for scheduling the write operations. At this point in time, a CCR is sent to the sending host 12 to indicate that the subsystem 10 has to do its own independent actions before the command that was received can be executed. Then at 2073 microprocessor 110 performs the indicated logic steps and returns to logic module CS SCE 1330.

Upon completion of the write to device 13, CS SCE 1330 will send a DEVICE END signal to host 12. Host 12 will then reissue the SYNCHRONIZE command resulting in a CHANNEL END DEVICE END being sent at that time to signify that all of the data that was in the buffer to be written to device 13 has been actually recorded on the addressed device 13.

FIG. 50 shows length detectors embodied in overrun circuits 1372 as being comparators between a pair of buffer address registers, later described. The circuits within overrun circuits 1372 also provide buffer memory addressing through CX 1810 and DX 1811. The size of buffer segments shown in FIG. 1 are determined by so-called "wrap bits" contained in a pair of registers CW 1850 and DW 1851 respectively for channel segment wrap and device segment wrap. In other words two independent data transfers can occur simultaneously with buffer 15; one with the channel and one with the device. Accordingly, two independent addressing schemes are provided within circuits 1372 for accomplishing this arrangement. All of the registers within circuits 1372 are loaded from microprocessor 110 via the external registers 119 of FIG. 3. Registers 119 are loaded for each and every data transfer, i.e., for each record. Busses 1852 and 1853 respectively supply initializing signals to CW 1850 and to channel pointer register CPR 1854. CPR 1854 supplies its address signals over bus 1855 to CX 1810 for accessing an appropriate data register in buffer memory 15. CX 1810 supplies an increment signal over line 1856 to CPR 1854 for incrementing same, as is well known. The end of the record or the record area of the expected record, is set forth in channel stop register CSR 1860 which is initialized via bus 1861. In a write mode, i.e., transfer of data signals from host 12 to buffer 15, CPR 1854 is continually incremented each time a byte is automatically transferred into buffer memory 15. Comparator 1830, which is a record length detector, receivers the contents of CSR 1860 over bus 1862 and the contents of CPR 1854 over bus 1855. As soon as comparator 1830 detects a predetermined relationship between CPR 1854 contents and CSR 1860 contents, then an interrupt signal is supplied over line 1373 as explained with respect to FIG. 38. In a similar manner, DW 1851 receives its signals over bus 1865 while DPR 1866, a device pointer register corresponding to CPR 1854, receives its initializing address signals over bus 1867. DPR 1866 supplies its address signals over bus 1868 to DX 1811 for enabling DX 1811 to access the appropriate data register in buffer memory 15. Bus 1868 also extends to length detector comparator 1871 for comparing the contents of DPR 1866 with device stop register DSR 1870. DSR 1870 is initialized by signals received from an external register 118 via bus 1871. DSR 1870 supplies its stop address over bus 1872 to length detector comparator 1871. When a predetermined relationship between the contents of DPR 1866 and DSR 1870 are detected, an interrupt signal is supplied over line 1374 as explained with respect to FIG. 38. In a similar manner signals on busses 1855 from CPR 1854 and 1868 from DPR 1866 are supplied to a comparator 1874 for indicating over line 1375 that the address buffer 15 segment is either empty or full depending upon whether it is a read or write operation. The DX 1811 increments DPR 1866 by sending an increment signal over line 1875.

The segments within buffer memory 15 are identified by the wrap bits of CW 1850 and DW 1851. These wrap bits are applied to intermediate bit positions of CPR 1854 and DSR 1870, respectively. The effect is to make a different modulo counter out of the lower bit positions of the two registers CPR and DSR. The bit positions more significant than the bit positions receiving the wrap bits select which segment is to be addressed. Such bits are initialized by the signals from busses 1853 and 1871, respectively, for CPR 1854 and DSR 1870.

| GLOSSARY OF SELECTED ABBREVIATIONS | |
|---|---|
| ADDR | Address |
| ADDRI | Address in |
| ADDRO | Address out |
| AO | Clock A out |
| B | Clock B, in or out |
| BC | Buffer control circuits |
| BE | Save data from device in buffer (buffer enable) |
| BI | Bus in |
| BIDI | Bidirectional Data Interconnection |
| BLKS | Block size |
| BM | Buffer manager |
| BM ABS | Logic module allocate buffer segment |
| BM CRE | Logic module create record entry |
| BM DRE | Logic module delete record entry |
| BM IDF | Logic module increment device fault |
| BM PAT | Logic module pending allocation |
| BM PDT | Logic module pending deallocated |
| BM SFC | Logic module send fault count |
| BO | Bus out |
| BRM-B | Buffer read mode-backwards |
| BRT | Buffer record table |
| BST | Buffer status table |
| C | In DOT, control sequence; In device, clamp |
| CA | Channel adaptor |
| CAA-CAH | Channel adaptors A-H |
| CCR | Channel command retry |
| CCQ | Control command queue |
| CE | Channel end signal |
| CE RDC | Logic module read command execution |
| CE SRD | Logic module tape synchronous read set-up |
| CE SSO | Logic module start tape synchronous operation |
| CE SWR | Logic module tape synchronous write set-up |
| CE WRT | Logic module WRITE command execution |
| CH SSS | Set status in status store memory |
| CMD | Command |
| CMDC | Command execution is completed |
| CMDO | COMMAND OUT signal |
| CNL | Channel |
| COMP | In DOT, device operation has completed, comparator circuit |
| CPR | Channel pointer register |
| CS CBW | Logic module continue buffer write to device |
| CS DCD | Logic module decode |
| CS LDC | Logic module logical device preparation continuation |
| CS LDP | Logic module logical device preparation |
| CS RDA | Logic module read ahead handler |
| CS SCE | Logic module start command execution |
| CS SPS | Logic module sense present status |
| CSR | Channel stop register |
| CST | Command status table |
| CU | Control unit |
| CUBM | Buffer management group |
| CUCB | Channel-buffer data transfer group |
| CUCE | Command execution group |
| CUCH | Channel adaptor control group |
| CUSV | Sequence vector group |
| CUCS | Command support group |
| CUDB | Device-buffer data transfer group |
| CUDI | Device interface control group |
| CUDM | Device management group |
| CUER | Error modules |
| CUMD | Maintenance modules |
| CUSN | Sense modules |
| CUT | Control unit table 130 |
| CW | Channel wrap register |
| CX | Buffer-channel automatic data transfer |
| CXT | Channel transfer table |
| CXX | Any channel adaptor |
| D | Direction |
| DA-DG | Individual device 13 addresses |
| DAA-DAB | Device adaptors A and B |
| DADDR | Device address |
| DCB | Device control bus |
| DCR | Device control register |
| DE | DEVICE END signal |
| DF | Data flow circuits |
| DIA | Device information area |
| DIAG | Diagnostic data area |
| DI CMP | Send command to a device |
| DI CNL | Control sequence |
| DI END | Deselect device |
| DI INF | Information sequence |
| DI SEL | Select device |
| DI SER | Activate preparatory interconnection for serial data transfer |
| DI XFR | Transfer data |
| DIAP | Address pointer to DIA for device of DADDR |
| DIC | Device Interconnection Controller |
| DIR | Device interrupt register |
| DM DDO | Logic module disable device operation |
| DM PRE | Prepare a device |
| DM RAH | Read ahead or write device |
| DM SDO | Schedule device operation |
| DOT | Device operation table |
| DPR | Device pointer register |
| DSC | Device status control |
| DSE | Device status, error |
| DSR | Device status register |
| DST | Device status table |
| DTR | Device tag register |
| DVE | Device |
| DW | Device wrap register |
| DX | Buffer-device automatic data transfer |
| D1-D9, DA-DF | Individual devices |
| ERP | Error recovery procedure |
| ESTAT | Ending status |
| FMT | Format |
| GAP | Signal for interblock gap |
| I | In DOT, information sequence; In device, interrupt |
| ICQ | Queue in DOT |

-continued

GLOSSARY OF SELECTED ABBREVIATIONS

| | |
|---|---|
| INT | Interrupt |
| IRAH | Inhibit read ahead |
| IREC | Inhibit reconnect |
| L | Load |
| LDPC | Logical device preparation complete |
| LDPP | Logical device preparation proceeding |
| LDT | Logical device table |
| LOG | Logical |
| MIN | Minimum number of records |
| MP | Microprocessor |
| MT | Empty |
| MUX | Multiplexor |
| PAT | Pending allocation table |
| PDADDR | Address of prepared device; no device prepared = "XX" |
| PDT | Pending deallocation table |
| PK | Number of records processed so far |
| RAH | Read ahead |
| RDI | Read Data Interconnection, analog |
| RK | Number of records to process in present selection |
| RPI | Repositioning in |
| RW | Read or Write |
| S | In DOT, device operation has started |
| SCN | Scan |
| SCO | Serial clock out |
| SDADDR | Address of currently selected device |
| SDO | Serial data out |
| SDT | Selected device table |
| SELO | Select out |
| STATI | Status in |
| SU IHD | Interrupt handler |
| SU SCN | Idlescan |
| T.O. | Time out |
| TS | Terminate present device selection at end of next record |
| X | In SDT, some device is transferring data in DOT, queued data transfer |
| Vo | Speed of device for data processing operations |
| W | Wait, for SDT for a data transfer operation |

While the invention has been particularly shown and described with reference to preferred embodiments thereof, it will be understood by those skilled in the art that various changes in form and details may be made therein without departing from the spirit and scope of the invention.

What is claimed is:

1. Interconnection means for connecting a control unit to a plurality of controlled devices, including the combination of:

first bidirectional-connection means for coupling said control unit to said controlled devices including a data path means for transferring data signals and timing path means for timing such transfer of data signals over said data path means;

second bidirectional-connection means for coupling said control unit to said controlled devices including separate circuit means in each said controlled device and said control unit for bidirectionally transferring multiple tag signals between said control unit and said controlled devices for selecting a one of said controlled devices to transfer data signals over said data path means; respective ones of said tag signals signifying status signals, first connection command signals and data signals being transferred over said data path means, and being coupled to said first bidirectional-connection means data path means via each of said separate circuit means in each said controlled device and said control unit;

third bidirectional-connection means for coupling said control unit to said controlled devices and being independent of said first and second bidirectional-connection means, command conducting means in said third bidirectional-connection means for carrying command signals having address signals from said control unit to a one of said controlled devices indicated by said address signals; and third-connection circuit means in each of said controlled devices electrically connected to said command conducting means and being respectively responsive to a one of said address signals signifying a respective one of said controlled devices to decode said third bidirectional-connection command signals, further means in each of said controlled devices electrically connected to said third-connection circuit means for being responsive to first and second ones of said decoded third bidirectional-connection command signals to respectively actuate such respective controlled device to respectively prepare for receipt of predetermined first and second connection command signals or to deactivate said controlled device whereby signal transfers over said first and second connection means are prepared for response by said controlled device to respective ones of said third bidirectional-connection means carried command signals.

2. The interconnection means set forth in claim 1 wherein said control unit includes a memory means coupled to said third bidirectional-connection means for storing an indication that an attempt was made to send a one of said third bidirectional-connection command signals to a given one of said controlled devices via said command-conducting means; and selection means in said control unit coupled to said first and second bidirectional-connection means and to said memory means to be responsive to said memory means indicating said attempt to activate said given one of said controlled devices via said second bidirectional-connection means for transferring data signals over said first bidirectional-connection means via said data path means such that said selection means responds to said memory means even if said given one controlled device is not in fact prepared for transferring data signals.

3. The interconnection means set forth in claim 2 wherein said third bidirectional-connection means includes RPI transfer means in each of said controlled devices for sending a single binary signal from any one of said respective controlled devices to said control unit, said third-connection circuit means in each of said controlled devices also includes RPI indicating means for electrically indicating a device preparatory action for a later data-processing function occurring in said controlled device and being coupled to said RPI transfer means for supplying said electrical indication thereto, and RPI control means in each said third-connection circuit means coupled to said RPI transfer means and to said RPI indicating means, and being responsive to a respective one of said device preparatory actions and to said one of said third bidirectional-connection command signals to supply said single binary signal to said RPI transfer means.

4. The interconnection means set forth in claim 3 wherein said third bidirectional-connection means command-carrying means includes a single electrical conductor extending from said control unit to said controlled devices for carrying said third bidirectional-connection command signals; and said RPI transfer means having a second single electrical conductor extending from all said controlled devices to said control unit for carrying signals from said controlled devices to said control unit.

5. A peripheral device adapted to be connected to a controlling unit for transferring data signals therebetween and for receiving device command signals; data-processing-function-performing means responsive to received device command signals to perform data processing functions with respect to said data signals;

the improvement including, in combination:

data signal circuit means adapted to be connected to said controlling unit for enabling selection of said device by said controlling unit for transferring said data and device command signals and including tag control signal circuit means and being connected to said data-processing-function-performing means for transferring said data signals therewith and said device command signals thereto;

preparatory circuit means adapted to be connected to said controlling unit for receiving a subset of said device command signals and control command signals and being connected to said data-processing-function-performing means for transferring a subset of said device command signals thereto for activating said data-processing-function-performing means to perform preparatory actions for a later transfer of said data signals via said data signal circuit means and being connected to said data signal circuit means for inhibiting or enabling operation thereof in response to respective ones of said control command signals whereby data processing operations are performed via said data signal circuit means, said preparatory circuit means including device address decoding means, command receipt means responsive to said device address decoding means to receive a single control command signal for each decoded device address whereby said control command signals are received by the device independent of said device selection and via said preparatory circuit means; and data processing command means coupled to said data signal circuit means and to said preparatory circuit means for receiving a plurality of said device command signals during a single device selection via said data signal circuit means and connected to said data-processing-function-performing means such that said data-processing-function-performing means responds to said commands from either of said circuit means.

6. The peripheral device set forth in claim 5 wherein said data-processing-function-performing means includes relatively movable mechanical portions, one of which is capable of carrying information-bearing indicia and another one of which includes indicia-operating means for performing functions with respect to said one mechanical portion relating to said information-bearing indicia when said mechanical portions have reached a predetermined relative position;

the improvement further comprising:

a programmed computer in said data-processing-function-performing means and coupled to said data signal circuit means, to said preparatory circuit means, and to said mechanical portions and said indicia-operating means for controlling said mechanical portions and said indicia-operating means;

said programmed computer incorporating said data processing command means for being responsive to either said data-signal-circuit-means-received device commands or to said preparatory circuit means to initiate relative motion of said relatively movable mechanical portions toward said predetermined relative position and being responsive to said data-signal-circuit-means-received command signals but not to said preparatory circuit means to initiate a data processing function in said data-processing-function-performing means when said relatively movable mechanical portions reach said predetermined relative position.

7. The machine-implemented method of operating a plurality of peripheral devices attached to a data processing system, said processing system including a data buffer, a host system connected to said data processing system for transferring information-bearing signals with said buffer;

including the automatic steps of:

first transferring information-bearing signals in a first succession of blocks of such signals between said data processing system and a first one of said peripheral devices;

first indicating a need to transfer information-bearing signals in a second succession of blocks of such signals between a second one of said peripheral devices and said data processing system;

activating, in response to said first indicating and first transferring, said second peripheral device to prepare for said second succession of information-bearing signal transfers while continuing to transfer signals in said first succession of information-bearing signals;

secondly indicating when said second peripheral device is about ready for second succession of information-bearing signal transfers, in response to said about ready indication, terminating said first succession of information-bearing signal transfers at the end of a current block of such information-bearing signals being transferred and immediately secondly activating said second peripheral device to transfer with said host system said second succession of information-bearing signals;

subsequent to said secondly activating, receiving a request from said host system for said second succession of information-bearing signal transfers with respect to said second peripheral device; and then in response to the received request of said host system, examining said buffer for prior data processing activity with respect to said second peripheral device; if no prior data processing activity is identified with respect to said requested second succession of information-bearing transfers, signalling said host system that a delay is to occur and indicating said need for transfer; otherwise, with a prior data processing activity being identified, transferring information-bearing signals between said buffer and said host system in a said second succession of information-bearing signals whereby transfers of said information-bearing signals between said host system and said buffer are highly asynchronous with respect to transfer of the same information-bearing signals between a one of said peripheral devices and said buffer while limiting elapsed time between different successions of information-bearing signal transfers.

8. The method set forth in claim 7, further including the automatic machine-implemented steps of:

in said data processing system starting operations to be performed with said peripheral devices in the following priority:

setting time-outs for predetermined functions including starting operations related to timing out of said time-outs as first priority operations;

monitoring operations of said peripheral devices and starting operations related to said monitored operations as second priority operations including said secondly indicating step;

starting transfer of data signals as third priority operations including said first and second transferring steps, and starting other operations as fourth priority operations including scheduling data signal transfers to be started as said third priority operations and first indicating step, said activating step, said receiving step, and said examining step.

9. In a control unit adapted to selectively interconnect any one of a plurality of hosts to any one of a plurality of peripheral devices for selective and asynchronous data transfers therebetween; a data signal buffer in the control unit for temporarily storing data signals being transferred between said hosts and said devices; decoding means in said control unit for decoding peripheral commands received from any of said hosts;

the improvement including in combination:

device manager means coupled to said decoding means for being responsive to said decoded peripheral commands to establish three queues of orders for said devices corresponding to said decoded peripheral commands and respectively storing the established queues in first, second and third queue stores, a first of said order queues being stored in said first queue store for queueing orders for said peripheral devices relating to internal device operations ancillary to data signal transfers between said control unit and respective ones of said devices; a second of said order queues being stored in said second of said queue stores and for orders to transfer control data signals between respective ones of said peripheral devices and said control unit; and a third of said order queues being stored in said third queue store and being for orders to transfer data processing signals between said control unit and respective ones of said peripheral devices;

a plurality of device connection means, each said device connection means being adapted to enable data and control signal transfers between the control unit and any one of the peripheral devices connected to the control unit; a first one of the device connection means being for bidirectionally transferring data-processing signals and data-processing device orders between the control unit and respective ones of said connected peripheral devices, a second one of the device connection means being for bidirectionally transferring tag control signals between said control unit and respective ones of said peripheral devices for selecting, deselecting and controlling a selected one of said peripheral devices identified by data signals transferred over said first connection means in time coincidence with an ADDRO one of said tag control signals, a third one of the device connection means being for transferring control orders having device address signals from said control unit to an indicated one of said controlled devices indicated by said device address signals relating to an expected data signal transfer;

order transfer means connected to said first, second and third queue stores and to said third one of said device connection means for scanning said order queues in sequence from first to third ones of said order queues for transferring queued orders to said third one of said device connection means for actuating said peripheral devices to perform functions in accordance with the transferred orders including functions preparatory to an expected data signal transfer over said first one of said device connection means;

prepared device indicating means connected to said order transfer for being responsive to said order transfer means to indicate that an order was transferred over said third one of said device connections to said indicated one of said controlled devices that relates to said expected data signal transfer;

selected device indicating means responsive to said second device connection means to indicate a device that was selected for data transfer via said second device connection means; and said second device connection means including first control means responsive to said selected device indicating means to inhibit selection of another device; second control means responsive to said prepared device indicating means to activate said second device connection means to deselect a selected device at an end of a given data signal transfer to force selection of said indicated device.

10. The control unit set forth in claim 9, further including operations priority means coupled to said device manager means, order transfer means, and said second device connection means for starting operations in said control unit in accordance with the operation to be performed, said priority means including:

device operation starting means coupled to said order transfer means for starting device-related operations including signal transfers as first priority of operations;

channel transfer starting means coupled to said data signal buffer for starting host-related signal transfers as second priority operations;

command execution starting means coupled to said decoding means for starting operations related to execution of received peripheral commands including means for activating said device manager means to schedule device operations to be started by said device operation starting means as third priority operations;

means for indicating other work to be done; and scan means coupled to said other work indicating means for scanning said other work indicating means for starting control unit operations relating to said other work as a lowest-order priority operation.

11. A peripheral system attachable to a host, a control unit having adaptor means for connection to said host for transferring data signals therewith and receiving peripheral commands therefrom, a plurality of peripheral devices, a plurality of device adaptors in said control unit for coupling said peripheral devices thereto; data flow means in said control unit for coupling a one of said device adaptors to a one of said adaptor means for transferring data signals between a one of said peripheral devices and said host;

the improvement comprising:
A. interconnection means extending from each said device adaptor to predetermined respective ones of said peripheral devices and consisting of a wideband data selected command and selected device address signals bidirectional bus means, a set of tag lines for carrying control signals relating to transfer of data signals over said bus means, preparatory narrow-band signal line means for carrying associated preparatory and device address command signals from said control unit to a one of said peripheral devices indicated by said preparatory device address signals;
B. attachment means in each of said devices and including selected circuit means connected to said bus means and said tag lines respectively for transferring said data, selected command signals and selected address signals, and preparatory circuit means connected to said preparatory line means for receiving said preparatory command signals, control means in each of said peripheral devices to respond to said preparatory commands to institute preparatory device actions to prepare said device for a data processing operation via said bus means; and
C. peripheral command execution means in said control unit coupled to said adaptor means for receiving said peripheral commands for execution, means coupled to said command execution means for queueing said received peripheral commands pending peripheral device actions, command transmittal means coupled to said queueing means and to said preparatory line means of said interconnection means for fetching a queued one of said received peripheral commands and transmitting it to a first one of said peripheral devices over said preparatory line means, prepared memory means coupled to said command transmittal means for being responsive to said command transmitted to indicate that said first one peripheral device is being prepared for selection via said bus means and said tag lines, selected memory means for indicating that a second one of said peripheral devices is selected for operation with said bus means and tag lines including means for indicating a possible termination of said selection, device selection means connected to said selected memory means, said possible termination means, to said prepared memory means and to said bus means and said tag lines for being responsive to said prepared memory means indication and to said possible termination indication to deselect said second one peripheral device and to select said first one peripheral device for ensuing operations with respect to said bus means.

12. The system set forth in claim 11 wherein said peripheral devices are magnetic tape recorders having magnetic tape transporting means and data signal recording-reproducing means;

in each device said control means of each such device being connected to said magnetic tape transporting means for activating same to transport magnetic tape in response to given ones of said preparatory command signals such that magnetic tape transport motion begins before selection of the peripheral device for data signal transfer over said bus means with said control unit; and said data signal recording-reproducing means being connected to said bus means for transferring data signals therewith.

13. The system set forth in claims 11 or 12 further including operation priority means in said control unit connected to said peripheral command execution means for giving a priority of operations to selected peripheral device over preparatory peripheral device operations, including initiation of peripheral command execution by said peripheral command execution means.

14. A control unit having a plurality of channel adaptor circuits, a plurality of device adapter circuits, a microprocessor means with a control store for storing program indicia for enabling said microprocessor to operate the control unit, and data transfer means coupled to all of said adaptor circuits and said microprocessor means for responding to said microprocessor means to transfer digital signals between said adaptors and between any one adaptor and said microprocessor means;

the improvement comprising:
each of said device adaptor means having first, second and third bidirectional-device-connection means adapted to be connected to a plurality of controlled devices for being controlled by the control unit including a control of predetermined motions of relatively movable mechanical elements in each of the controlled devices;
said second bidirectional-connection means for coupling said control unit to said controlled devices for bidirectionally transferring multiple tag signals between said control unit and said controlled devices for seleting a one of said controlled devices to transfer data signals over said data path means; respective ones of said tag signals signifying signals being transferred over said data path means as status signals, first connection command signals and data signals;
said first bidirectional-connection means being for coupling said control unit to said controlled devices including a data path means for transferring data signals at a relatively high data rate in a predetermined timed protocol with a selected one of said controlled devices;
said third bidirectional-connection means for coupling said control unit to said controlled devices and being independent of said first and second bidirectional-connection means, command conducting means in said third bidirectional-connection means for carrying command signals having address signals from said control unit for a one of said controlled devices indicated by said address signals, and an acknowledgement means for receiving acknowledgement signals from said indicated controlled device that a command signal was received, said indicated controlled device being a controlled device other than said selected controlled device;
queue means in said microprocessor means for separately storing requests for device activity with respect to device motions, device status reporting and device data transfers;

device serial means in said microprocessor means coupled to said queue means and to said third bidirectional-connection means for transferring a request stored in said queue means to a said indicated controlled device via said third bidirectional means for commanding said indicated controlled device to begin a preparatory motion of its relatively movable mechanical elements;

timer means in said microprocessor means coupled to said device serial means to begin a time out in response to said transferred stored request and emitting a GO signal upon said time out;

device interface control means in said microprocessor means coupled to said queue means, to said timer means and to said first and second bidirectional-connection means and having means for limiting duration of a current data transfer over said first bidirectional-connection means such that any data transfer with a selected one of said controlled devices stops before said GO signal is emitted, being responsive to said GO signal to initiate a date transfer with said indicated controlled device such that the initiated data transfer always occurs anyway.

* * * * *

UNITED STATES PATENT AND TRADEMARK OFFICE
CERTIFICATE OF CORRECTION

PATENT NO. : 4,423,480

DATED : December 27, 1983

INVENTOR(S) : Wayne J. Bauer, William C. Dodt, Charles R. Kirkpatrick, Ted A. Rehage, Francis L. Robinson, William K. Taylor It is certified that error appears in the above—identified patent and that said Letters Patent is hereby corrected as shown below:

| | | |
|---|---|---|
| Col. 4, | line 10 | Change "is" to --in-- |
| Col. 7, | line 56 | Change "firt" to --first-- |
| Col. 10, | line 8 | Change "adaptors" to --adaptor-- |
| Col. 10, | line 43 | Change "D1-D8" to --D0-D7-- |
| Col. 10, | line 44 | Change "Df" to --DF-- |
| Col. 13, | line 65 | Change "overinput/output" to --over input/output-- |
| Col. 14, | line 26 | Change "device 11" to --device 13-- |
| Col. 14, | line 34-35 | Change "signal-pairing bearing" to --signal-bearing-- |
| Col. 17, | line 40 | Delete the semicolon ";" |
| Col. 27, | line 51 | Before the line, insert and center subheading --CHANNEL ADAPTOR-- |
| Col. 40, | line 8 | Change "bing" to --being-- |
| Col. 40, | line 22 | Change "667" to --657-- |
| Col. 42, | line 50 | Change "AT 709" to --At 709-- |
| Col. 46, | line 16 | Change "SDADDB 460" to --SDADDR 460-- |
| Col. 47, | line 24 | Change "131" to --13-- |
| Col. 48, | line 48 | Change "113" to --13-- |
| Col. 68, | line 59 | Change "receivers" to --receives-- |
| Col. 78, | line 39 | Change "seleting" to --selecting-- |

Signed and Sealed this

Twenty-fourth Day of April 1984

[SEAL]

Attest:

GERALD J. MOSSINGHOFF

Attesting Officer     Commissioner of Patents and Trademarks